(12) United States Patent
Ma

(10) Patent No.: US 12,470,814 B2
(45) Date of Patent: Nov. 11, 2025

(54) SYSTEMS, DEVICES, AND METHODS SUPPORTING MULTIPLE PHOTOGRAPHY MODES WITH A CONTROL DEVICE

(71) Applicant: SZ DJI TECHNOLOGY CO., LTD., Shenzhen (CN)

(72) Inventor: Tianhang Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 208 days.

(21) Appl. No.: 18/345,704

(22) Filed: Jun. 30, 2023

(65) Prior Publication Data
US 2023/0362484 A1    Nov. 9, 2023

Related U.S. Application Data

(63) Continuation of application No. PCT/CN2020/141967, filed on Dec. 31, 2020.

(51) Int. Cl.
*H04N 5/335* (2011.01)
*H04N 23/63* (2023.01)
*H04N 23/66* (2023.01)
*B64U 101/30* (2023.01)

(52) U.S. Cl.
CPC ........... *H04N 23/66* (2023.01); *H04N 23/632* (2023.01); *B64U 2101/30* (2023.01)

(58) Field of Classification Search
CPC ..................................................... H04N 23/66
See application file for complete search history.

(56) References Cited

U.S. PATENT DOCUMENTS

| 5,353,082 A | 10/1994 | Suzuka | |
|---|---|---|---|
| 6,864,911 B1* | 3/2005 | Zhang | G03B 35/08 348/E5.025 |
| 10,868,949 B2* | 12/2020 | Yoshino | H04N 7/185 |
| 2006/0014563 A1* | 1/2006 | Cheng | H04M 1/0254 455/557 |

(Continued)

FOREIGN PATENT DOCUMENTS

| CN | 103873750 A | 6/2014 |
|---|---|---|
| CN | 105581412 A | 5/2016 |

(Continued)

OTHER PUBLICATIONS

"A detachable drone camera on a smartphone? We aren't kidding" by HT Tech, dated Aug. 21, 2022, pp. 1-3 (Year: 2022).*

(Continued)

*Primary Examiner* — Gary C Vieaux
(74) *Attorney, Agent, or Firm* — ANOVA LAW GROUP, PLLC

(57) ABSTRACT

A handheld controller configured to be removably coupled to and control an imager includes at least one processor and memory coupled to the at least one processor and storing instructions that, when executed by the at least one processor, cause the at least one processor to perform operations including, in accordance with the imager being coupled to the handheld controller, controlling the imager to capture a first group of images, and in accordance with the imager (Continued)

being separate from the handheld controller and carried by a movable object, controlling the imager to capture a second group of images or controlling the movable object.

20 Claims, 28 Drawing Sheets

(56) References Cited

U.S. PATENT DOCUMENTS

| | | | |
|---|---|---|---|
| 2010/0060747 A1 | 3/2010 | Woodman | |
| 2011/0032384 A1* | 2/2011 | Ono | H04N 1/00323 348/231.2 |
| 2012/0099012 A1* | 4/2012 | Ryu | H04N 23/661 348/E5.022 |
| 2015/0339951 A1* | 11/2015 | Stevens | G09B 21/008 348/62 |
| 2016/0198093 A1* | 7/2016 | Ito | G06F 3/0393 348/333.02 |
| 2017/0052561 A1 | 2/2017 | Proksch | |
| 2019/0114847 A1* | 4/2019 | Wagner | G05D 1/0038 |
| 2020/0082014 A1 | 3/2020 | Unverdorben et al. | |
| 2020/0093014 A1 | 3/2020 | Merenda | |

FOREIGN PATENT DOCUMENTS

| | | | | |
|---|---|---|---|---|
| CN | 205524957 U | | 8/2016 | |
| CN | 106165388 A | | 11/2016 | |
| CN | 106357981 A | | 1/2017 | |
| CN | 106581839 A | | 4/2017 | |
| CN | 206147927 U | | 5/2017 | |
| CN | 206775619 U | | 12/2017 | |
| CN | 108377333 A | | 8/2018 | |
| CN | 209390165 U | | 9/2019 | |
| CN | 209731326 U | * | 12/2019 | |
| CN | 111034172 A | | 4/2020 | |
| CN | 210745312 U | | 6/2020 | |
| CN | 111409826 B | * | 3/2022 | ............. B64C 39/02 |
| WO | WO-2021129778 A1 | * | 7/2021 | ............. B64C 13/28 |

OTHER PUBLICATIONS

The World Intellectual Property Organization (WIPO) International Search Report for PCT/CN2020/141967 Sep. 15, 2021 3 pages.
The World Intellectual Property Organization (WIPO) International Search Report for PCT/CN2020/141882 Sep. 30, 2021 8 pages (including English translation).

* cited by examiner

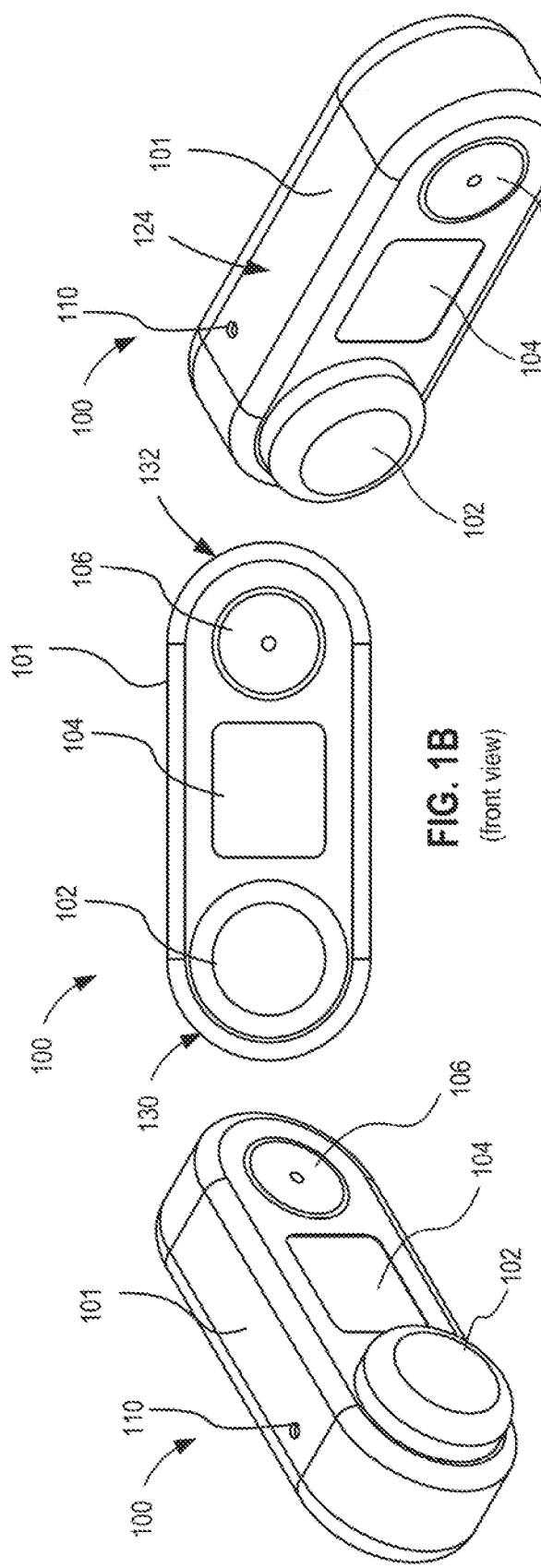
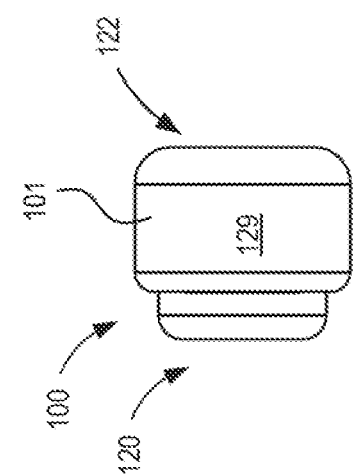
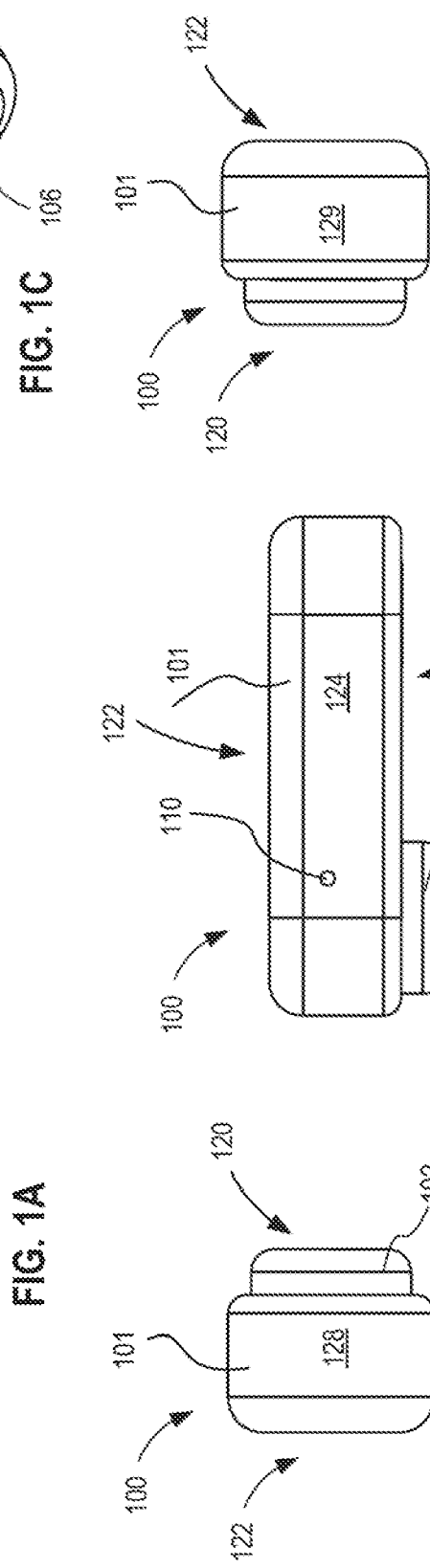
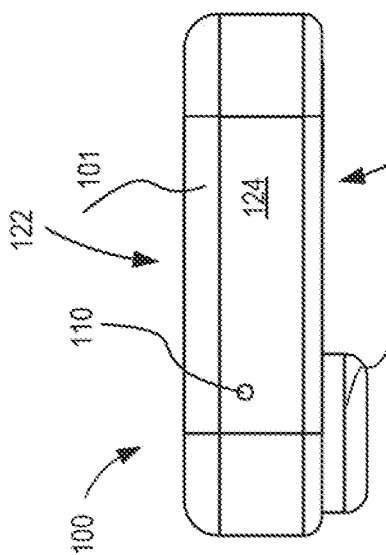

(back view)

(front view)

(back view)

(front view)

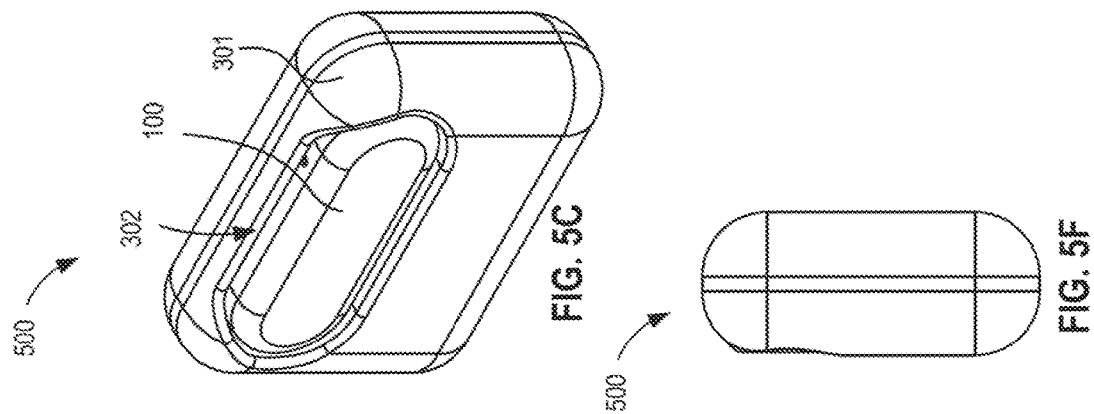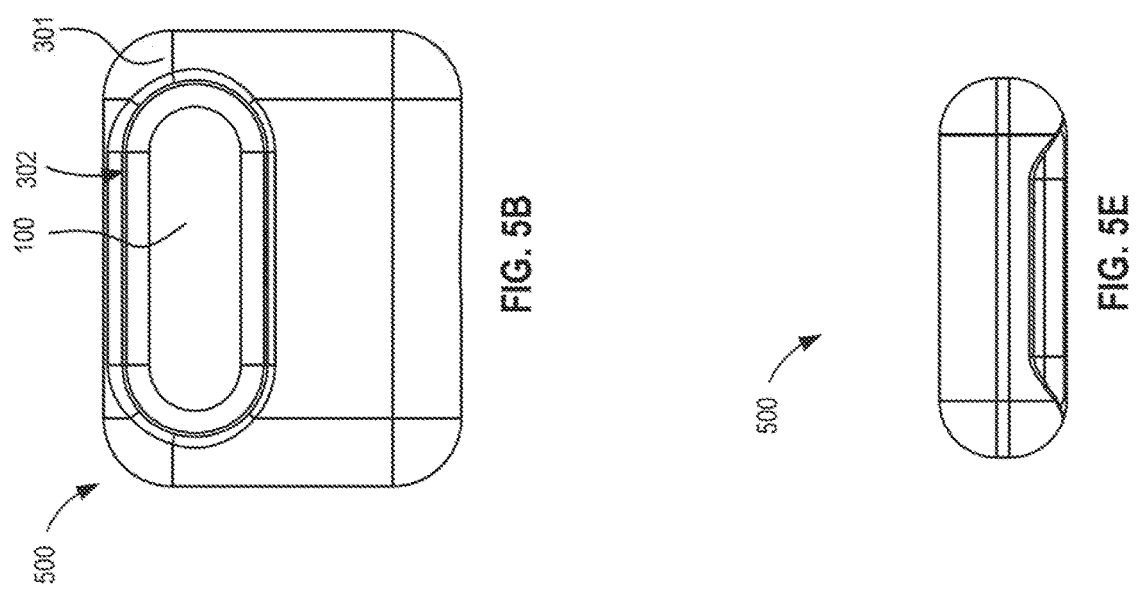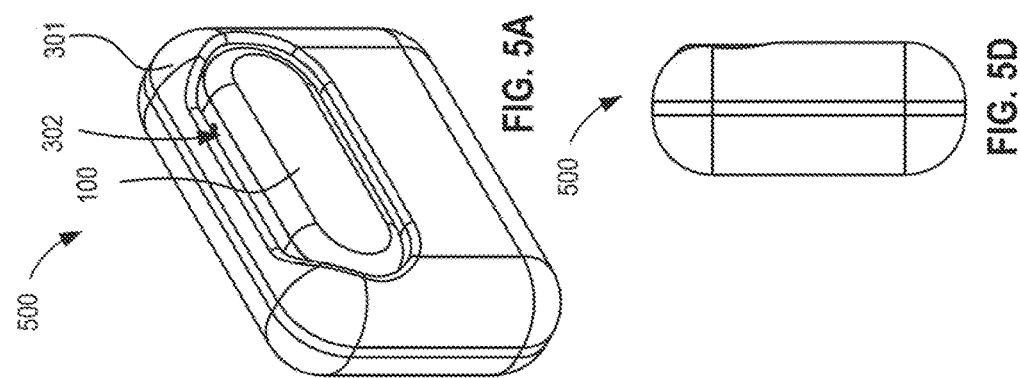

700

Determining an orientation of the imaging device received in the cavity
702

Controlling operation of the imaging device or the carrier device in accordance with the determined orientation
704

Detecting an orientation of the imaging device held in the cavity 752

Controlling operation of the imaging device in accordance with the detected orientation
754

FIG. 7B

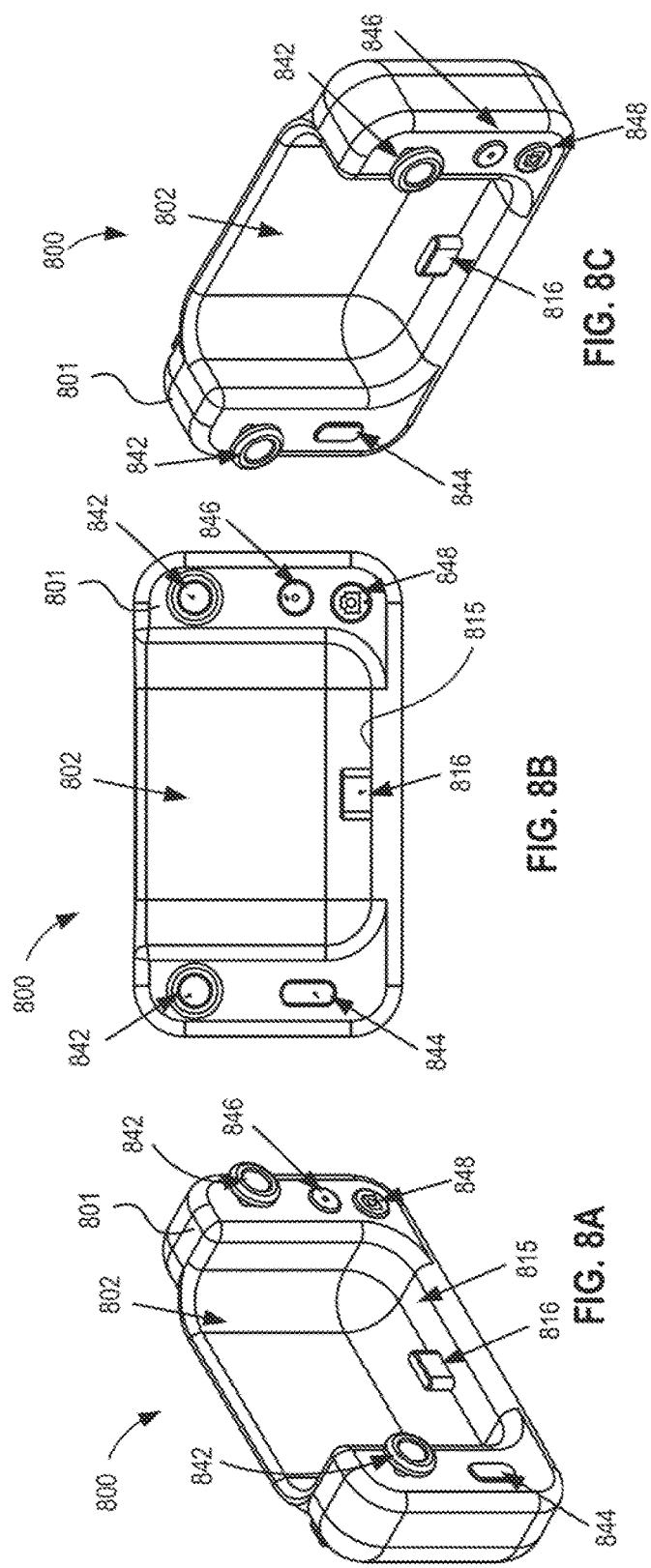

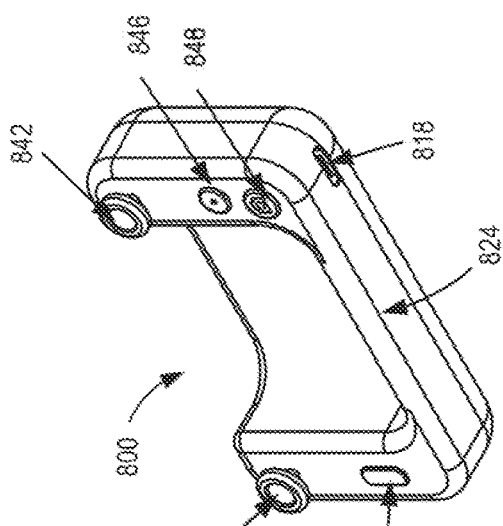
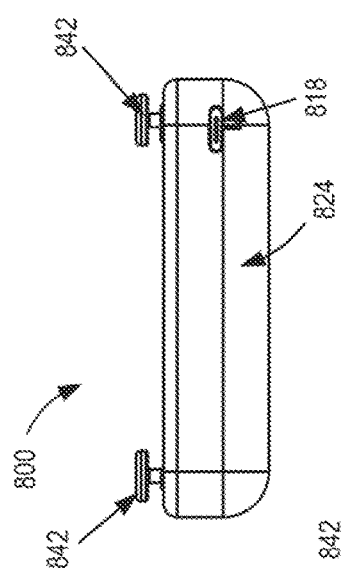
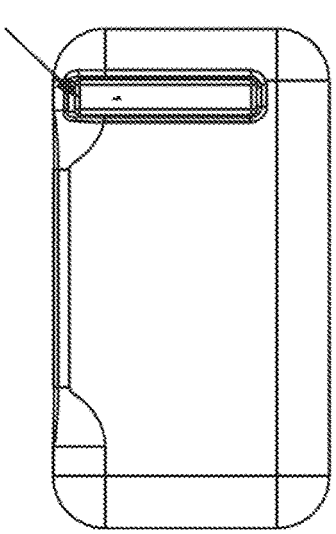
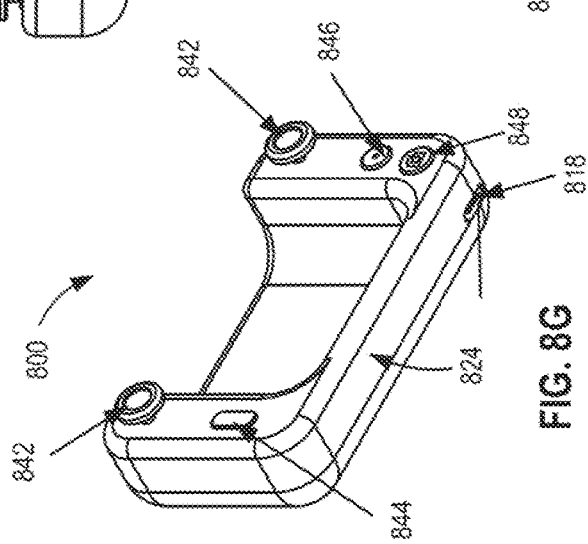

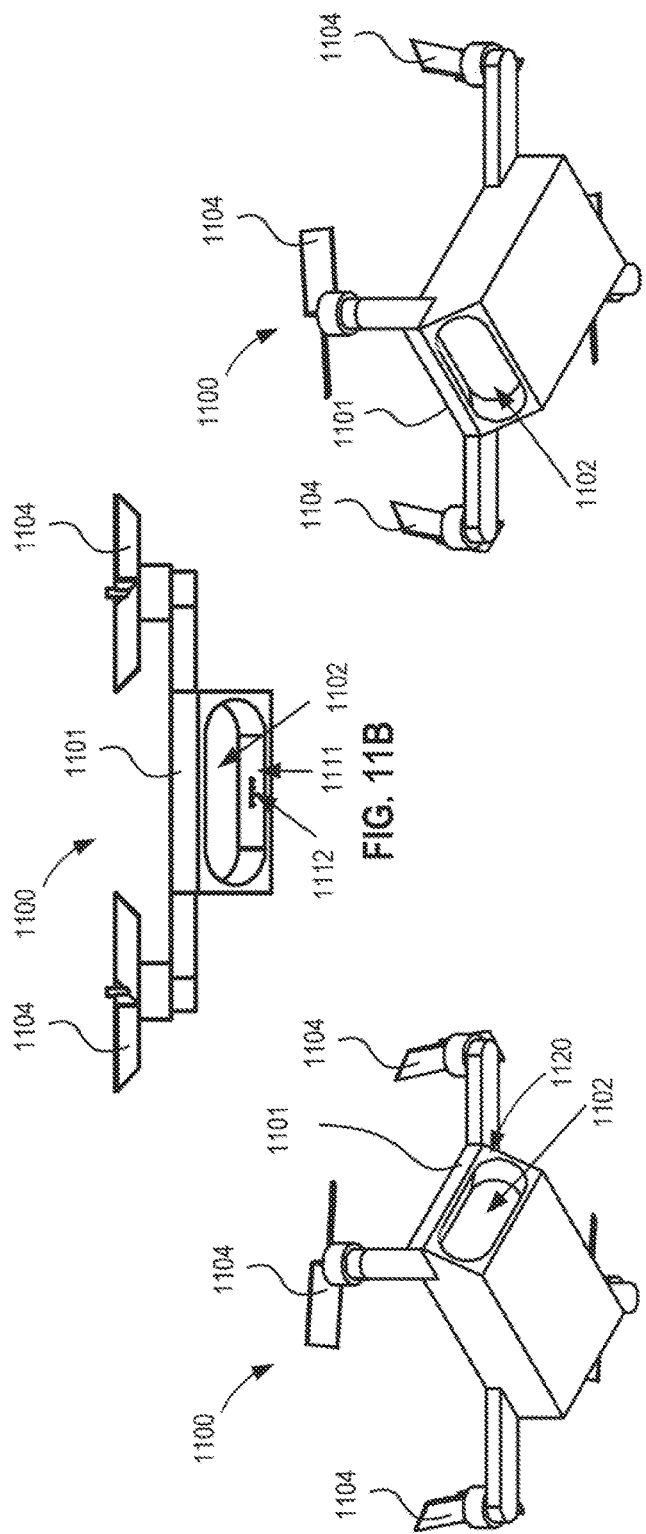

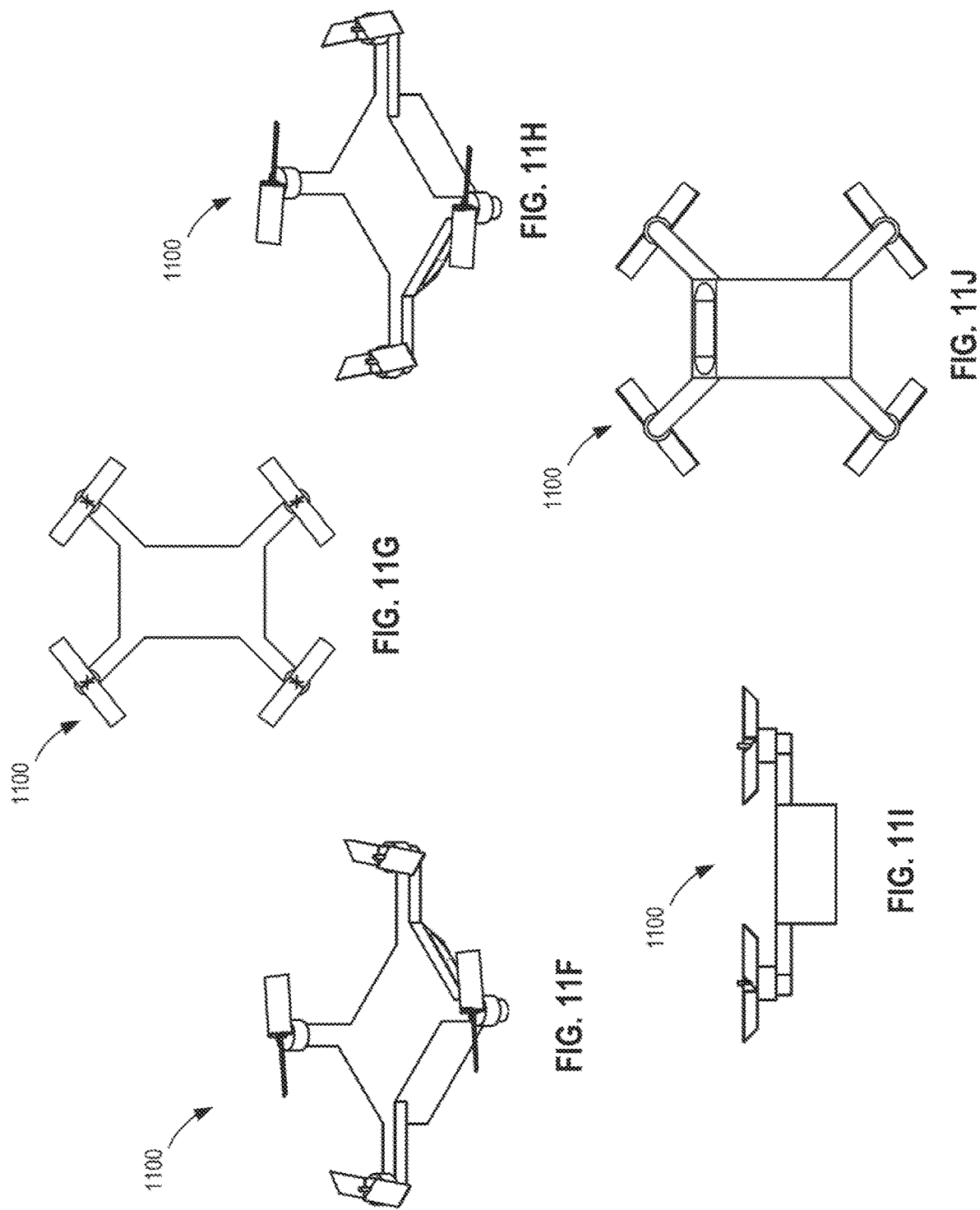

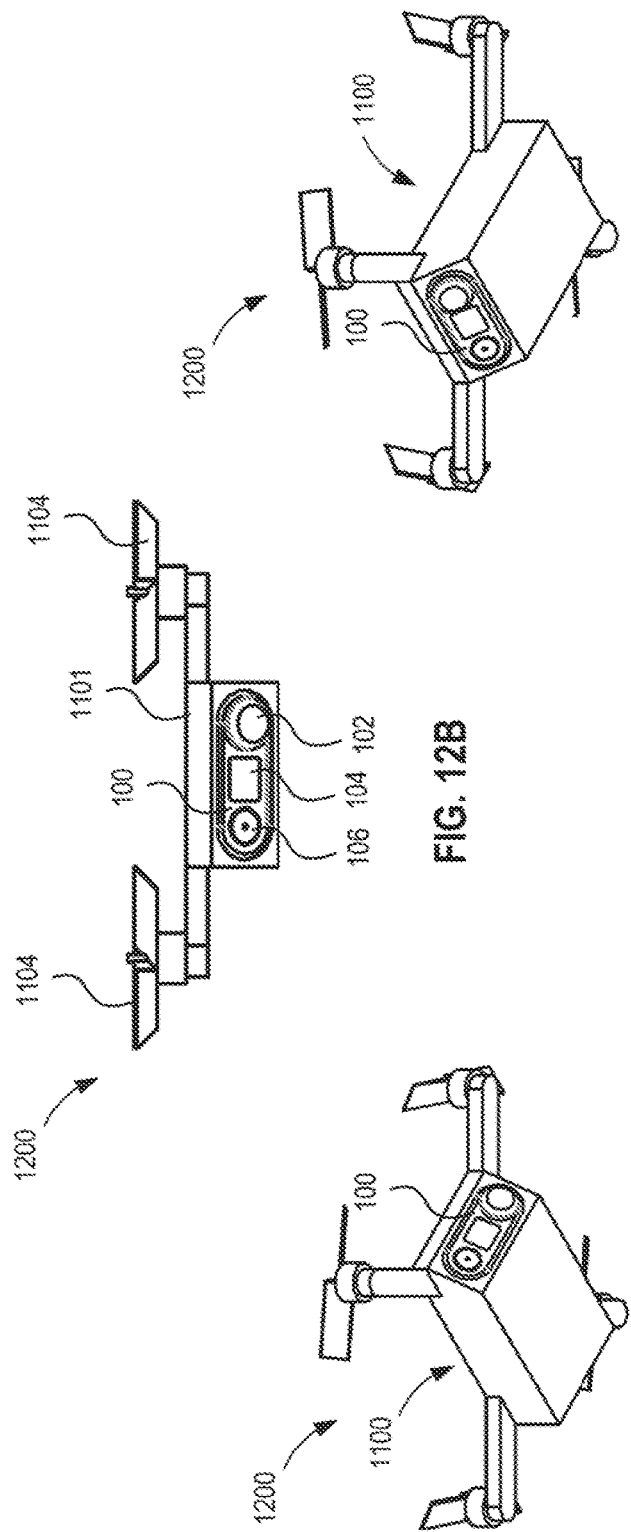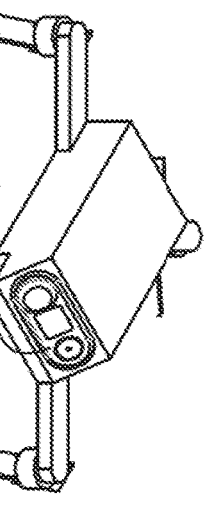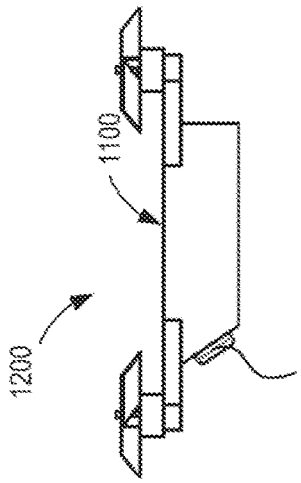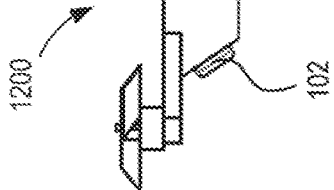

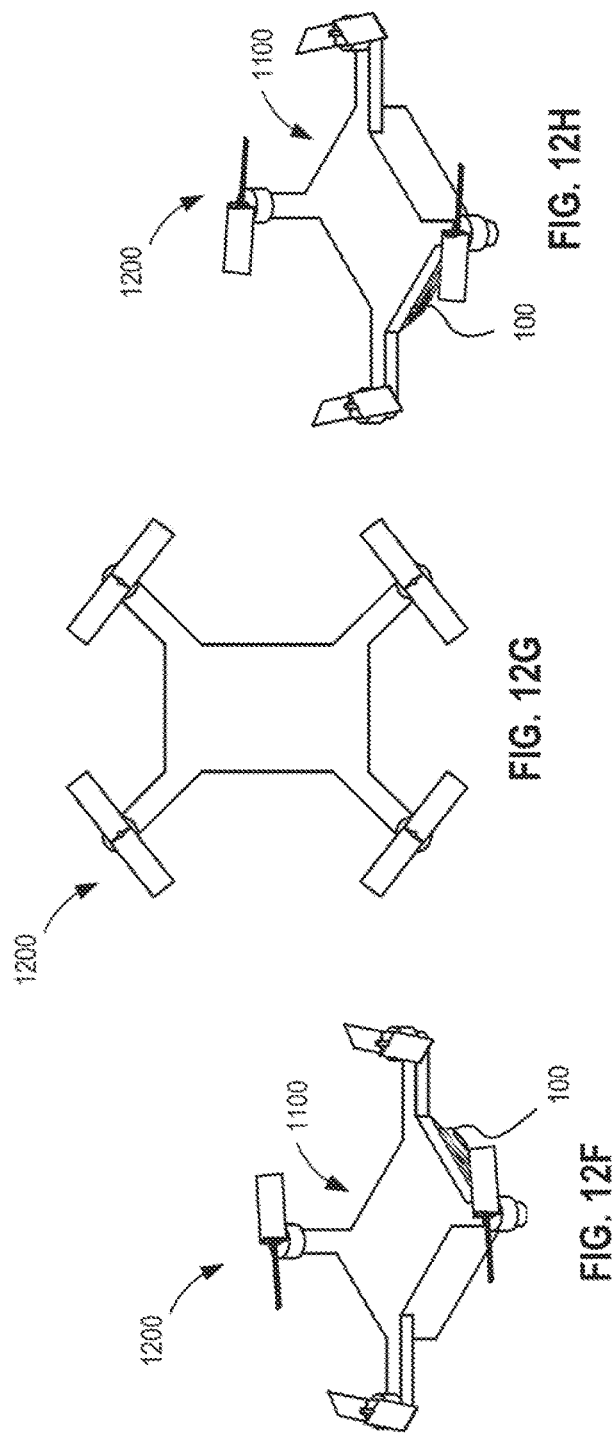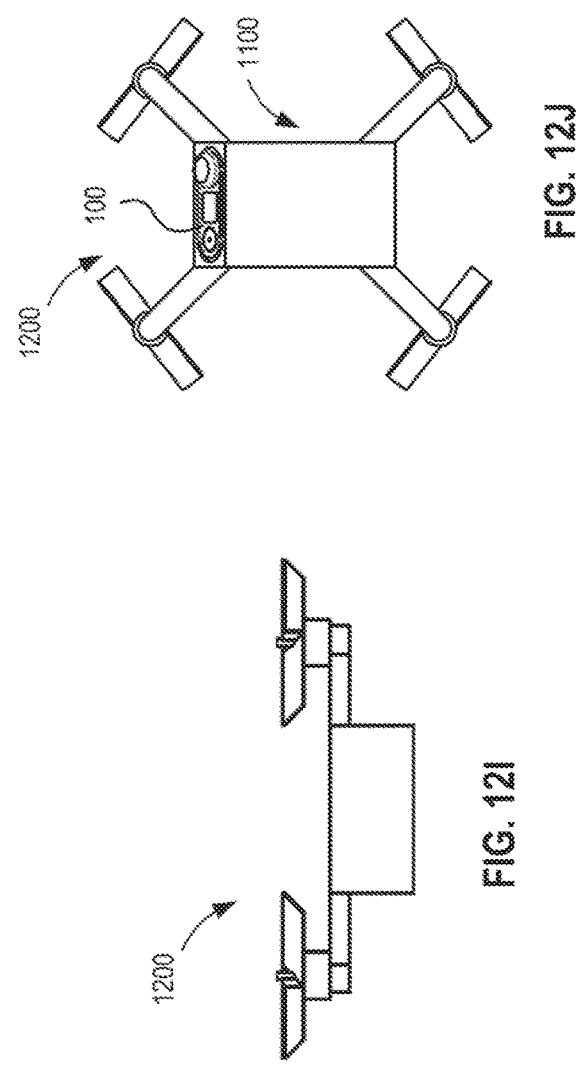
FIG. 12F
FIG. 12G
FIG. 12H
FIG. 12I
FIG. 12J

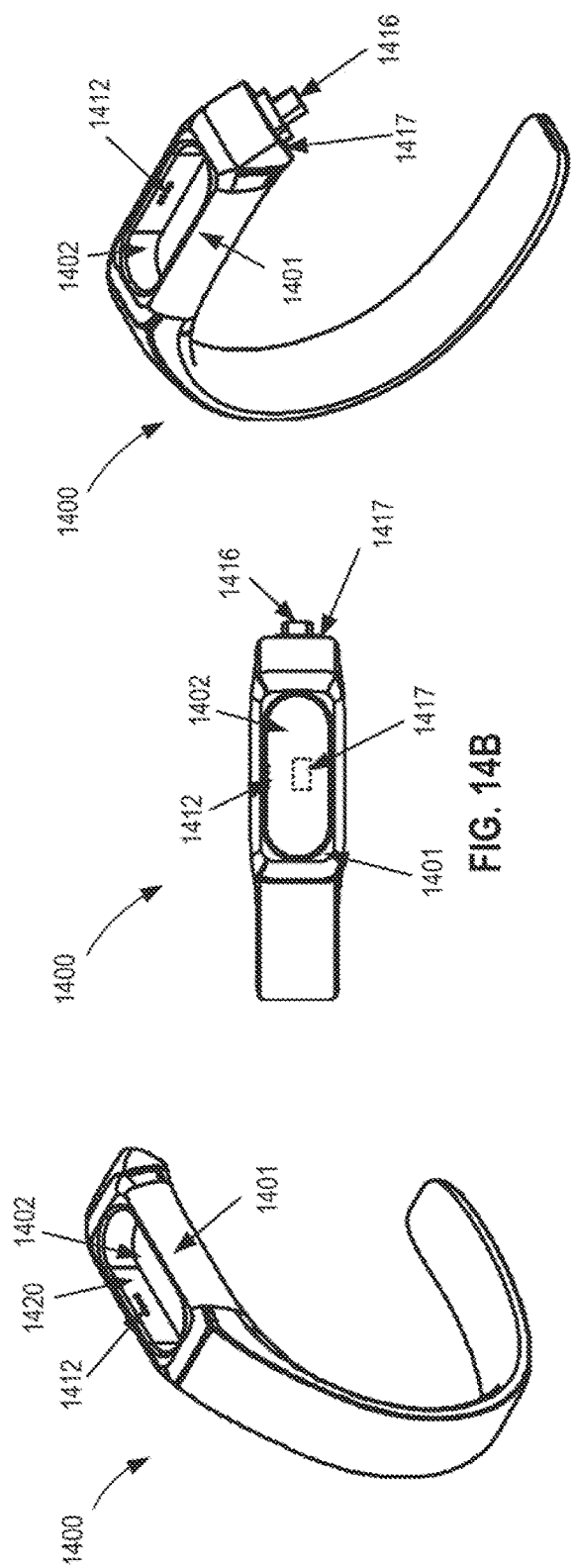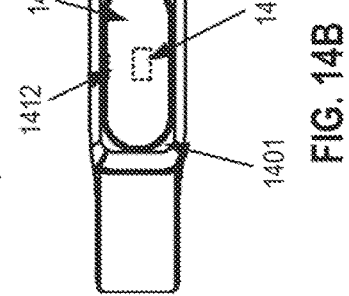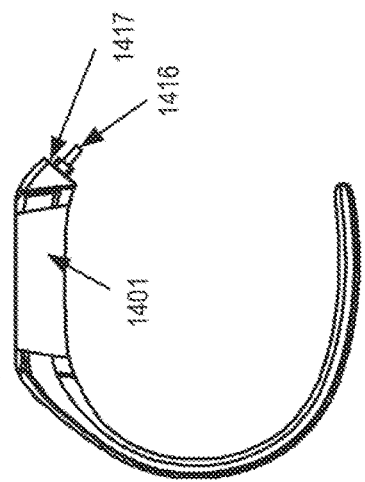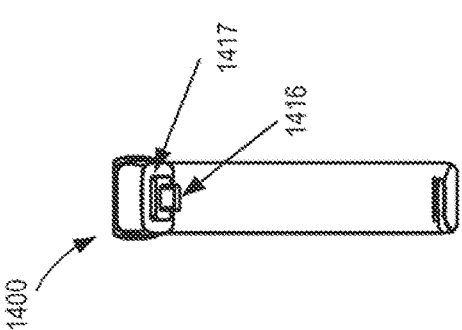

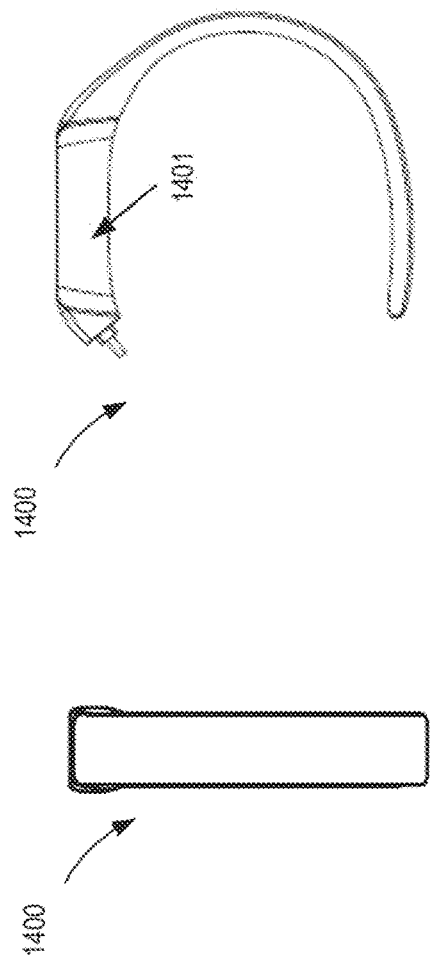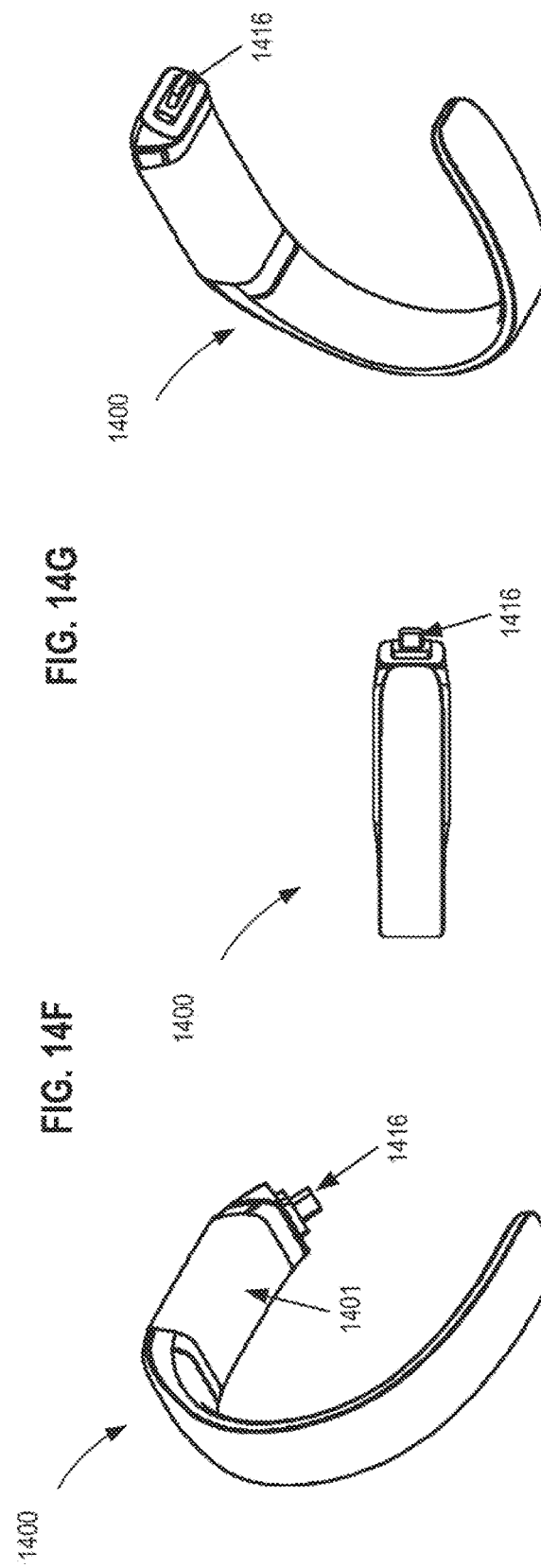

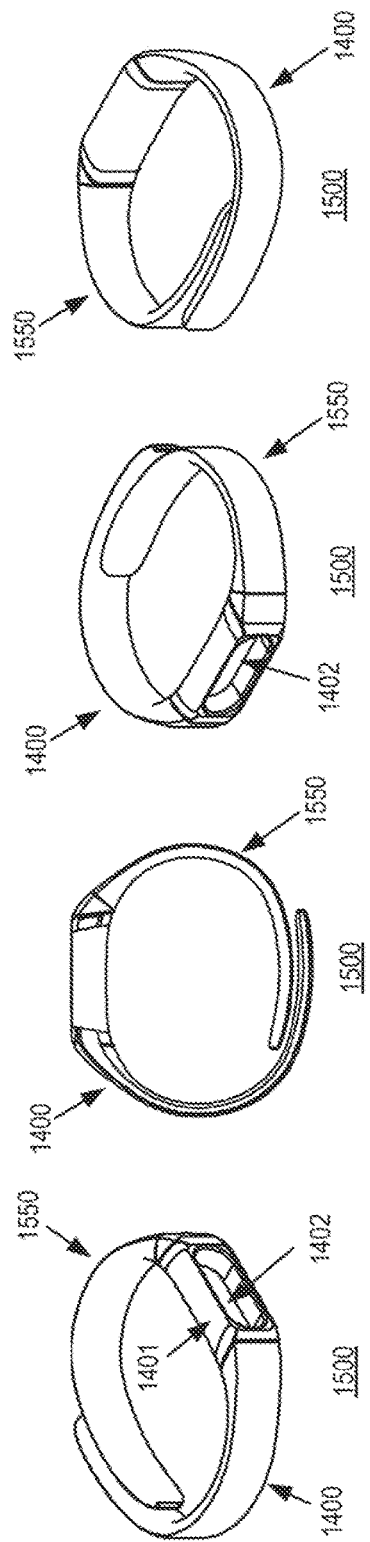
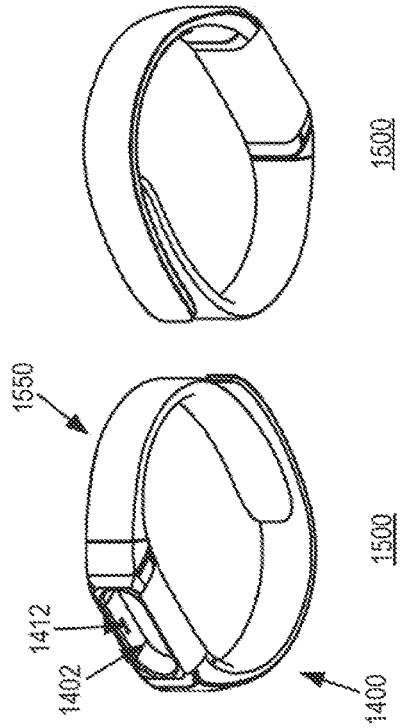
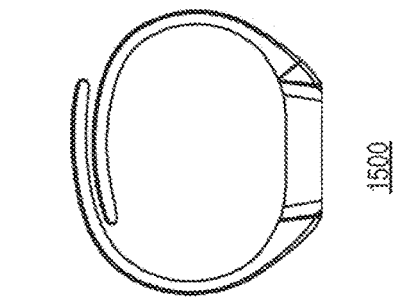
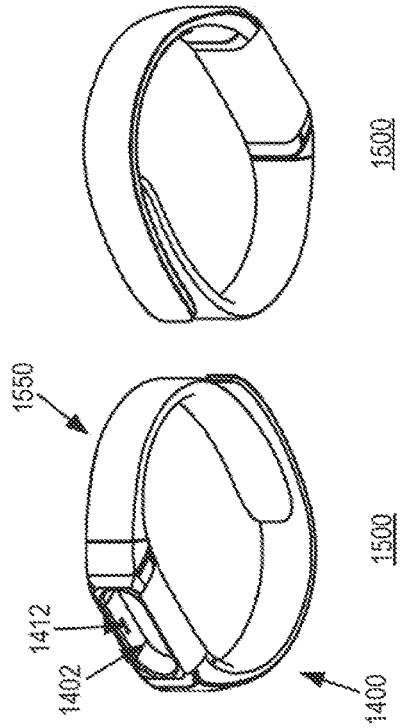

SYSTEMS, DEVICES, AND METHODS SUPPORTING MULTIPLE PHOTOGRAPHY MODES WITH A CONTROL DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

This application is a continuation of International Application No. PCT/CN2020/141967, filed Dec. 31, 2020, the entire content of which is incorporated herein by reference.

TECHNICAL FIELD

The present disclosure generally relates to a control device (e.g., handheld controller) and systems and methods associated with operation of the control device, and, more particularly, to systems, devices and methods for operating a control device, individually or collectively with one or more other devices, to support multiple photography modes.

BACKGROUND

Recent developments in consumer photography allow a user to use a personal camera to capture images of various moments in daily life. Consumer photography may include different forms, such as ground photography, aerial photography, or underwater photography. Existing consumer cameras may be limited to perform one form of photography, but difficult to satisfy the user's need to use one camera for multiple forms of photography. For example, a camera that is suitable for hand-held photography may not be compatible with drone-based aerial photography. Further, existing consumer cameras may be large and cumbersome to carry, thus hindering the user from fully utilizing a camera in a variety of ongoing activities (e.g., a hike, a conference, a work-out, a festivity, etc.).

Therefore, there exists a need for an imaging device that can compatibly work with other devices to support multiple photography modes when the user engages in various activities.

SUMMARY

Consistent with embodiments of the present disclosure, a handheld controller configured to be removably coupled to and control an imager is provided. The handheld controller comprises at least one processor; and memory coupled to the at least one processor and storing instruction that, when executed by the at least one processor, cause the at least one processor to perform operations including: in accordance with the imager being coupled to the handheld controller, controlling the imager to capture a first group of images; and in accordance with the imager being separate from the handheld controller and carried by a movable object, controlling the imager to capture a second group of images or controlling the movable object.

There is also provided a handheld controller configured to control an imager configured to capture one or more images. The handheld controller comprises a carrier body including a cavity on a first side thereof, the cavity configured to removably couple to at least a portion of the imager; at least one processor; and memory coupled to the at least one processor and storing instructions that, when executed by the at least one processor, cause the processor to perform operations including: detecting orientation of the imager; in accordance with the imager being coupled to the cavity with an optical assembly of the imager facing outward on the first side, controlling the imager to capture the one or more images.

There is further provided a handheld controller configured to control an imager. The handheld controller comprises a carrier body including a cavity on a first side thereof, the cavity configured to removably couple to at least a portion of the imager including a first display; a second display on a second side opposite to the first side of the carrier body; at least one processor; and memory coupled to the at least one processor and storing instructions that, when executed by the at least one processor, cause the at least one processor to perform operations including: in accordance with the imager being received in the cavity with the first display of the imager facing outward on the first side of the carrier body, detecting a user input via the second display on the second side of the carrier body; and controlling the first display or the second display to display one or more images captured by the imager.

There is further provided a system comprising: an imager; and a handheld controller removably coupled to the imager, the handheld controller including: at least one processor; and memory coupled to the at least one processor and storing instructions that, when executed by the at least one processor, cause the at least one processor to perform operations including: in accordance with the imager being coupled to the handheld controller, controlling the imager to capture a first group of images; and in accordance with the imager being separate from the handheld controller and carried by a movable object, controlling the imager to capture a second group of images or controlling the movable object.

There is further provided a system comprising: an imager configured to capture one or more images; and a handheld controller removably coupled to the imager, the handheld controller including: a carrier body including a cavity on a first side thereof, the cavity configured to removably coupled to at least a portion of the imager; at least one processor; and memory coupled to the at least one processor and storing instructions that, when executed by the at least one processor, cause the at least one processor to perform operations including: detecting an orientation of the imager; and in accordance with the imager being coupled to the cavity with an optical assembly of the imager facing outward on the first side, controlling the imager to capture the one or more images.

There is further provided a system comprising: an imager; and a handheld controller removably coupled to the imager, the handheld controller including: a carrier body including a cavity on a first side thereof, the cavity configured to removably couple to at least a portion of the imager including a first display; a second display on a second side of the carrier body opposite to the first side of the carrier body; at least one processor; and memory coupled to the at least one processor and storing instructions that, when executed by the at least one processor, cause the at least one processor to perform operations including: detecting an orientation of the imager; in accordance with the imager being received in the cavity with the first display of the imager facing outward on the first side of the carrier body, detecting a user input via the second display on the second side of the carrier body; and controlling the first display or the second display to display one or more images captured by the imager.

There is further provided a system configured to control a movable object, and the handheld system comprises: a first imager; and a handheld controller removably coupled to the first imager, the handheld controller including: at least one processor; and memory coupled to the at least one processor and storing instructions that, when executed by the at least one processor, cause the at least one processor to perform operations including: in accordance with the first imager being coupled to the handheld controller, controlling the first imager to capture a first group of images while controlling operation of the movable object; and in accordance with the first imager separate from the handheld controller and carried by a movable object, controlling operation of at least one of the first imager or the movable object.

There is further provided a controlling system comprising: a handheld controller including a display; and a remote controller including: a first wireless transmitter configured to communicate with and control a movable object, and a controller body including a cavity configured to removably receive therein and couple to at least a portion of the handheld controller so that the display of the handheld controller is exposed.

There is further provided an imaging system comprising: a movable object; a handheld controller configured to control movement of the movable object; and an imager removably couplable to the movable object or the handheld controller, wherein the handheld controller includes at least one processor and memory coupled to the at least one processor and storing instructions that, when executed by the at least one processor, cause the at least one processor to perform operations including: in accordance with the imager being coupled to the handheld controller, controlling the imager to capture a first group of images; and in accordance with the imager being coupled to the movable object, controlling, via communication with the imager or communication with the movable object, the imager to capture a second group of images.

There is further provided an imaging system comprising: a movable object; an imager removably couplable to the movable object or a handheld controller; the handheld controller configured to control the imager to capture one or more images; and a remote controller configured to control movement of the movable object, the remote controller including a controller body including a cavity configured to removably receive therein and couple to at least a portion of the handheld controller, wherein the handheld controller includes at least one processor and memory coupled to the at least one processor and storing instructions that, when executed by the at least one processor, cause the at least one processor to perform operations including: in accordance with the imager being coupled to the handheld controller, controlling the imager to capture a first group of images; and in accordance with the imager being coupled to the movable object, controlling, via communication with the movable object or communication with the imager, the imager to capture a second group of images.

There is further provided a wearable imaging system comprising: an imager configured to capture one or more images; and a wearable device comprising a carrier body including: a cavity to removably couple to at least a portion of the imager; a first connector disposed in the cavity for communicatively coupling to the imager to enable exchange of information between the wearable device and the imager; and a second connector configured to enable transmission of the one or more captured images to an external device through the wearable device when the wearable device is coupled to the external device via the second connector.

It is to be understood that both the foregoing general description and the following detailed description are exemplary and explanatory only and are not restrictive of the invention, as claimed. Other features of the present disclosure will become apparent from the specification, claims, and appended figures.

BRIEF DESCRIPTION OF THE DRAWINGS

FIGS. 1A, 1B, 1C, 1D, 1E, 1F, 1G, 1H, 1I, and 1J show schematic diagrams of an imaging device from different viewing angles, in accordance with embodiments of the present disclosure.

FIGS. 5A, 5B, 5C, 5D, 5E, 5F, 5G, 5H, 5I, and 5J show schematic diagrams of a system including a control device coupled to an imaging device in an inward-facing orientation, from different viewing angles, in accordance with embodiments of the present disclosure.

FIGS. 7A and 7B show flow diagrams of example processes of operating of an imaging device held by a control device, in accordance with embodiments of the present disclosure.

FIGS. 8A, 8B, 8C, 8D, 8E, 8F, 8G, 8H, 8I, and 8J show schematic diagrams of a control terminal, provided as a remote controller, from different viewing angles, in accordance with embodiments of the present disclosure.

FIGS. 11A, 11B, 11C, 11D, 11E, 11F, 11G, 11H, 11I, and 11J show schematic diagrams of a movable object, provided as a UAV, from different viewing angles, in accordance with embodiments of the present disclosure.

FIGS. 12A, 12B, 12C, 12D, 12E, 12F, 12G, 12H, 12I, and 12J show schematic diagrams of a system, including an imaging device coupled to a UAV, from different viewing angles, in accordance with embodiments of the present disclosure.

FIGS. 14A, 14B, 14C, 14D, 14E, 14F, 14G, 14H, 14I, and 14J show schematic diagrams of a first component of a wristband from different viewing angles, in accordance with embodiments of the present disclosure.

FIGS. 15A, 15B, 15C, 15D, 15E, 15F, 15G, 15H, 15I, 15J, 15K, and 15L show schematic diagrams of a wristband from different viewing angles, in accordance with embodiments of the present disclosure.

DETAILED DESCRIPTION

Figure 1I:
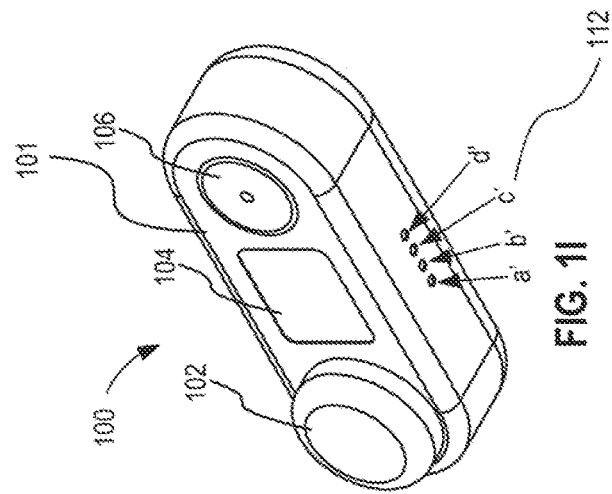

The following detailed description refers to the accompanying drawings. Wherever possible, same or similar parts are identified by the same reference numbers. While several illustrative embodiments are described herein, modifications, adaptations and other implementations are possible. For example, substitutions, additions, or modifications may be made to the components illustrated in the drawings. Accordingly, the following detailed description is not limited to the disclosed embodiments and examples. Instead, the proper scope is defined by the appended claims.

Consistent with embodiments of the present disclosure, a compact imaging device (e.g., an imager) is provided to be capable of working either independently, or working compatibly and in conjunction with different devices as image shooting platforms, such as a handheld device (e.g., a control device, or a handheld controller), a remote controller, a wearable device (e.g., a wristband), or a movable object (e.g., an unmanned aerial vehicle (UAV)), to support multiple modes of photography.

Further, a control device is provided to be capable of working either independently, or working compatibly and in conjunction with different devices, such as an imaging device or a remote controller, to support multiple modes of photography. The control device can control one or more other devices, such as the imaging device and/or the movable object, to provide multiple combination modes supporting various features. The user can easily select different groups of devices according to his or her needs.

The various image shooting modes may support, without being limited to, hand-held shooting, wearable shooting, sports shooting, aerial shooting, or underwater shooting, etc. As such, the disclosed compact imaging device can be conveniently used for various photography modes by freely switching among different image shooting modes.

The compact imaging device described in various embodiments of the present disclosure can be coupled to and function in association with different devices for different photography modes. Accordingly, image data is captured by one device—the compact imaging device—mounted on different image shooting platforms, making it easier for the user to view or edit the image data in one format by eliminating the need to collect data from different and unrelated source imaging devices, which may respectively require different data formats or resolutions. Further, as discussed herein, by combining multiple devices each including a display, such as the imaging device and the control device, multiple displays can be provided in one system, providing the user with an improved experience of viewing different content at the same time. For example, the user can view image content from different viewing perspectives on separate displays. In another example, the user can view, simultaneously, the captured image content and a control menu on the separate displays.

FIGS. 1A, 1B, 1C, 1D, 1E, 1F, 1G, 1H, 1I, and 1J show schematic diagrams of an imaging device 100 (e.g., an imager) from different viewing angles, in accordance with embodiments of the present disclosure. In some embodiments, imaging device 100 is a compact camera capable of capturing one or more images including photos and/or videos, recording audio signals, storing captured image data and/or recorded audio data, displaying the image data, and/or communicating the captured image data and/or audio data with another device, such as an external image shooting platform disclosed herein.

Imaging device 100 comprises a body 101, an optical assembly 102 located on body 101 and configured to capture one or more images, a display 104 adjacent to optical assembly 102 on body 101, and an input mechanism 106 on body 101. As shown in FIG. 1B, optical assembly 102, display 104, and the input mechanism 106 are disposed on one side, e.g., a side 120 (FIG. 1D), of imaging device 100. In some embodiments, side 120 of imaging device 100, as viewed in FIG. 1B, has a stadium shape including a first semicircular end 130 conforming to a portion of optical assembly 102, and a second semicircular end 132, opposite to first semicircular end 130, conforming to a portion of input mechanism 106. As described herein, optical assembly 102, display 104, and the input mechanism 106 may be in other placement. For example, first semicircular end 130 may conform to a portion of input mechanism 106, and second semicircular end 132 conforming to a portion of optical assembly 102.

Figure 1H:
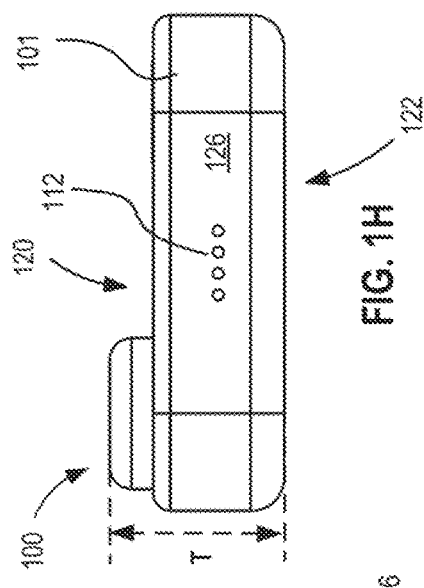
Figure 1J:
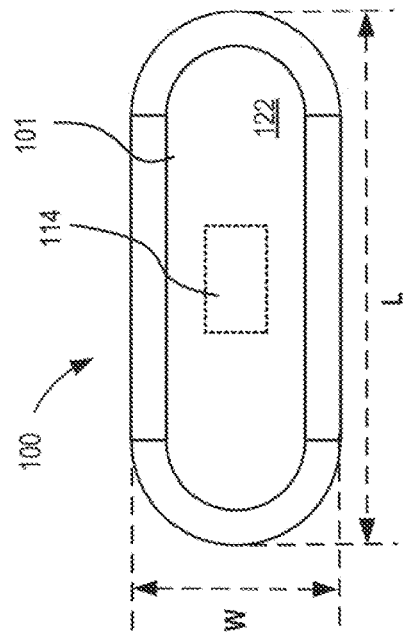

In some embodiments as shown in FIGS. 1H and 1J, imaging device 100 has a length (L) in a range of 20 mm to 60 mm, a width (W) in a range of 6 mm to 50 mm, and a thickness (T) in a range from 8 mm to 30 mm. For example, imaging device 100 may be 50 mm long, 20 mm wide, and 10 mm thick. It is appreciated that imaging device 100 is not limited to the shape, dimension, or arrangement of components described herein for illustrative purpose. Imaging device 100 may have any other suitable shape, dimension, or arrangement of components that may support imaging device 100 to work individually or in association with other devices, such as a control device (e.g., a handheld controller 300), a movable object such as a UAV (e.g., a UAV 1100 in FIG. 11A), a wristband (e.g., a wristband 1500 in FIG. 15A), or any other devices.

Figure 2:
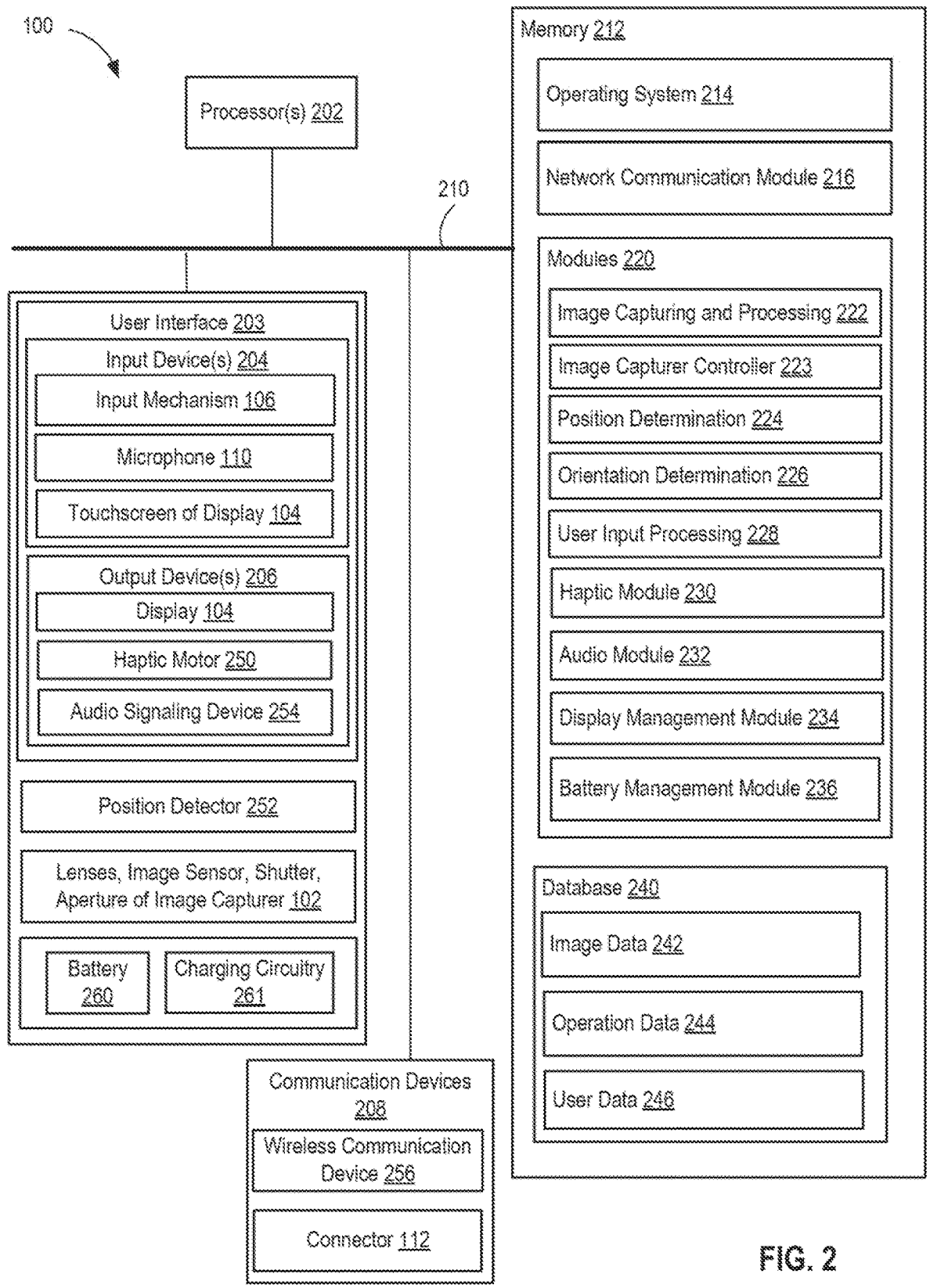
FIG. 2 shows a block diagram of an example of an imaging device configured in accordance with embodiments of the present disclosure.

Optical assembly 102 comprises one or more optical lenses, a shutter, an aperture, and an image sensor (FIG. 2). In some embodiments, the image sensor has a size of 1/1.7-inch, 1/2.3-inch, 1/3.2-inch, or any other suitable sensor size. A field of view (FOV) of the one or more optical lenses can cover an angular area of 120° to 180°. The one or more optical lenses may be fixed lenses, extendable lenses, or removable lenses. In some embodiments, optical assembly 102 may slightly protrude from surface of body 101 as shown in FIGS. 1D and 1E. In other embodiments, optical assembly 102 may be flush with surface of body 101. In some other embodiments, optical assembly 102 has a circular shape as shown in FIG. 1B.

Display 104 is configured to display information of optical assembly 102, such as sizes of the optical lens(es), aperture size, shutter speed, or shooting status of optical assembly 102. Display 104 may be a touchscreen configured to detect a user selection of the one or more parameters. In one example, display 104 is configured to display one or more options associated with operating optical assembly 102, such as triggering the shutter of optical assembly 102 to capture the one or more images. Display 104 is configured to display the one or more images captured by optical assembly 102. Display 104, when provided as a touchscreen, may be configured to detect a user interaction with the displayed captured images, such as selecting an area of an image, editing, saving, exporting, or other management operations on the captured images. Display 104 can also display information associated with a shooting status, such as whether an orientation of imaging device 100 relative to the view to be captured is directed to capturing selfie images or first-person-view (FPV) images. Display 104 is a liquid crystal display (LCD), a light-emitting diode (LED) display, an organic LED display, a quantum dot (QLED) display, or any other suitable type of display screen. In some embodiments, display 104 has a square or a rectangular shape, as shown in FIG. 1B.

In some embodiments, input mechanism 106 is a button, such as a multi-functional button, on body 101 configured to receive a user input. Input mechanism 106 is used to power on or off imaging device 100, e.g., including turning on or off display 104. In some embodiments, once imaging device 100 is on, a single press on input mechanism 106 corresponds to an instruction to capture one or more single images, or photos. Meanwhile a double press on input mechanism 106 corresponds to an instruction to capture a video comprising a series of images. Input mechanism 106 may be coupled to the shutter of capturer 102 such that when input mechanism 106 is pressed, the shutter is released to cause light to be captured by the one or more lenses, directed to the aperture, and received by the image sensor for recording image data associated with one or more images. Input mechanism 106 may also be configured as a navigation button which can be used to select menu items displayed on display 104. In some embodiments, input mechanism 106 has a circular shape as shown in FIG. 1B.

In some embodiments, optical assembly 102, display 104, and input mechanism 106 are aligned on one side, such as side 120 (FIGS. 1D and 1F), of body 101 of imaging device 100, as shown in FIG. 1B. For example, display 104 is located on an area of body 101 between optical assembly 102 and input mechanism 106. Optical assembly 102, display 104, and input mechanism 106 can also be aligned in any other suitable sequence, such as optical assembly 102 between display 104 and input mechanism 106, or input mechanism 106 between optical assembly 102 and display 104. Imaging device 100 can be held or carried for using by a user in either a horizontal orientation (e.g., FIG. 1B) or a vertical orientation. By aligning optical assembly 102, display 104, and input mechanism 106 on one side, imaging device 100 may have a more compact structure. Further, when optical assembly 102, display 104, and input mechanism 106 are on one side of imaging device 100, they may present a 180-degree rotational symmetry. For example, the individual shape and/or the placement of optical assembly 102, display 104, and input mechanism 106 ensures, when imaging device 100 is held single-handed by either a left-handed user or a right-handed user to take a selfie image, that a finger of the user does not block imaging capturer 102 when the user's finger reaches for input mechanism 106 to press the shutter. In addition to the convenience and intuitive design for a user, the alignment and symmetry as described herein may also appear to be simple, elegant, and pleasing for an improved user experience.

It is appreciated that the locations of optical assembly 102, display 104, and input mechanism 106 are disclosed as exemplary embodiments for illustrative purposes and not intended to be limiting. One or more of optical assembly 102, display 104, or input mechanism 106 can be disposed on any other locations on any side of imaging device 100, such as sides 120, 122, 124, 126, 128, or 129, that is ergonomically feasible for a user to operate imaging device 100. For example, input mechanism 106 may be disposed on side 124 between side 120 and side 122 shown in FIG. 1E, or side 126 opposite to side 124 and between sides 120 and 122 shown in FIG. 1H, while optical assembly 102 and display 104 are disposed on side 120 or 122. Optical assembly 102 and display 104 may be disposed on the same side of imaging device 100. Alternatively, optical assembly 102 and display 104 may be disposed on opposing sides. Further, optical assembly 102, display 104, and input mechanism 106 may be on one side, but not aligned. Any two elements selected from optical assembly 102, display 104, and input mechanism 106 may be disposed side-by-side, while a third element may be disposed underneath or above the other two elements. For example, capturer 102 and display 104 may be disposed side-by-side on one side of imaging device 100. Mechanism 106 may be disposed above or under display 104.

In some embodiments as shown in FIGS. 1C and 1E, imaging device 100 comprises an audio receiving device, comprising a built-in microphone 110, for detecting, receiving, and/or capturing audio data. Built-in microphone 110 may further work in association with one or more processors, such as processor(s) 202 in FIG. 2, for storing the audio data received by built-in microphone 110 in one or more memories, e.g., memory 212 in FIG. 2. Built-in microphone 110 can record audio data associated with the images captured by optical assembly 102, such as sound in the environment and/or human voice in a video. In some embodiments, built-in microphone 110 can capture audio data corresponding to speech command for operating imaging device 100. Built-in microphone 110 is located on an edge side, such as side 124, between sides 120 and 122 as shown in FIGS. 1C and 1E. Built-in microphone 110 may be designed or positioned to minimize possible interference with audio recording. For example, built-in microphone 110 may be located on side 124 and closer to optical assembly 102 than to input mechanism 106 to avoid possible noise or recoding interference from user input received on input mechanism 106. It is appreciated that the position of built-in microphone 110 shown in FIGS. 1A and 1E are examples for illustrative purpose and not intended to be limiting. Built-in microphone 110 can be positioned on any other side, such as side 126 (FIG. 1H), side 120, side 122, or any of the curve sides along the outer circle of first semicircular end 130 or second semicircular end 132. Built-in microphone 110 can also be disposed closer to first semicircular end 130, second semicircular end 132, or in the middle of the corresponding side.

Figure 1G:
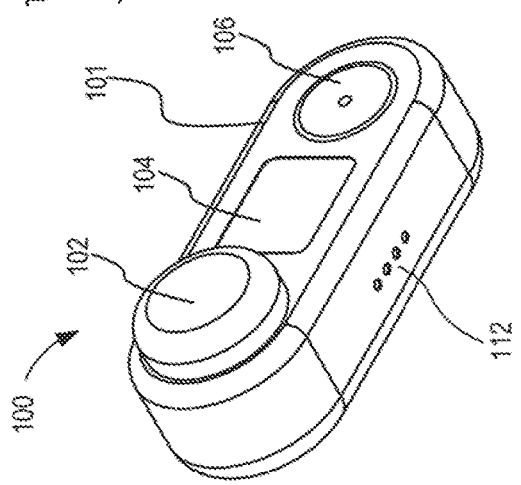

In some embodiments as shown in FIGS. 1G, 1H, and 1I, imaging device 100 comprises a connector 112 coupled to circuitry in imaging device 100 that is configured for data and/or power exchange with an external device. As described in the present disclosure, imaging device 100 is receivable in a cavity of an external device. For example, imaging device 100 may be coupled to the external device, such as a control device, a UAV, a wristband, or any other suitable external device, via direct contact between connector 112 and a corresponding connecting structure on the external device.

Imaging device 100 is configured to exchange data that has been captured by or stored on imaging device 100 with the external device via contact by connector 112. A battery of imaging device 100 may be charged by the external device via connector 112 in conjunction with charging circuitry described below with reference to FIG. 2. Connector 112 includes a set of contacts, such as 2, 4, 6, 8, or any other suitable number of contacts that when in contact with a set of corresponding contacts on the external device, support one or more data formats, such as USB data format, used for communication with the external device. The set of contacts may be composed of metal, metallic polymer, or any other suitable conductive or semi-conductive material. Connector 112 is located on an edge side, such as side 126, between sides 120 and 122 and opposite to side 124, as shown in FIG. 1H. For example, connector 112 including four metal contacts is provided in the middle of side 126. Alternatively, connector 112 may be located on side 124, side 120, side 122, an outer edge side of semicircular end 130, or an outer edge side of semicircular end 132 in any suitable arrangement.

In some embodiments, imaging device 100 comprises another connector, provided as a connector 114 on side 122 as shown in FIG. 1J, configured to removably attach imaging device 100 to an external object during image capture by optical assembly 102. Connector 114 is disposed on side 122 opposite to side 120 that includes optical assembly 102. Connector 114 may instead be disposed on other sides, such as side 120, edge side 124 or 126, or end side 128 or 129. Connector 114 may include a hanging, tying, clipping, or snapping structure for removably attaching imaging device 100, via hanging, tying, clipping, or snapping, to a piece of clothing for taking FPV images. Connector 114 may include a magnet, disposed on the surface of side 122 or under the surface of side 122, and configured to attach imaging device 100 to an object, such as a refrigerator, or a cavity of an external device for receiving imaging device 100, via magnetic attraction. For example, the magnet of connector 114 may hold imaging device 100 in a receiving area, such as a cavity of a control device as described below with reference to FIGS. 3B and 4B. Another magnet may be disposed on or under the surface of side 120 to hold imaging device 100 in a receiving area, such as a cavity of control device, in a different orientation, as described below with reference to FIGS. 3B and 5B.

It is appreciated that the term "cavity" used throughout the present disclosure may refer to a hole, a depression, a recess, an indentation, a chamber, a containing area, a receiving area, a mounting area, or any other suitable structure on a surface of a corresponding device. The cavities described in the present disclosure comprise one or more sides including a bottom inside the cavity.

FIG. 2 shows a block diagram of an example of imaging device 100 configured in accordance with embodiments of the present disclosure. Imaging device 100 comprises one or more processors 202 for executing modules, programs, and/or instructions stored in a memory 212 and thereby performing predefined operations; one or more network or other communications devices provided as communication devices 208; and one or more communication buses 210 for interconnecting these components.

Imaging device 100 comprises a user interface 203 including one or more input devices 204, such as input mechanism 106, the audio recording device provided as microphone 110, display 104 including a touchscreen; and one or more output devices 206, such as display 104, a haptic motor 250, and an audio signaling device 254.

Haptic motor 250 of imaging device 100 is configured to generate a haptic notification associated with a user interaction, such as receiving a user input on input mechanism 106 or detecting a finger touch on display 104 including a touchscreen. Haptic motor 250 comprises an actuator, such as a vibration motor or other suitable motor, configured to generate a vibrating sensation, pulsating touch sensation, a stinging sensation, or other types of haptic sensation, when the user presses input mechanism 106 or uses a finger touch to perform an operation on the touchscreen of display 104.

Audio signaling device 254, such as a buzzer or a beeper, of imaging device 100 is configured to provide an audible notification associated with one or more operations. For example, audio signaling device 254 of imaging device 100 may generate an alarm when imaging device 100 captures one or more images by optical assembly 102. In some embodiments, imaging device 100 may not include a speaker for broadcasting audio data. As a result, audio signaling device 254 may function to provide alarms as privacy notifications associated with operations of imaging device 100, such as capturing images of one or more individuals.

In some embodiments, as shown in FIG. 2, imaging device 100 further comprises a position detector 252 configured to detect position data of imaging device 100 during image capture by optical assembly 102. The position data may be applied to at least one of the captured images when performing electronic image stabilization (EIS). The position data and the captured image data are processed by a module, e.g., an image capturing and processing module 222 in FIG. 2, for displaying the captured images on display 104 or an external display, such as a display of a mobile device. In some embodiments, the captured image data and the position data can also be sent to an external device, such as the mobile device, for processing and displaying the images after image stabilization. Imaging device 100 may include one or more internal clocks that can be synchronized for establishing association between the captured images and the position data. Position detector 252 of imaging device 100 includes one or more inertial sensors, such as inertial measurement unit (IMU) sensors, including accelerometers, gyroscopes, and/or magnetometers. Imaging device 100 may further includes other positioning sensors, such as a positioning system (e.g., GPS, GLONASS, Galileo, Beidou, GAGAN, RTK, etc.), motion sensors, and/or proximity sensors.

In some embodiments, position detector 252 can detect an orientation of imaging device 100, such as whether side 120 including optical assembly 102 faces the user to capture one or more selfie images, or an area of interest in the environment to capture one or more first-person-view (FPV) images. Position detector 252 may include a device based on a Hall sensor that detects the orientation of imaging device 100 received in a cavity of an external device. Position detector 252 can determine an alignment of the contacts of connector 112 relative to the set of corresponding contacts on the external device to determine the orientation of imaging device 100.

In some embodiments, communication devices 208 of imaging device 100 comprise a wireless communication device 256 configured to wirelessly communicate with one or more external devices, such as a control device, a UAV, a wristband, a mobile device, a personal computer, a server system, etc. For example, imaging device 100 can send image data captured by optical assembly 102 to the external device via wireless communication. Wireless communication device 256 may support any suitable wireless communication technology, such as Radio-frequency identification (RFID), Bluetooth communication, Wi-Fi, radio communication, cellular communication, ZigBee, infrared (IR) wireless, microwave communication, etc. Communication devices 208 of imaging device 100 further comprise connector 112 described herein.

Still referring to FIG. 2, processor(s) 202 may comprise any suitable hardware processor, such as an image processor, an image processing engine, an image-processing chip, a graphics-processor (GPU), a microprocessor, a microcontroller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component.

Memory 212 may include high-speed random access memory, such as DRAM, SRAM, or other random access solid state memory devices. In some embodiments, memory 212 includes non-volatile memory, such as one or more magnetic disk storage devices, optical disk storage devices, flash memory devices, or other non-volatile solid state storage devices. In some embodiments, memory 212 includes one or more storage devices remotely located from processor(s) 202. Memory 212, or alternatively one or more storage devices (e.g., one or more nonvolatile storage devices) within memory 212, includes a non-transitory computer readable storage medium. In some implementations, memory 212 or the computer readable storage medium of memory 212 stores one or more computer program instructions (e.g., modules 220), and a database 240, or a subset thereof that are configured to cause processor(s) 202 to perform one or more processes described herein.

Memory 212 of imaging device 100 includes an operating system 214 that includes procedures for processor(s) 202 to handle various system services and for performing hardware dependent tasks. Imaging device 100 may further include a network communication module 216 for connecting imaging device 100 to other devices via communication devices 208 and/or associated interface thereon, either wirelessly or in direct contact.

In some embodiments, each module of modules 220 comprises program instructions for execution by processor(s) 202 to perform a variety of functions. One or more of modules 220 described below may optionally be included based on whether the functionality associated with the corresponding module(s) is needed.

Modules 220 include an image capturing and processing module 222 configured to control optical assembly 102 to capture images, and process the captured images. For example, image capturing and processing module 222 may be configured to process the captured images by electronic image stabilization (EIS). Image capturing and processing module 222 may be configured to process image data of the captured image(s) for display on display 104 or an external display, such as a display of a control device or a mobile phone. Modules 220 include an optical assembly controller 223 configured to adjust one or more parameters of optical assembly 102 according to different photography modes, such as capturing selfie images, FPV images, aerial images, underwater images, sports images, images taken in a wearable mode, etc. For example, when imaging device 100 is used for taking selfie images, imaging device 100 is in a selfie photography mode, when one or more parameters of optical assembly 102, such as a focal length, a field of view, an aperture, an angle of view, a shutter speed, any other parameter(s), or combinations thereof, may be adjusted, e.g., by optical assembly controller 223, such that optical assembly 102 may be suitable for near-distanced portrait photography. Further, image capturing and processing module 222 may automatically add visual effects suitable for portrait photos to the captured raw images of the selfie images. In another example, when imaging device 100 is used for taking FPV images, imaging device 100 is in an FPV photography mode, when one or more parameters of optical assembly 102, such as the focal length, the field of view, the aperture, the angle of view, the shutter speed, any other parameter(s), or combinations thereof, may be adjusted, e.g., by optical assembly controller 223, such that optical assembly 102 may be suitable for taking FPV images, including but not limited to scenery photography, macro photography, or panorama photography, etc. Image capturing and processing module 222 may automatically add visual effects suitable for scenery photos to the captured raw images of the FPV images.

Figure 4C:
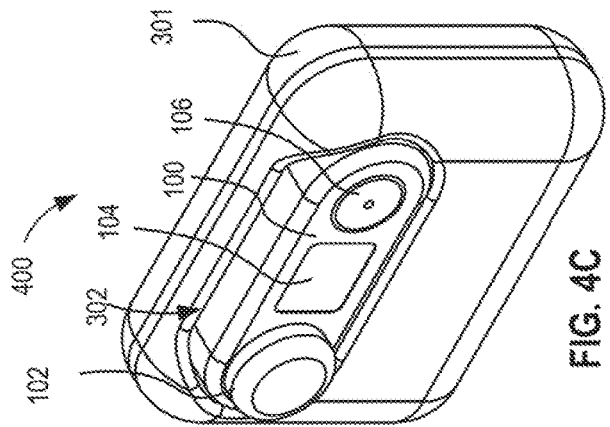
FIGS. 4A, 4B, 4C, 4D, 4E, 4F, 4G, 4H, 4I, and 4J show schematic diagrams of a system including a control device coupled to an imaging device in an outward-facing orientation, from different viewing angles, in accordance with embodiments of the present disclosure.
Figure 4F:
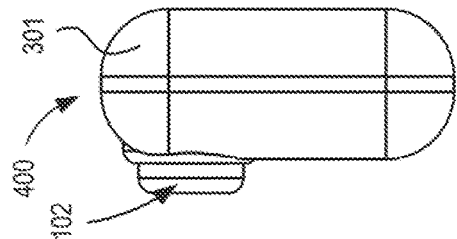
Figure 4B:
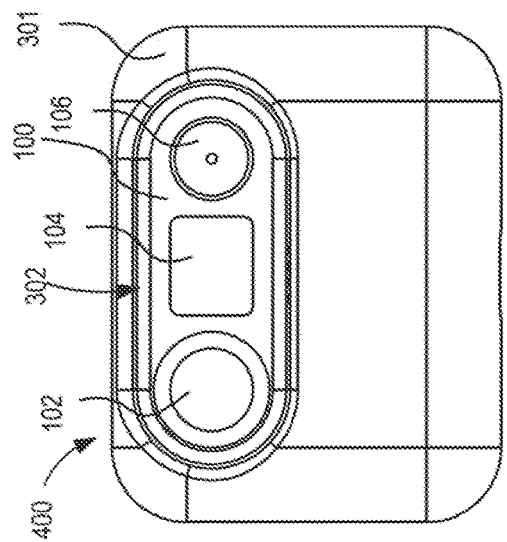
Figure 4A:
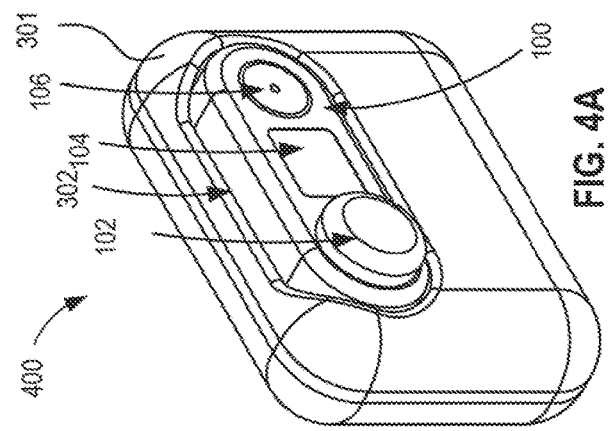
Figure 4D:
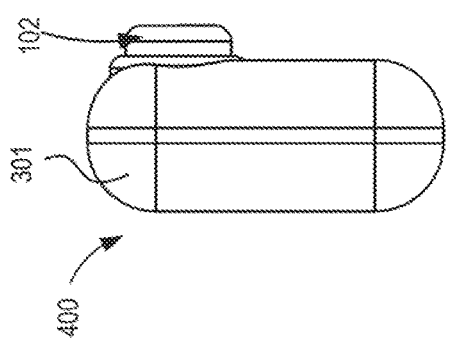
Figure 4I:
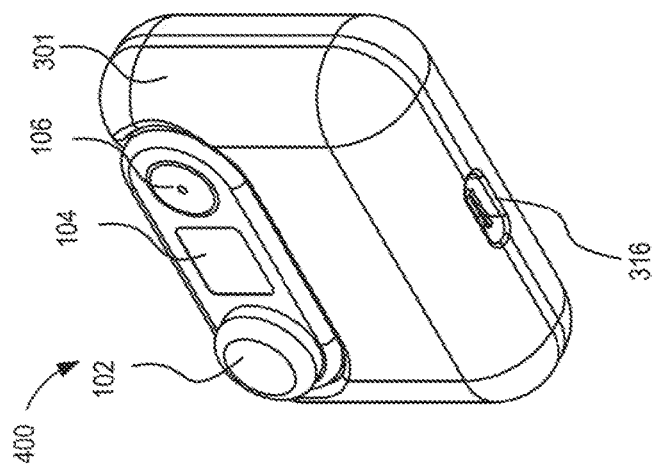
Figure 4H:
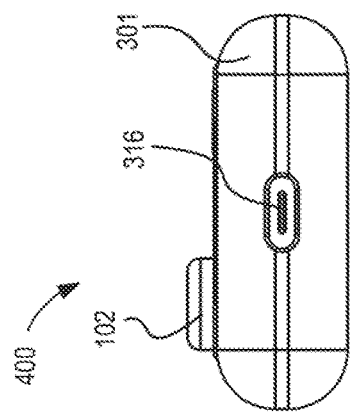
Figure 4J:
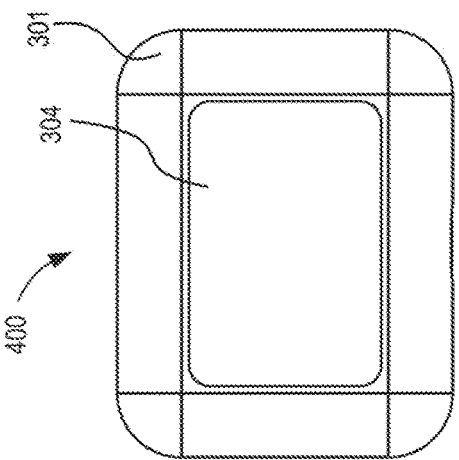
Figure 4G:
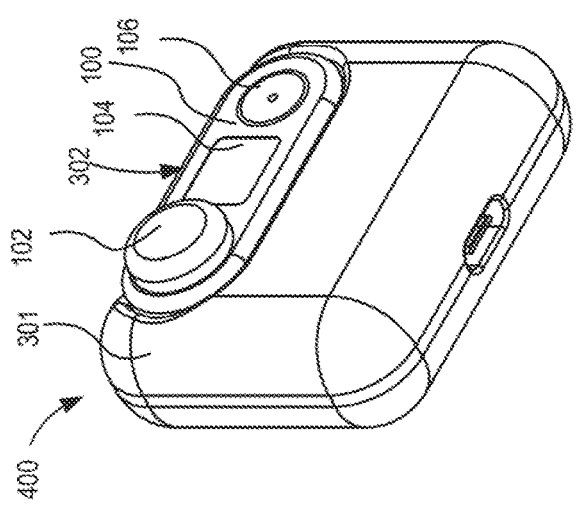
Figure 5I:
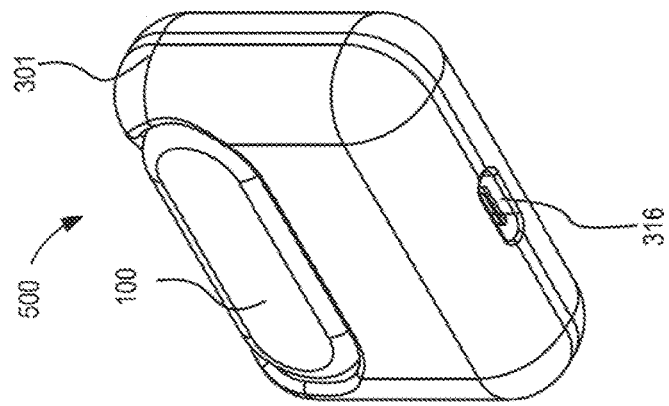
Figure 5H:
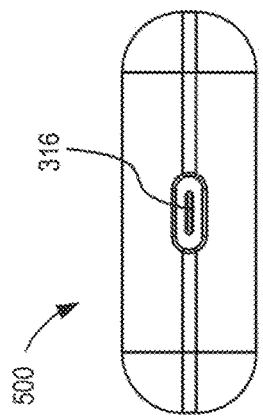
Figure 5J:
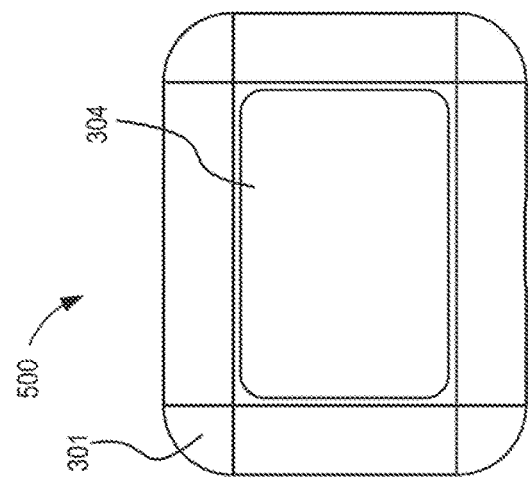
Figure 5G:
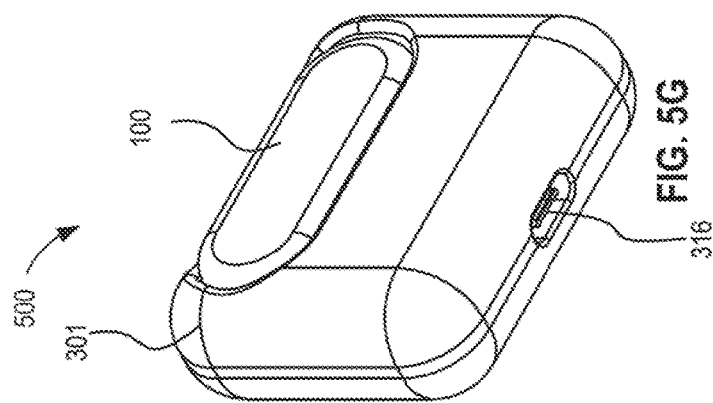

Modules 220 include a position determination module 224 for determining position data associated with captured image data based on data detected by position detector 252. Modules 220 also include an orientation determination module 226 that can determine an orientation of imaging device 100 when coupled to an external device based on data detected by position detector 252, based on an alignment of the contacts of connector 112 relative to corresponding contacts of a connector on the external device, or based on a device including a Hall sensor for determining whether imaging device 100 faces outward or inward relative to the external device (e.g., control device 300, or movable object 1100, etc.). In some embodiments, imaging device 100 faces outward when optical assembly 102 faces outside and its field of view can include surrounding objects or environment (e.g., as shown in FIGS. 4A, 4B, and 4G). In some embodiments, imaging device 100 faces inward when imaging capturer 102 faces inside, and a portion of the external device may block the field of view of capturer 102 (e.g., as shown in FIGS. 5A, 5B, and 5G). Memory 212 stores instructions for execution by processor(s) 202 to control operation of imaging device 100 or the external device in accordance with the orientation determined by orientation determination module 226.

Modules 220 include a user input processing module 228, for processing various types of user input received by one or more user input devices 204. For example, user input processing module 228 may be configured to process data associated with user input received on input mechanism 106, audio data received by microphone 110, or data of a finger touch received on a touchscreen of display 104. Modules 220 include a haptic module 230, which when interfacing with haptic motor 250, can generate the haptic notification. Modules 220 include an audio module 232 for processing data associated with audio signaling device 254 for generating the audio notification. Modules 220 include a display management module 234 for managing display of image data and/or operation data on display 104. Modules 220 include a battery management module 236 for determining a battery status of a battery 260, managing charging circuitry 261, and other suitable functions associated with battery usage.

In some embodiments, database 240 stores image data 242 of image(s) captured by imaging capturer 102, operation data 244 associated with photograph modes or operation of optical assembly 102, and user data 246 including user account information, user activity data, user preference settings, etc.

Details associated with modules 220 and database 240 are further described below with reference to example processes of the present disclosure. It is appreciated that modules 220 and/or database 240 are not limited to the scope of the example processes discussed herein. Modules 220 may further be configured to cause processor(s) 202 to perform other suitable functions, and database 240 may store information needed to perform such other suitable functions.

In some embodiments, imaging device 100 can be used independently. For example, when used alone, imaging device 100 can be handheld in a single hand or both hands to capture images, or have imaging device 100 attached to a piece of clothing, i.e., wearable, as a sports camera. Imaging device 100 can also work in combination with one or more other devices. For example, imaging device 100 can be coupled to an object, such as a wearable device (e.g., a wristband), or an external device, such as a handheld device (e.g., a control device), for taking images. In some examples, imaging device 100 can also be mountable to a UAV for taking aerial images during movement of the UAV. In some embodiments, imaging device 100 may be coupled to, e.g., received in a cavity of, a first external device, while in communication with a second device located remotely from the first external device. For example, imaging device 100 may be received in a cavity of a wearable device (such as a wristband as described herein) that is worn by a user, and the user can control the wearable device and/or imaging device 100 via a handheld device (e.g., a control device). In another example, imaging device 100 may be received in a cavity onboard a UAV for taking aerial images, and the user can control the imaging device 100 and/or the UAV via a handheld device, a remote controller, or the handheld device coupled to (e.g., received in a cavity of) the remote controller.

FIGS. 3A, 3B, 3C, 3D, 3E, 3F, 3G, 3H, 3I, and 3J show schematic diagrams of a control device 300 from different viewing angles, in accordance with embodiments of the present disclosure. Control device 300 may also be referred to as a handheld device, a base, a holder, a container, a handheld controller, or a storing device. In some embodiments, control device 300 is a handheld device capable of carrying another device in a cavity 302 of a carrier body 301. FIGS. 4A, 4B, 4C, 4D, 4E, 4F, 4G, 4H, 4I, and 4J show schematic diagrams of a system 400 (also referred to as a handheld system) including control device 300 with imaging device 100 received in cavity 302 in an outward-facing orientation, from different viewing angles, in accordance with embodiments of the present disclosure. FIGS. 5A, 5B, 5C, 5D, 5E, 5F, 5G, 5H, 5I, and 5J show schematic diagrams of a system 500 including control device 300 with imaging device 100 received in cavity 302 in an inward-facing orientation, from different viewing angles, in accordance with embodiments of the present disclosure. A user can hold system 400 to capture images using imaging device 100. The user can also hold system 500 to view images captured by imaging device 100. In some embodiments, control device 300 can be used to store imaging device 100, when imaging device 100 is not being used, to protect optical assembly 102 from being damaged or contaminated. In some embodiments, control device 300 can display image data, operation data, and/or charge battery 260 of imaging device 100.

Figure 3C:
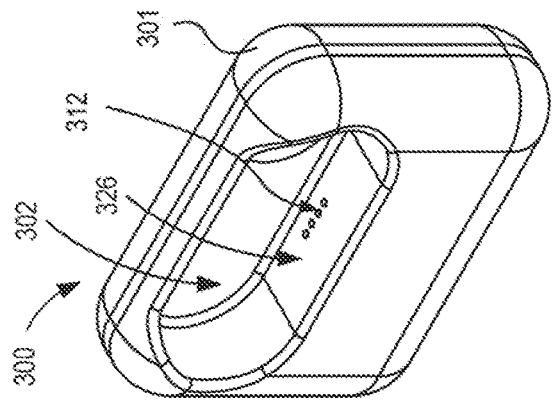
FIGS. 3A, 3B, 3C, 3D, 3E, 3F, 3G, 3H, 3I, and 3J show schematic diagrams of a control device from different viewing angles, in accordance with embodiments of the present disclosure.
Figure 3B:
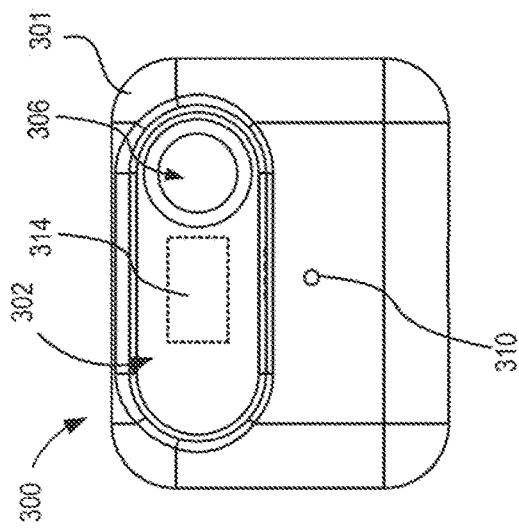
Figure 3A:
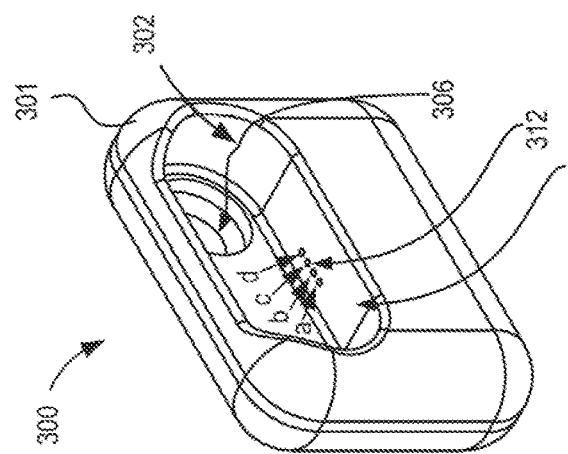
Figure 3F:
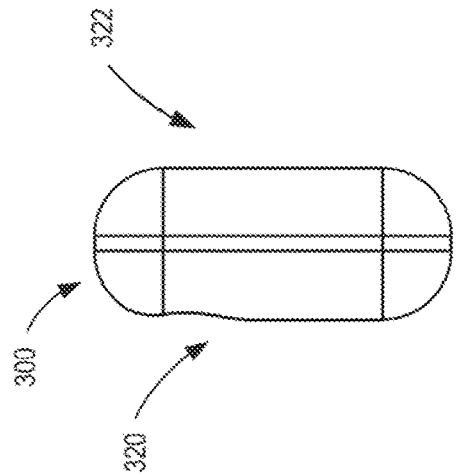
Figure 3E:
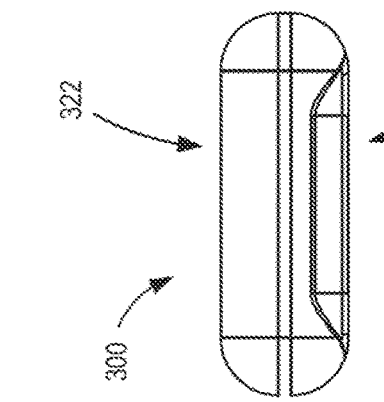
Figure 3D:
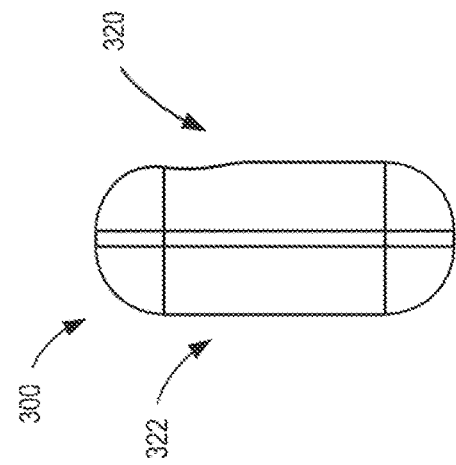

In some embodiments, as shown in FIG. 3B, control device 300 comprises carrier body 301 including cavity 302 open on a first side 320 (FIGS. 3D-3F) of carrier body 301. Cavity 302 is configured to receive imaging device 100 to capture one or more images as discussed herein. For example, as shown in FIGS. 4A, 4C, 5A, and 5C, when being received in cavity 302, at least a portion of imaging device 100 is coupled to control device 300. As shown in FIG. 3A, control device 300 includes a connector 312 located in cavity 302 for communicatively connecting to imaging device 100. As shown in FIGS. 3A and 3B, cavity 302 includes a containing area 306 on a back surface to accommodate optical assembly 102 when imaging device 100 is received in cavity 302 in an inward-facing orientation.

Figure 3I:
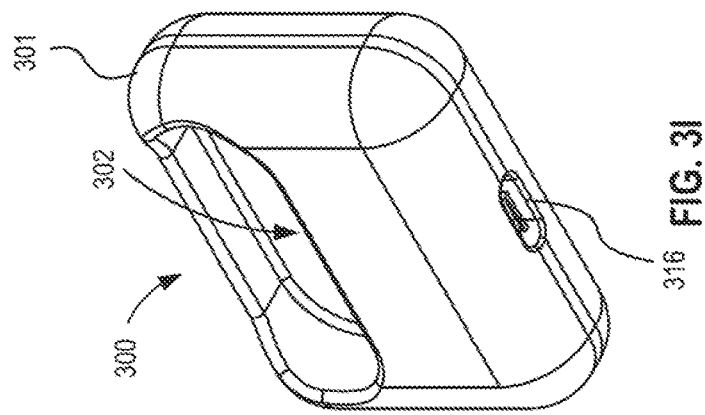
Figure 3H:
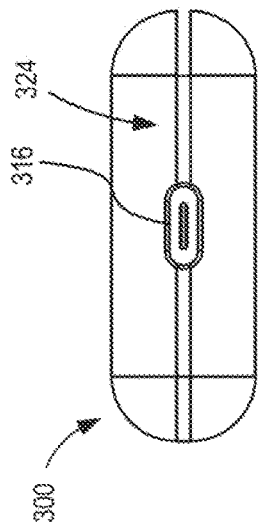
Figure 3J:
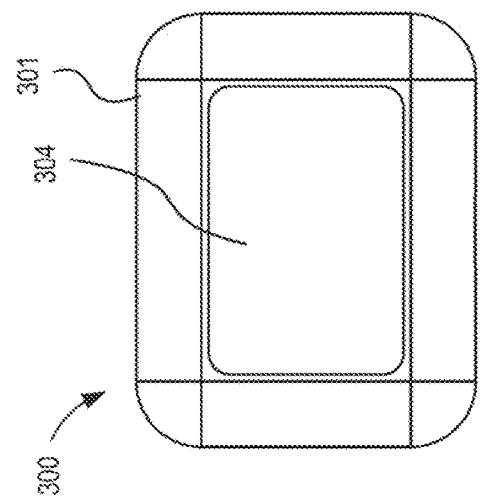

As shown in FIG. 3J, control device 300 comprises a display 304 located on a second side 322 (FIGS. 3D-3F) of carrier body 301 opposite to first side 320 of carrier body 301. Display 304 is configured to display images captured by imaging device 100. For example, the captured images may be received from imaging device 100 via connector 312 when imaging device 100 is received in cavity 302 as shown in FIG. 5J. In some embodiments, information being displayed on display 304 can also be received from a removable external storage device when coupled to control device 300, such as from an SD card, a portable hard drive, a thumb drive, a flash drive, or any other types of portable storage device. In some embodiments, control device 300 includes a memory connector corresponding to the removable storage device, such as an SD slot, a micro-SD slot, a micro USB, etc. As such, control device 300 can be coupled to a removable external memory storage device that can offer any memory storage size according to user preference. Display 304 may further be configured to display operation information for operating imaging device 100 or control device 300. For example, display 304 can display notifications related to capturing images by imaging device 100. In another example, display 304 can display information related to orientation of imaging device 100 relative to control device 300, such as whether optical assembly 102 is facing inward or outward when received in cavity 302.

In some embodiments, display 304 comprises a touchscreen configured to detect a finger touch of a user related to interaction with the displayed images, such as selecting an area of an image, editing, saving, exporting the images. The touchscreen of display 304 is also configured to detect a user input that interacts with operation information of control device 300 or imaging device 100, such as a menu selection, or power on or off. In some embodiments, the touchscreen of display 304 is also configured to detect a user input related to adjusting parameters of imaging device 100, or selecting photography modes for imaging device 100. When imaging device 100 is received in cavity 302, the touchscreen of display 304 may be used for receiving user instruction to operate imaging device 100, and the user instruction may be transmitted through connector 312. Imaging device 100 may be separate from control device 300 and the user instruction may be transmitted via wireless communication. Display 304 is a liquid crystal display (LCD), a light-emitting diode (LED) display, an organic LED display, a quantum dot (QLED) display, or any other suitable type of display screen. Display 304 has a square or a rectangular shape as shown in FIG. 3J.

In some embodiments as shown in FIG. 3B, a cross section of cavity 302 has a stadium shape corresponding to the shape of imaging device 100 as described with reference to FIGS. 1B and 1J. The dimension and shape of cavity 302 correspond to the dimension and shape of imaging device 100, such that when imaging device 100 is received in cavity 302, imaging device 100 may be secured in cavity 302 when control device 300 is in various motions, such as being carried around or flipped from one side to the opposite side, and/or in various orientations, such as in vertical position or with cavity 302 facing down. It is appreciated that a receiving area for receiving imaging device 100 on control device 300 may have any suitable shapes and/or dimensions. For example, imaging device 100 may be received in a cavity of control device 300 with a cross section having any suitable shape, such as a rectangle, a circle, an oval, a triangle, a hexagon, or any other suitable polygon. Such cavity may also be larger than the dimension of imaging device 100. Imaging device 100 may be securely attached to control device 300 using any other suitable method, such as via more secured magnetic attraction. In another example, the receiving area may be a more open area, such as with one, two, three, or no surrounding structures (e.g., sides, clamps, holders, pads, etc.) next to imaging device 100 when imaging device 100 is received in and attached to the receiving area.

In some embodiments as shown in FIGS. 3A and 3C, control device 300 comprises connector 312 coupled to circuitry in control device 300 that is configured to exchange data and/or power with imaging device 100. For example, in FIG. 4A, control device 300 is coupled to imaging device 100 via a contact between connector 112 of imaging device 100 (FIG. 1H) and connector 312 of control device 300. Control device 300 is configured to receive captured image data from imaging device 100 via connector 312. Connector 312 includes a set of contacts, such as 2, 4, 6, 8, or any other suitable number of contacts, that, when in contact with the contacts of connector 112 of imaging device 100, support one or more data formats, such as a USB data format, used for communicating with imaging device 100. An alignment of the set of contacts of connector 312 relative to the contacts of connector 112 on imaging device 100, e.g., the sequence of contacts between contacts a, b, c, and d (FIG. 3A) and corresponding contacts a', b', c', and d' (FIG. 1I) on imaging device 100, is detected to determine an orientation of imaging device 100 received in cavity 302.

The contacts of connector 312 may be composed of metal, metallic polymer, or any other suitable conductive or semi-conductive material. In some embodiments, the contacts of connector 312 are aligned on an edge side of cavity 302, such as side 326, as shown in FIG. 3A. For example, connector 312 including four metal contacts is provided on side 326, such as in the middle of side 326 or closer to any end of side 326. Alternatively, the contacts of connector 312 may be disposed on any other side, such as an upper side opposite side 326 in cavity 302, or any of the two inner sides of the opposing semicircular ends of cavity 302. The location of connector 312 may be determined according to the location of connector 112 on imaging device 100 such that when imaging device 100 is coupled to control device 300, e.g., received in cavity 302, the contacts of connector 112 are in contact with the contacts of connector 312.

In some embodiments, control device 300 comprises circuitry configured to charge battery 260 of imaging device 100 via connector 312. In some embodiments, control device 300 can automatically initiate charging or notify the user to charge battery 260 when control device 300 detects the receipt of imaging device 100 in cavity 302, for example, in response to detecting contact between contacts of connector 312 and corresponding contacts of connector 112 of imaging device 100. In some embodiments, control device 300 can receive a status of battery 260 of imaging device, such as a remaining percentage or remaining working time of battery 260, from imaging device 100. Control device 300 may be configured to charge battery 260 of imaging device 100 in accordance with a determination that the status of battery 260 satisfies a predetermined criterion, such as the power of battery 260 is below a threshold, such as 5%, 10%, 15%, or 20% of a fully charged status.

Figure 3G:
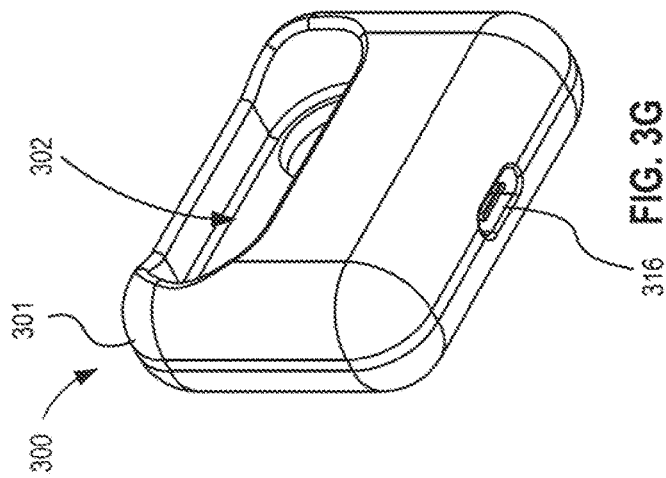

In some embodiments as shown in FIGS. 3G, 3H, and 3I, control device 300 comprises a connector 316, such as a USB connector, located on a side 324 between sides 320 and 322 of control device 300. Control device 300 can be coupled to an external device, such as a remote controller, a mobile phone, a computer, or any other device compatible to couple to connector 316. Control device 300 may exchange data with the external device via connection through connector 316. When imaging device 100 is received in cavity 302 of control device 300, connector 316 may function as a conduit together with connector 312, to transfer information between imaging device 100 and the external device coupled to control device 300 via connector 316. In one example, imaging device 100 may transfer captured images to the external device via control device 300. In another example, the external device may transfer data, such as system update data, to imaging device 100 via control device 300. Control device 300 may transfer image data or other information that has been received from imaging device 100 and stored in the external removable memory device, e.g., the SD card, to the external device via connector 316. The external device may charge a battery of control device 300 via connector 316. The external device may charge the battery of control device 300 and battery 260 of imaging device 100 together via connector 316, when imaging device 100 is coupled to control device 300.

In some embodiments as shown in FIG. 3B, control device 300 comprises a third connector, provided as a magnet 314, disposed in cavity 302 to hold, by magnetic attraction, imaging device 100 received in cavity 302. Magnet 314 may be on an inside surface of cavity 302, or below such surface without being visible in cavity 302. Magnet 314 may be attached to magnet 114 of imaging device 100 on side 122 when imaging device 100 is received in cavity 302 in an outward-facing orientation (FIG. 4B) via magnetic attraction between magnet 114 and magnet 314. Magnet 314 may also be attached to another magnet of imaging device 100 on side 120 to hold imaging device in an inward-facing orientation (FIG. 5B). In some embodiments, magnet 114 on side 122 may be sufficient to provide magnetic attraction to magnet 314 when imaging device 100 is in either inward-facing or outward-facing orientation. In some embodiments, imaging device 100 may include separate magnets on sides 120 and 122 respectively such that imaging device 100 can be placed in cavity 302 both inward and outward. In some embodiments, control device 300 further comprises a ferromagnetic material (such as a piece of iron) disposed in cavity 302 such that imaging device 100 with magnet 114 can be held in cavity 302 by magnetic attraction between the ferromagnetic material and magnet 114 on imaging device 100. Imaging device 100 can be placed in cavity 302 either inward or outward by attraction between one magnet on imaging device 100 and the ferromagnetic material on control device 300.

In some embodiments as shown in FIG. 3B, control device 300 comprises an audio receiving device, comprising a built-in microphone 310, for detecting, receiving, and/or capturing audio data. Built-in microphone 310 may further work with one or more processors, such as processor(s) 602 in FIG. 6, for storing the audio data received by built-in microphone 310 in one or more memories, e.g., memory 612 in FIG. 6. Built-in microphone 310 can receive audio data associated with the images captured by imaging device 100 when received in cavity 302, such as sound in the environment and/or human voice in a video. Built-in microphone 310 can receive audio data corresponding to speech command for operating imaging device 100. In some embodiments, control device 300 comprises an array of microphones, including microphone 310, disposed on different locations and configured to detect, capture, or record audio signal from multiple directions to provide a stereo localization effect associated with the location of the sound source. In some embodiments, when imaging device 100 is received in control device 300, the audio recording device on imaging device 100 can face a direction different from any of the multiple directions to which the audio recording devices of control device 300 faces. The sound recorded by different microphones on different devices can also provide a stereo localization effect associated with the location of the sound source. Control device 300 further comprises an audio processing device, such as an audio codec module, for decreasing noise of the captured, detected, or recorded audio information. In some embodiments, in addition to microphone 310, control device 300 comprises a wireless microphone receiver configured to wirelessly receive audio signals captured by a wireless microphone on control device 300. It is appreciated that the audio recording device(s) can be located on any side of control device 300, such as side 320 as shown in FIG. 3B, side 322, and/or any edge side of control device 300.

Figure 6:
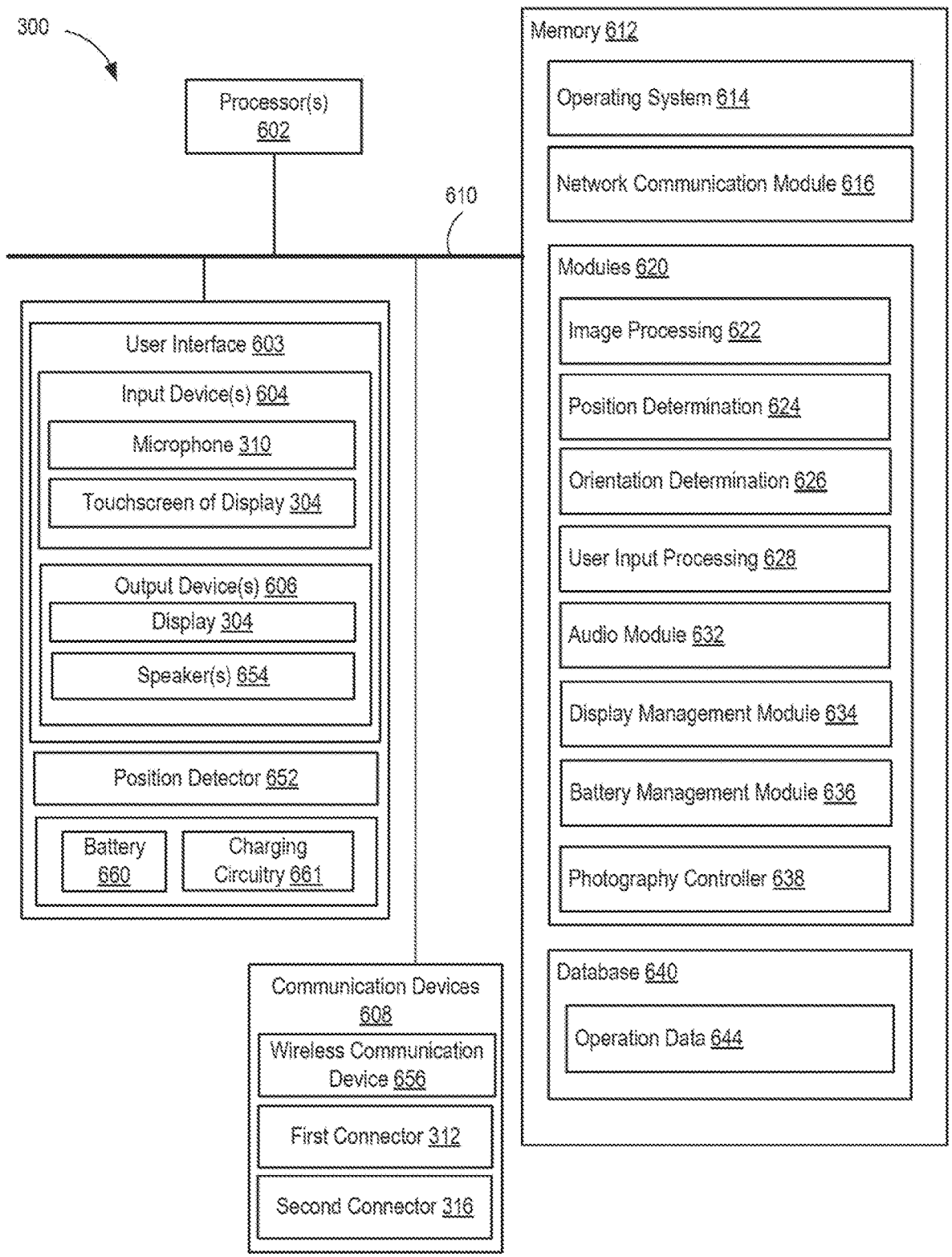
FIG. 6 shows a block diagram of an example of a control device configured in accordance with embodiments of the present disclosure.

FIG. 6 shows a block diagram of an example of control device 300 configured in accordance with embodiments of the present disclosure. Control device 300 comprises one or more processors 602 for executing modules, programs, and/or instructions stored in a memory 612 and thereby performing predefined operations, one or more network or other communications devices provided as communication devices 608, and one or more communication buses 610 for interconnecting these components.

In some embodiments, control device 300 comprises a user interface 603 including one or more input devices 604, such as an audio receiving device provided as microphone 310, and display 304 including a touchscreen; and one or more output devices 606, such as display 304, and an audio output device, such as speaker(s) 654. Speaker(s) 654 of control device 300 is configured to play audio data associated with the one or more images captured by imaging device 100. For example, a user may watch a video on display 304 shown in FIG. 5J while the audio data is played by speaker(s) 654 when imaging device 100 is received in control device 300. The user can also watch image data and listen to the audio data without imaging device 100 received in control device 300, when the image data and the audio data have been stored in a removable external memory storage device, such as an SD card, coupled to control device 300.

In some embodiments as shown in FIG. 6, control device 300 further comprises a position detector 652 configured to detect position data or an orientation of control device 300. Position detector 652 may be similar to position detector 252 of imaging device 100 as discussed with reference to FIG. 2, to detect position data when imaging device 100 is received by control device 300 and capturing images by optical assembly 102. The position data may be applied to at least one of the captured images to perform electronic image stabilization (EIS). The position data, either detected by position detector 252 of imaging device 100 or position detector 652 of control device 300, and the captured image data are processed by an image processing module 622, for displaying the captured images on display 304 or an external display, such as a display of a mobile device. Position detector 652 may include one or more inertial sensors, such as inertial measurement unit (IMU) sensors, including accelerometers, gyroscopes, and/or magnetometers. Control device 300 may further include other positioning sensors, such as a positioning system (e.g., GPS, GLONASS, Galileo, Beidou, GAGAN, RTK, etc.), motion sensors, and/or proximity sensors. In some embodiments, position detector 652 of control device 300 is configured to detect position data of control device 300, and the position data of control device 300 can be used for controlling imaging device 100 for capturing the one or more images. For example, when imaging device 100 is received in control device 300 and capturing one or more images on the ground, control device 300 can further control a movable object (e.g., UAV 1100) with another imaging device onboard the movable object configured to capture aerial images. In this situation, the position data of control device 300 can be used to generate instructions to both control imaging device 100 to capture ground images and adjust position and/or imaging capturing parameters of the other imaging device onboard the movable object to capture the aerial images. The ground images and the aerial images can be combined to provide more useful images from different viewing angles and perspectives to be selected and processed by the user.

In some embodiments as shown in FIGS. 4A and 5A, position detector 652 can detect an orientation of imaging device 100 received in cavity 302 of control device 300, to determine whether imaging device 100 is in an outward-facing orientation shown in FIG. 4A, or in an inward-facing orientation shown in FIG. 5A. In the outward-facing orientation shown in FIG. 4B, optical assembly 102 faces outward, and a user can hold carrier 300 to take selfie images or FPV images by image capture 102 of imaging device 100 received therein. In some embodiments as discussed above, position detector 652 can detect the orientation of control device 300 to determine whether the user intends to take selfie images or FPV images based on which direction the user points side 320 of control device 300. In the inward-facing orientation shown in FIG. 5B, optical assembly 102 faces inward, and the user can hold carrier 300 to view images taken by imaging device 100.

In some embodiments, position detector 652 may include a Hall sensor to detect the orientation of imaging device 100 received in cavity 302. Position detector 652 may detect the orientation of imaging device 100 received in cavity 302 in accordance with an alignment of the contacts of connector 112 relative to the corresponding contacts of connector 312. For example, contacts a', b', c', and d' of connector 112 shown in FIG. 1I may respectively correspond to contacts a, b, c, and d of connector 312 shown in FIG. 3A when imaging device 100 is received in the outward-facing orientation. In another example, contacts d', c', b', and a' of connector 112 may respectively correspond to contacts a, b, c, and d of connector 312 when imaging device 100 is received in the inward-facing orientation.

In some embodiments, communication devices 608 of control device 300 comprise a wireless communication device 656 configured to wirelessly communicate with one or more other devices, such as imaging device 100, a movable object such as a UAV, a wearable device such as a wristband, a mobile device, a personal computer, a server system, etc. For example, control device 300 can receive image data from imaging device 100 via wireless communication. Wireless communication device 656 may support any suitable wireless communication technology, such as radio-frequency identification (RFID), Bluetooth communication, Wi-Fi, radio communication, cellular communication, ZigBee, infrared (IR) wireless, microwave communication, etc. In some embodiments, communication devices 608 further comprise connector 312 and connector 316 described herein.

Still referring to FIG. 6, processor(s) 602 may comprise any suitable hardware processor, such as an image processor, an image processing engine, an image-processing chip, a graphics-processor (GPU), a microprocessor, a microcontroller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component.

Memory 612 may include high-speed random access memory, such as DRAM, SRAM, or other random access solid state memory devices. In some embodiments, memory 612 includes non-volatile memory, such as one or more magnetic disk storage devices, optical disk storage devices, flash memory devices, or other non-volatile solid state storage devices. In some embodiments, memory 612 includes one or more storage devices remotely located from processor(s) 602. Memory 612, or alternatively one or more storage devices (e.g., one or more nonvolatile storage devices) within memory 612, includes a non-transitory computer readable storage medium. In some implementations, memory 612 or the computer readable storage medium of memory 612, stores one or more computer program instructions (e.g., modules 620), and a database 640, or a subset thereof that are configured to cause processor(s) 602 to perform one or more processes described herein.

Memory 612 of control device 300 may include an operating system 614 that includes procedures for processor(s) 602 to handle various system services and for performing hardware dependent tasks. Control device 300 may further include a network communication module 616 for connecting control device 300 to other devices via communication devices 608 and/or associated interface thereon, either wirelessly or by direct contact.

In some embodiments, each module of modules 620 comprises program instructions for execution by processor(s) 602 to perform a variety of functions. One or more of modules 620 described below may optionally be included based on whether the functionality associated with the corresponding module(s) is needed.

Modules 620 include an image processing module 622 configured to process images for display on display 304. For example, image processing module 622 may be configured to process the images by electronic image stabilization (EIS). Image processing module 622 can also perform image recognition to image data to identify content of the image data. The processed data can be used to determine an orientation of control device 300, e.g., including whether side 320 faces toward a user or toward an area of interest in the environment, to determine a photography mode (e.g., selfie or FPV view). Modules 620 include a position determination module 624, for determining position data of control device 300 associated with captured image data, e.g., when imaging device 100 is received in cavity 302 and taking images, based on data detected by position detector 652. Modules 620 also include an orientation determination module 626. Orientation determination module 626 can detect an orientation of imaging device 100 received in cavity 302, based on the alignment of the contacts of connector 112 relative to the contacts of connector 312, or based on a device including a Hall sensor, to determine whether imaging device 100 faces outward or inward.

Modules 620 include a user input processing module 628, for processing various types of user input received by one or more user input devices 604. For example, user input processing module 628 may be configured to process data associated with user input received on touchscreen of display 304, or audio data received by microphone 310.

Modules 220 include an audio module 632 for processing audio data received by microphone 310. Audio module 632 may process audio data received on the array of microphones on control device 300, including microphone 310, for localization effect. Audio module 632 may include audio codec for audio compression and/or filters for reduce audio noise. Audio module 632 comprises a wireless microphone receiver to receive audio signal detected by microphone 310 including a wireless microphone. Modules 620 include a display management module 634 for managing display of image data and/or operation data on display 304. Modules 620 include a battery management module 636 for determining a battery status of battery 660, managing charging circuitry 661 associated with charging battery 660, and other suitable functions associated with battery usage. In some embodiments, battery 660 can be removable from control device 300 and display 304. When battery 660 of control device 300 is removed from control device 300, and imaging device 100 is received in control device 300, battery 260 of imaging device 100 can be configured to power display 304 on control device 300.

Modules 620 include a photography controller 638 configured to cause control device 300, with imaging device 100 received in cavity 302, to control operations of control device 300 and/or imaging device 100 related to various modes of photography. Photography controller 638 is configured to control operations of control device 300 and/or imaging device 100, in accordance with an orientation of imaging device 100 received in cavity 302. Photography controller 638 may also be configured to control operation of imaging device 100 held by control device 300.

In some embodiments, database 640 stores operation data 644 associated with operation of control device 300. Details associated with modules 620 and database 640 are further described with reference to example processes of the present disclosure. It is appreciated that modules 620 and/or database 640 are not limited to the scope of the example processes discussed herein. Modules 620 may further be configured to cause processor(s) 602 to perform other suitable functions, and database 640 may store information needed to perform such other suitable functions.

In some embodiments, control device 300 includes a built-in memory, such as memory 612, for storing program instructions needed for various system operation. As discussed herein, control device 300 can be coupled to a removable external memory device with a flexible size according to user preference for storing other types of data, such as image data. In such case, no built-in memory may be needed for storing the image data. In some embodiments, control device 300 further includes a built-in memory for storing the image data, user data, and/or other types of data in additional to the program instruction for system operation.

In some embodiments, control device 300 can include a gimbal device comprising one or more rotatable members configured to rotatably support the imaging device 100. For example, the gimbal device may be a 3-axis gimbal. The gimbal device may be removably or fixedly coupled to control device 300. Further, at least one rotatable member of the gimbal device may be removably or fixedly coupled to imaging device 100. In some embodiments, the gimbal device includes a first rotatable member supporting rotation about a yaw axis, a second rotatable member providing a tilting motion, and a third rotatable member supporting rotation about a roll axis.

FIG. 7A shows a flow diagram of an example process 700 of controlling operation of imaging device 100 held by control device 300, in accordance with embodiments of the present disclosure. As shown in FIGS. 4B and 5B, imaging device 100 is received in cavity 302 of control device 300 in different orientations, such as the outward-facing in FIG. 4B or the inward-facing in FIG. 5B. While being received in cavity 302, the set of contacts of connector 112 on imaging device 100 form contact with the corresponding set of contacts of connector 312 of control device 300. Process 700 may be performed by one or more components of control device 300, one or more modules 620, and database 640 of control device 300 shown in FIG. 6.

In step 702, an orientation of imaging device 100 received in cavity 302 is determined, e.g., by position detector 652 in conjunction with orientation determination 626. In some embodiments, the orientation may be related to whether imaging device 100 is inward-facing or outward-facing. The orientation may be determined by a direction associated with magnetic attraction between magnets 114 and 314 via a Hall sensor. In some embodiments, the orientation may be determined by relative alignment between corresponding contacts of connectors 112 and 312, or via an identifier recognition, or any other suitable methods.

In some embodiments, the orientation may be detected by control device 300 in response to receiving imaging device 100 and detecting the contact there between. The orientation may be detected by control device 300 automatically upon detecting the contact or in responsive to a user instruction. Alternatively, the orientation may be detected by imaging device 100, such as by position detector 252 in conjunction with position determination module 224, and control device 300 receiving the detection result. Control device 300 may generate different notifications, e.g., audio, haptic, and/or visual, corresponding to different orientations to notify the user.

In step 704, operation of imaging device 100 or control device 300 is controlled in accordance with the orientation determined in step 702. Control device 300 may activate or forego certain operation of control device 300. Control device 300 may allow or forego certain operation of imaging device 100. For example, operation that is compatible or optimized with the orientation is allowed, while operation that is incompatible or inefficient with the orientation is blocked. In some embodiments, photography controller 638 is configured to adjust one or more parameters of optical assembly 102 according to different photography modes, such as capturing selfie images, FPV images, aerial images, underwater images, sports images, images taken in a wearable mode, etc.

In some embodiments, in accordance with detecting that imaging device 100 is received in cavity 302 in the outward-facing orientation shown in FIGS. 4A, 4B, 4C, 4G, and 4I, step 704 of process 700 comprises activating one or more operations of the imaging device. For example, optical assembly 102 is activated and prepared for capturing one or more images, and/or display 104 is turned on, etc. When a user instruction is received to capture one or more images, process 700 further includes causing optical assembly 102 of imaging device 100 to capture the one or more images in response to the user instruction. The user instruction may be received on input mechanism 106 on imaging device 100 held by control device 300 shown in FIG. 4B. The user instruction may also be received on the touchscreen of display 304 of control device 300 shown in FIG. 4J. Alternatively or additionally, the user instruction may include a speech command received by microphone 310 on control device 300 and/or microphone 110 on imaging device 100. Display 304 of carrier display 300 can display the captured one or more images received from imaging device 100. The one or more captured images are transmitted from imaging device 100 to control device 300 via contact between connectors 112 and 312, and displayed on display 304 in real time as imaging device 100 captures the one or more images.

In some embodiments, while optical assembly 102 captures the one or more images, the audio receiving device of control device 300, such as microphone 310, can receive audio signals associated with the one or more images in real time, and work in association with processors 602 to record the received audio signals in memory 612. Control device 300 may allow imaging device 100 to display the captured one or more images on display 104 of imaging device 100, which is located adjacent to optical assembly 102 on imaging device 100 shown in FIG. 1B. The captured one or more images are displayed on display 104 of imaging device 100 and display 304 of control device 300 simultaneously. In some embodiments, a user may select an area of interest on the one or more captured images via a touchscreen of display 304, and image content of the selected area may be displayed on display 104 of imaging device.

In some embodiments, when imaging device 100 is received in cavity 302 in the outward-facing orientation, control device 300 may further determine an orientation of control device 300 based on image data captured by optical assembly 102 of imaging device 100 and transmitted to control device 300. In some embodiments, the determination of the orientation of control device 300 is performed in response to detecting a motion of the control device, such as position detector 652, e.g., IMU sensors, of control device 300 and/or position detector 252 of imaging device 100. For example, position detector 652 may detect rotation, tilt, elevation, or horizontal position relative to the earth, of the body of control device 300, to trigger performing the image recognition to determine the orientation of control device 300. In some embodiments, the determination of the orientation of control device 300 is performed periodically, e.g., once every thirty seconds, one minute, two minutes, five minutes, etc., by control device 300 based on the image data captured by optical assembly 102 and received from imaging device 100. In some embodiments, the determination of the orientation of control device 300 is performed in response to receiving a user instruction to capture one or more images.

Figure 4E:
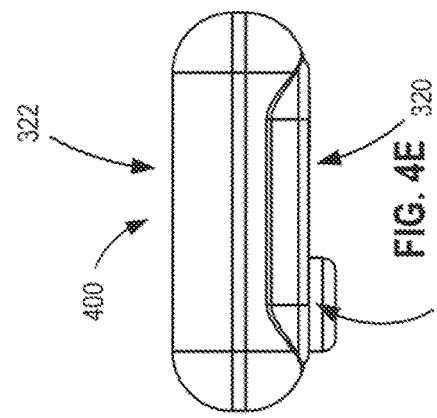

The orientation of control device 300 may be related to which direction side 320 shown in FIG. 4E is facing. The determined orientation of control device 300 may be used to determine whether the user intends to take selfie images or take images of an area on interest in the environment. Control device 300 may initiate a photography mode in accordance with the detected orientation of control device 300. The photography mode may be automatically initiated in response to detecting the orientation of control device 300, or started by a user selection. Imaging processing module 622 may process the captured image data to determine content of the image data in the field of view of optical assembly 102. Imaging processing module 622 can use any suitable image recognition algorithm to process the captured image data and identify the content. For example, when the content of the captured image data is related to an object or a scenery view in a distance, control device 300 can activate an FPV photography mode of imaging device 100. Alternatively, when the content of the captured image data is related to a user's face in a near distance (e.g., no farther than an arm-length), control device 300 can activate a selfie photography mode of imaging device 100.

As described herein, when imaging device 100 is in the selfie photography mode, one or more parameters of optical assembly 102, such as a focal length, a field of view, an aperture, an angle of view, a shutter speed, any other parameter(s), or combinations thereof, may be adjusted to be more suitable for near-distanced portrait photography. The parameter(s) may be automatically adjusted by imaging device 100 or in response to command data generated by control device 300 and received by imaging device 100. Further, image processing module 622 of control device and/or image capturing and processing module 222 of imaging device 100 may automatically add visual effects suitable for portrait photos to the captured raw images of the selfie images.

In some embodiments, in accordance with determining that side 320 in FIG. 4E of control device 300 holding imaging device 100 faces toward a user (FIG. 4B), control device 300 can activate functions of control device 300 and/or imaging device 100 related to the selfie photography mode. For example as shown in FIG. 4B, display 104 of imaging device 100 is activated for the user to preview the selfie image(s) to be taken. Further, the user can press input mechanism 106 on imaging device 100 to take one or more selfie images, such as photos or videos. The user can also press input mechanism 106 to power on or off optical assembly 102 and/or display 104. In some embodiments, input mechanism 106 can also be a multi-functional button to receive a user input associated with selecting menu items displayed on display 104.

When imaging device 100 is in the FPV photography mode, one or more parameters of optical assembly 102, such as a focal length, a field of view, an aperture, an angle of view, a shutter speed, any other parameter(s), or combinations thereof, may be adjusted to be more suitable for taking FPV images, including but not limited to scenery photography, macro photography, or panorama photography, etc. The parameter(s) may be automatically adjusted by imaging device 100 or in response to command data generated by control device 300 and received by imaging device 100. Further, image processing module 622 of control device and/or image capturing and processing module 222 may automatically add visual effects suitable for scenery photos to the captured raw images of the FPV images.

In some embodiments, in accordance with determining that side 320 in FIG. 4E of control device 300 holding imaging device 100 faces toward an area of interest in the environment, control device 300 can activate functions of control device 300 and/or imaging device 100 related to the FPV photography mode. For example, display 304 of control device 300 may display one or more images captured by imaging device 100. Further, a touchscreen of display 304 may detect a user input on the touchscreen to control device 300 or imaging device 100. For example, the user may select an area of interest in the field of view (FOV) of image capture 102 that is displayed on display 304 for imaging device 100 to capture. In another example, imaging device 100 may be controlled by the user input detected on the touchscreen, such as adjusting parameters of image capture 102, display 104, or releasing the shutter to snap photos or initiate taking videos.

In some embodiments, in accordance with detecting that imaging device 100 is received in cavity 302 in the inward-facing orientation shown in FIGS. 5A, 5B, 5C, 5G, and 5I, step 704 of process 700 comprises disabling operation of imaging device 100 to disable one or more functions by control device 300, e.g., to save power of battery 260. In some embodiments, optical assembly 102 of imaging device 100 is deactivated or blocked from capturing any image. Display 104 of imaging device 100 is deactivated. In some embodiments, in accordance with detecting that imaging device 100 is received in the cavity with optical assembly 102 of imaging device 100 facing inward, control device 300 can charge a battery of imaging device 100, control imaging device 100 to transmit image data of the one or more images captured by imaging device 100 to control device 300, and/or control imaging device 100 to transmit data from imaging device 100 to an external device connected to control device 300. Meanwhile, images or other information as described herein can be displayed, selected, or edited on display 304 of control device 300 shown in FIG. 5J. For example, display 304 can play videos with recorded audio. Display 304 can also display information of imaging device 100, such as a status of battery 260 or data stored in built-in memory 212 of imaging device 100. In some embodiments, in accordance with imaging device 100 being received in cavity 302 with optical assembly 102 of imaging device 100 facing outward, control device 300 can display a first user interface for controlling imaging device 100 to capture the one or more images on display 304. In some embodiments, in accordance with imaging device 100 being received in cavity 302 with optical assembly 102 of imaging device 100 facing inward, control device 300 can display a second user interface for managing data transmission from imaging device 100 to control device 300.

In some embodiments, in accordance with detecting imaging device 100 received in cavity 302, regardless of whether optical assembly 102 of imaging device 100 faces inward or outward, control device 300 is configured to charge battery 260, control imaging device 100 to transmit image data of images captured by imaging device 100 to control device 300, or control imaging device 100 to transmit data from imaging device 100 to an external device, such as remote controller 800, coupled to control device 300.

In some embodiments, when imaging device 100 is received in cavity 302 of control device 300, images captured by imaging device 100 can be transmitted from imaging device 100 to control device 300 via contact between connectors 112 and 312 for displaying on display 304. As described above, display 304 may include a touchscreen for detecting a user input thereon to interact with the captured images, such as editing, selecting, deleting, deleting a batch of images, moving, exporting the images, etc. When imaging device 100 is remote from control device 300, for example if imaging device 100 is hand-held by a user, carried by a UAV, or held by a wristband worn by a user, images captured by imaging device 100 can be transmitted from imaging device 100 to control device 300 via a wireless connection.

In some embodiments, a user input can be detected on the touchscreen of display 304 to control operation of imaging device 100, such as changing parameters or photography modes, by interacting with graphical user interface (GUI) options displayed on the touchscreen.

In some embodiments, when imaging device 100 is received in cavity 302 of control device 300, either inward-facing or outward-facing, control device 300, charging circuitry 660, can charge battery 260 of imaging device 100.

Control device 300 can charge battery 260 using power stored in battery 660. Control device 300 can charge battery 260 when control device 300 is connected to an external device via connector 316, such as a computer. Control device 300 can charge imaging device 100 via the contact between connectors 112 and 312. The external device may charge battery 660 of control device 300 and battery 260 of imaging device 100 at the same time. Control device 300 can initiate charging of imaging device 100 in response to detecting the contact between the contacts of connectors 112 and 312. In some embodiments, control device 300 charges imaging device 100 according to a predetermine charging schedule or a predetermined triggering event. For example, control device 300 initiates charging imaging device 100 when the power of battery 260 is below a threshold, such as 5%, 10%, 15%, or 20% of a fully charged status. In some embodiments, control device 300 stops charging imaging device 100 when battery 260 is fully charged. Display 304 and/or display 104 can display a status of battery 260. It is appreciated that the operation of control device 300 and/or imaging device 100 described herein may be automatically and/or manually controlled, e.g., via user input or speech command. In some embodiments, in response to detecting that imaging device 100 is received in cavity 302 of control device 300, control device 300 is configured to power one or more functions of imaging device 100 while charging the battery of imaging device 100, such as controlling image device 100 to transmit data to control device 300. Accordingly, the system can multi-task, without consuming additional user time to perform multiple tasks separately, such as charging the battery, and downloading the image data from imaging device 100 and saving the image data on control device 300, functioning as an extension or supplemental storage device of imaging device 100.

FIG. 7B shows a flow diagram of an example process 750 of operating imaging device 100 held by control device 300, in accordance with embodiments of the present disclosure. As shown in FIGS. 4B and 5B, imaging device 100 is received in cavity 302 of control device 300 in different orientations, such as outward-facing in FIG. 4B or inward-facing in FIG. 5B. While being received in cavity 302, the set of contacts of connector 112 on imaging device 100 form contact with the corresponding set of contacts of connector 312 of control device 300. Process 750 may be performed by one or more components of imaging device 100, one or more modules 220, and database 240 of imaging device 100 shown in FIG. 2.

In step 752, an orientation of imaging device 100 received in cavity 302 is detected, e.g., by position detector 252 in conjunction with orientation determination module 226. The orientation is related to whether imaging device 100 is inward-facing or outward-facing. The orientation may be determined by a direction associated with magnetic attraction between magnets 114 and 314 via a Hall sensor on imaging device 100. Alternatively, the orientation may be determined by relative alignment between corresponding contacts of connectors 112 or 312 by position detector 252, such as alignment of contacts a', b', c', and d' shown in FIG. 1I relative to contacts a, b, c, and d shown in FIG. 3A. In some embodiments, the orientation may be determined via an identifier recognition, or any other suitable methods. The orientation may be detected by imaging device 100 in response to detecting the contact of connector 112 with connector 312, or in responsive to a user's instruction. Imaging device 100 can transmit the detected orientation result to control device 300. In some embodiments, imaging device 100 can receive the orientation result that has been detected by control device 300 from control device 300.

In some embodiments, the set of contacts a, b, c, and d of connector 312 are in contact with the set of contacts a', b', c', and d' of connector 112 in a first alignment, such as a-a', b-b', c-c' and d-d', when imaging device 100 is received in cavity 302 with optical assembly 102 of imaging device 100 facing outward. In some embodiments, the set of contacts a, b, c, and d of connector 312 are in contact with the set of contacts a', b', c', and d' of connector 112 in a second alignment, such as a-d', b-c', c-b' and d-a', when imaging device 100 is received in cavity 302 with optical assembly 102 of imaging device 100 facing inward. In some embodiments, the individual metal contacts may correspond to different functions. For example, two metal contacts may correspond to a positive electrode and a negative electrode for charging the battery of imaging device 100. In another example, another two metal contacts may correspond to uplink and downlink communication of data or to communicating channels for transmitting data (such as image data) and/or command (e.g., instructions for controlling imaging device 100) between control device 300 and imaging device 100. In some embodiments, control device 300 is configured to control communication between control device 300 and imaging device 100 in accordance with the detected alignment.

In step 754, operation of imaging device 100 is controlled in accordance with the orientation detected in step 752. Imaging device 100 may activate or forego certain operations in accordance with the detected orientation. For example, operation that is compatible or optimized with the detected orientation is allowed, while operation that is incompatible or inefficient with the detected orientation is blocked or deactivated.

In some embodiments, in accordance with detecting that imaging device 100 is received in cavity 302 in the outward-facing orientation shown in FIGS. 4A, 4B, 4C, 4G, and 4I, step 754 of process 750 comprises activating one or more operations of imaging device 100, such as operations of optical assembly 102 and/or display 104, etc. For example, input mechanism 106 receives a user input, such as releasing the shutter to take one or more selfie images, e.g., photos or videos. In response, optical assembly 102 of imaging device 100 captures the one or more images. Other operations may include powering on or off optical assembly 102 and/or display 104, or selecting menu items displayed on display 104. In some embodiments, imaging device 100 may receive information from control device 300 related to orientation of control device 300 as discussed in process 700, and operate in the selfie photography mode or the FPV photography mode according to the orientation of the control device 300.

In some embodiments, in accordance with detecting that imaging device 100 is received in cavity 302 in the inward-facing orientation shown in FIGS. 5A, 5B, 5C, 5G, and 5I, step 754 of process 750 comprises deactivating operation of imaging device 100 to disable one or more functions. For example, optical assembly 102, display 104, microphone 110, etc. may be deactivated to save power of battery 260.

In some embodiments, imaging device 100 can exchange information with control device 300 via the contact between connectors 112 and 312, such as detected orientation information, operation commands, and/or battery status information, etc. Imaging device 100 can receive power from control device 300 via the contact between connectors 112 and 312 to charge battery 260. Imaging device 100 may be able to detect a status of battery 260. Imaging device 100 may request charging of battery 260 by control device 300 when a predetermined condition is satisfied, such as a low battery power, or in response to detecting the contact between connectors 112 and 312.

In some embodiment, control device 300 is configured to operate imaging device 100 in different modes in accordance with imaging device 100 being coupled to control device 300 or separate from control device 300. For example, in accordance with imaging device 100 being coupled to, e.g., received in cavity 302 of, control device 300, control device 300 can cause imaging device 100 to operate in a first mode associated with a first set of parameters. In another example, in accordance with imaging device 100 being separate from control device 300, control device 300 can cause imaging device 100 to operate in a second mode associated with a second set of parameters. In some embodiments, the first mode can operate at a first power level, and the second mode can operate at a second power level lower than the first power level. For example, functions associated with different levels of power consumption can be adjusted for imaging device 100 and/or control device 300 according to whether imaging device 100 is coupled to control device 300. Such functions may include, but are not limited to, a length of the exposure time, whether to activate the button function, and/or the display screen.

As described herein, control device 300 has advantages of being user friendly. For example, control device 300 provides a structure that is easier for the user to hold than imaging device 100 itself, in various photography modes, such as sports photography, ground photography, aerial photography, or underwater photography, selfie photography mode or FPV photography mode, etc. In another example, control device 300 provides display 304 with a larger screen and better resolution to display the captured images with better quality and details than display 104. It is also easier for the user to interact with, such as selecting or editing, the images on larger display 304 than smaller display 104. Further, control device 300 has a more powerful battery 660 that can charge battery 260 on the go. Circuitry of battery 260 may support fast charging of battery 260 via connector 112, such as fully charging within 10-20 minutes, making it convenient for the user to recharge imaging device 100 during outdoors activity or travel. In addition, control device 300 works with external memory storage devices, e.g., SD cards, of different storage sizes, thus providing an extension of storage for storing images captured by imaging device 100. For example, when the built-in memory of imaging device 100 is full, without interrupting user's activity, newly captured images can automatically be transmitted from imaging device 100 to control device 300 via the contact between connectors 112 and 312 and stored in the external memory device coupled to control device 300. Meanwhile, imaging device 100 has its own advantages when being used individually, such as being compact, wearable, lighter, and compatible with multiple devices, as described herein.

FIGS. 8A, 8B, 8C, 8D, 8E, 8F, 8G, 8H, 8I, and 8J show schematic diagrams of a control terminal, provided as a remote controller 800, from different viewing angles, in accordance with embodiments of the present disclosure. Remote controller 800 is a hand-held device capable of carrying another device in a cavity 802 of a controller body 801. FIGS. 9A, 9B, 9C, 9D, 9E, 9F, 9G, 9H, 9I, and 9J show schematic diagrams of remote controller 800 with a communication device 817 extended, out from different viewing angles, in accordance with embodiments of the present disclosure. FIGS. 10A, 10B, 10C, 10D, 10E, 10F, 10G, 10H, 10I, 10J, 10K, and 10L show schematic diagrams of a system 1000 including remote controller 800 coupled to control device 300 received in cavity 802, from different viewing angles, in accordance with embodiments of the present disclosure. A user can hold remote controller 800 to control a UAV, or system 1000 to control the UAV or imaging device 100 onboard the UAV.

Figure 10C:
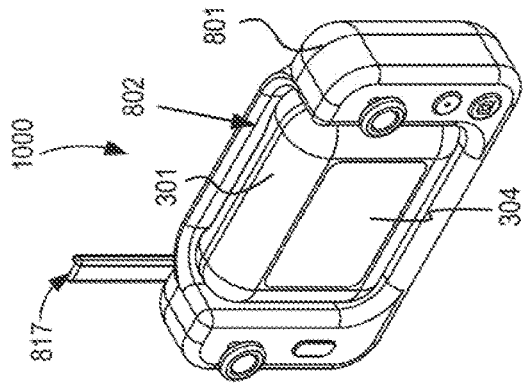
FIGS. 10A, 10B, 10C, 10D, 10E, 10F, 10G, 10H, 10I, 10J, 10K, and 10L show schematic diagrams of a system including a remote controller coupled to a control device, viewed from different viewing angles, in accordance with embodiments of the present disclosure.
Figure 10F:
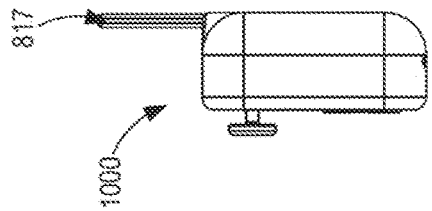
Figure 10B:
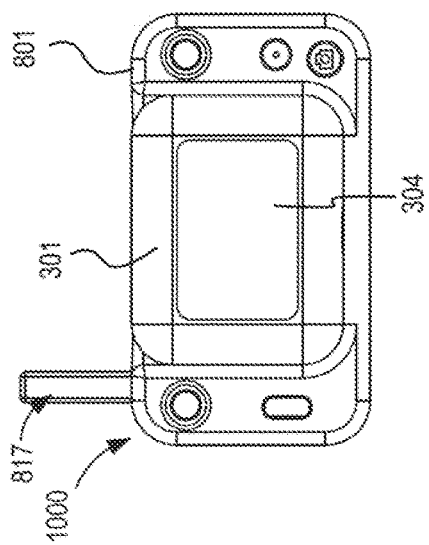
Figure 10E:
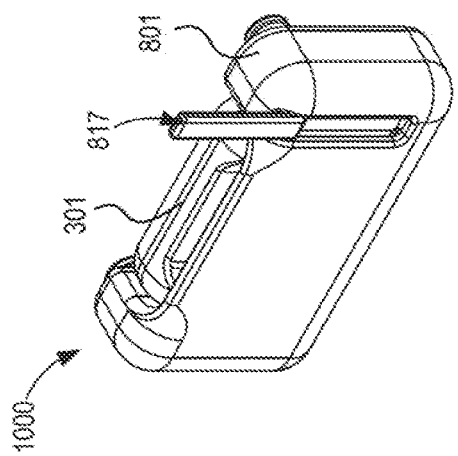
Figure 10A:
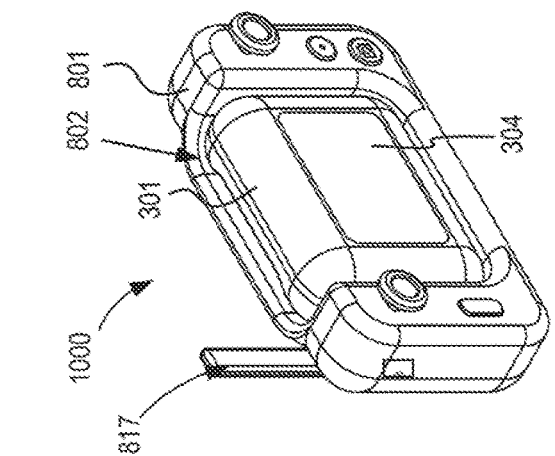
Figure 10D:
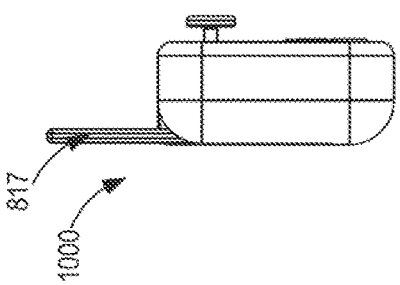
Figure 10I:
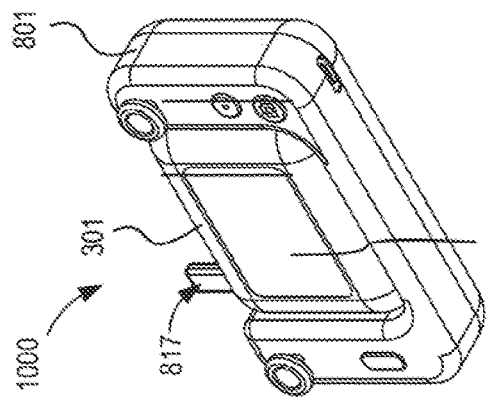
Figure 10L:
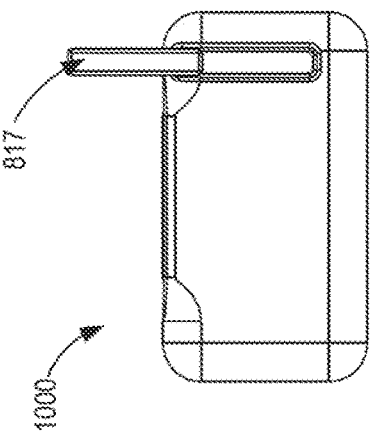
Figure 10H:
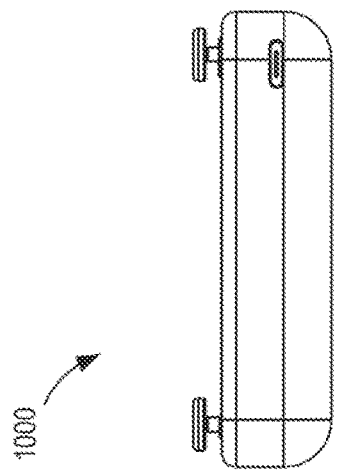
Figure 10K:
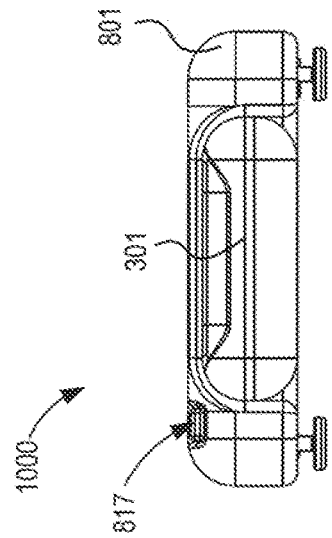
Figure 10G:
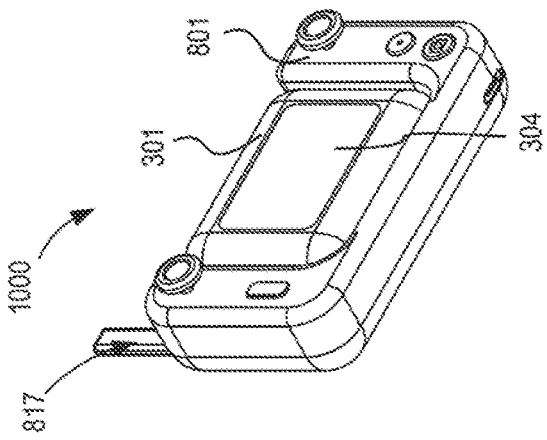
Figure 10J:
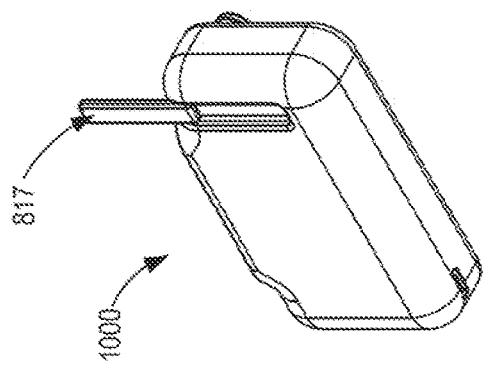

In some embodiments as shown in FIGS. 8A, 8B, and 8C, remote controller 800 comprises controller body 801 including cavity 802 open on a side 820 (FIGS. 8D, 8E, and 8F) of controller body 801. Cavity 802 is configured to receive control device 300. For example as shown in system 1000 in FIGS. 10A, 10B, 10C, 10G, and 10I, when being received in cavity 802, at least a portion of control device 300 is coupled to remote controller 800. Control device 300 is disposed in cavity 802 with display 304 exposed for viewing by a user. As shown in FIGS. 8B and 10B, remote controller 800 includes a first data connector 816 disposed at a bottom 815 of cavity 802 for connecting remote controller 800 to control device 300 when received therein. First data connector 816 can also be disposed at other locations, such as any inner side inside of cavity 802. First data connector 816 can be used for exchanging information, such as image data, commands, power, etc., between remote controller 800 with control device 300 received in cavity 802.

Figure 9C:
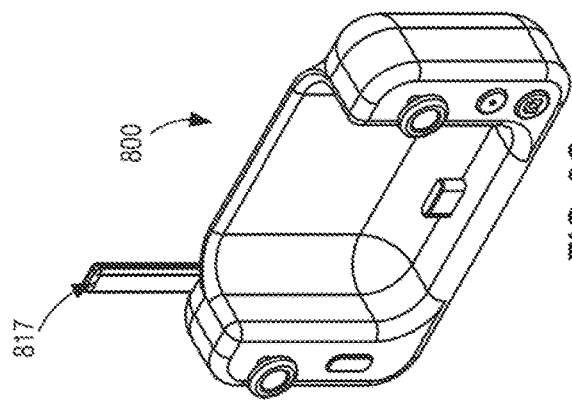
FIGS. 9A, 9B, 9C, 9D, 9E, 9F, 9G, 9H, 9I, and 9J show schematic diagrams of a remote controller with a communication device extended out, from different viewing angles, in accordance with embodiments of the present disclosure.
Figure 9F:
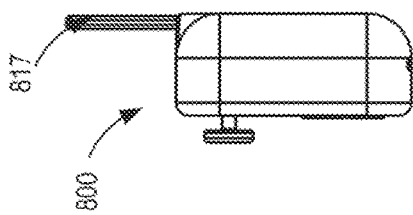
Figure 9B:
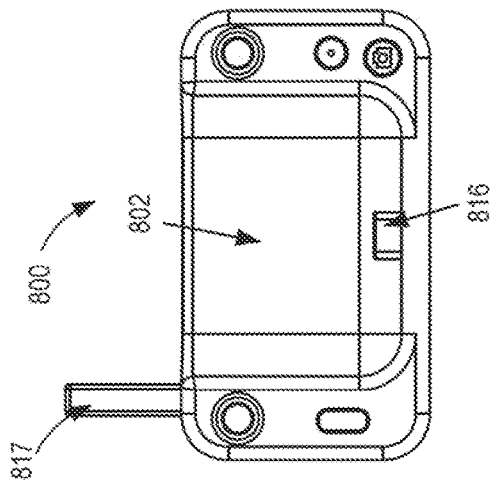
Figure 9E:
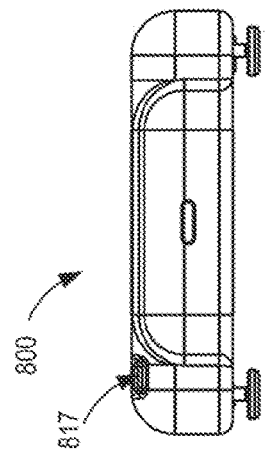
Figure 9A:
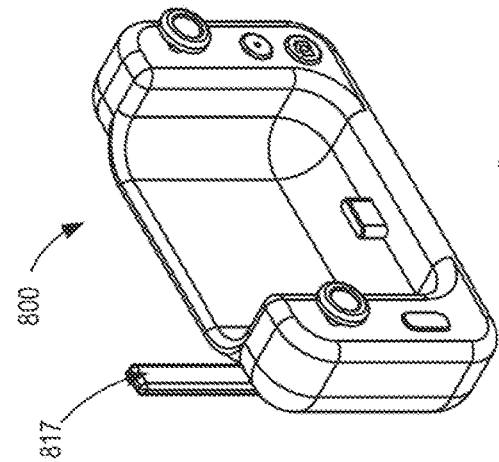
Figure 9D:
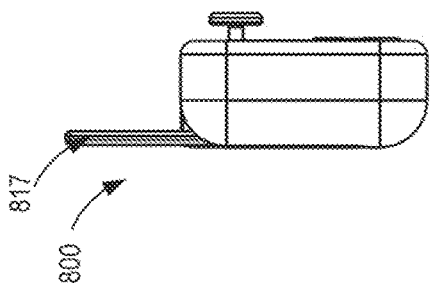
Figure 9I:
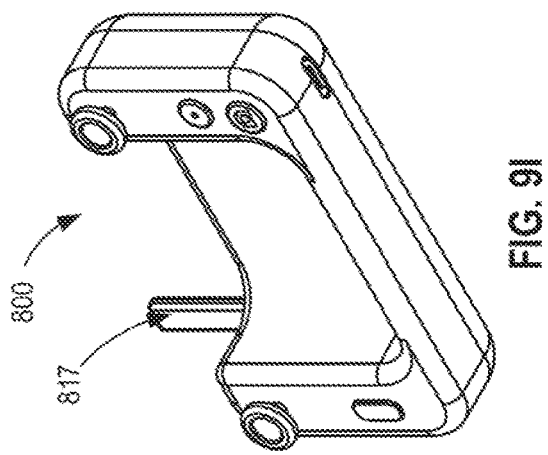
Figure 9H:
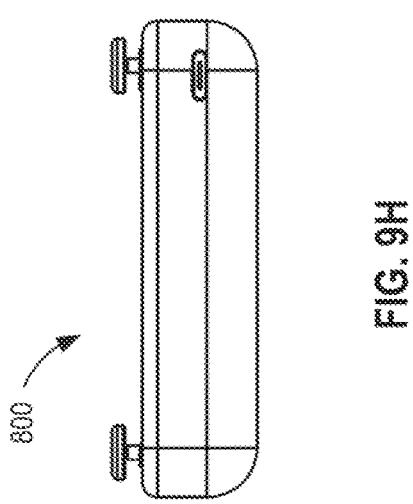
Figure 9J:
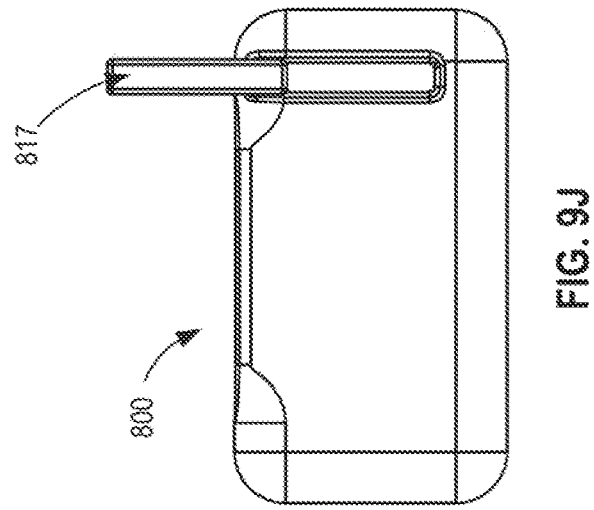
Figure 9G:
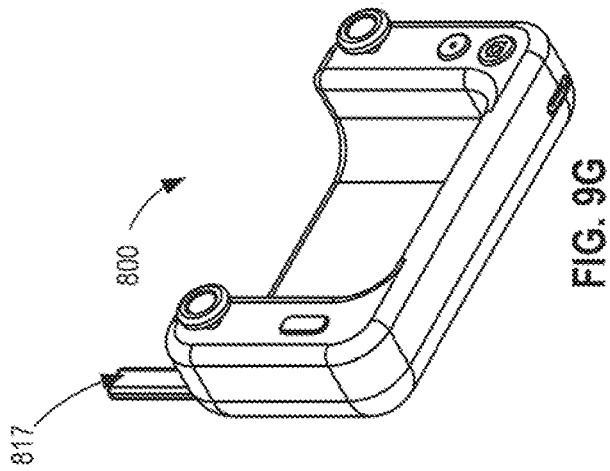

In the example shown in FIGS. 9A, 9B, 9C, 9D, 9E, 9F, 9G, 9I, and 9J, remote controller 800 may include a communication device 817 that facilitates communication of information between remote controller 800 and other entities, such as the UAV. Communication device 817 may comprise an antenna or other suitable communication devices configured to send and/or receive signals. As shown in FIG. 8E, communication device 817 is disposed on a side 822 opposite to side 820. As shown in FIGS. 8J and 9J, communication device 817 may comprise an antenna that is foldable or retractable. Communication device 817 can also be disposed at other suitable locations on remote controller 800, such as at the bottom of remote controller 800, or on side 820 while on the other side of cavity 802, etc. Communication device 817 can be used to transmit operation command from remote controller 800 to the UAV, and transmit image data, and/or position data of UAV from the UAV to remote controller 800.

In some embodiments as shown in FIG. 8B, remote controller 800 comprises one or more input mechanisms. The one or more input mechanisms are disposed adjacent to cavity 802 and configured to receive a user input associated with operating a UAV in communication with remote controller 800, control device 300 when received in cavity 802, and/or an imaging device onboard the UAV, such as imaging device 100 received in a cavity of the UAV, or an imaging device carried by a gimbal device on the UAV. Remote controller 800 may generate signals indicative of control data related to the received user input to the UAV, imaging device 100 onboard the UAV, or control device 300. Remote controller 800 may also be configured to receive data and information from the UAV, such as data collected by or associated with imaging device 100 and operational data relating to, for example, positional data, velocity data, acceleration data, sensory data, and other data and information relating to the UAV, its components, and/or its surrounding environment. The one or more input mechanisms may include physical sticks, levers, switches, triggers, and/or buttons configured to control flight parameters, display 304 of control device 300, or parameters of imaging device 100 onboard the UAV.

In some embodiments, the one or more input mechanisms comprise a pair of rockers 842 (or joysticks) configured to receive the user input to control the flight of the UAV. The plurality of input mechanisms may comprise one or more buttons, such as button 844, 846, and 848, configured to receive user input for controlling operation of imaging device 100, such as parameters associated with capturing one or more images when imaging device 100 is onboard the UAV. Button 844 can be used to power on and off imaging device 100. Button 848 may trigger taking photos by imaging device 100. Button 846 may trigger taking videos by imaging device 100. One or more buttons can also be configured to receive user input for adjusting one or more parameters of imaging device 100, such as focal length, aperture, ISO, resolution, etc.

It is appreciated that remote controller 800 may include other or additional input mechanisms, such as switches, dials, levers, triggers, touch pads, touch screens, soft keys, a mouse, a keyboard, a voice recognition device, and/or other types of input mechanisms. Each input mechanism of remote controller 800 may be configured to generate an input signal communicable to a controller onboard the UAV for controlling flight of the UAV and usable by the on-board controller as inputs for processing. In addition to flight control inputs, remote controller 800 may be used to receive user inputs of other information, such as manual control settings, automated control settings, control assistance settings etc., which may be received, for example, via button 844, 846, or 848, or any other input mechanism(s). It is understood that different combinations or layouts of input mechanisms for remote controller 800 are possible and within the scope of this disclosure.

In some embodiments, as shown in system 1000 of FIGS. 10A, 10B, 10C, 10G, and 10I, display 304 of control device 300 received in cavity 802 is configured to display information. For example, display 304 can display one or more images captured by imaging device 100 onboard the UAV, and/or operation information of UAV, imaging device 100, control device 300, and/or remote controller 800. When received in cavity 802, a touchscreen of display 304 can receive user input on the touchscreen to control operation of the UAV, and/or imaging device 100 onboard the UAV.

In some embodiments, system 1000 may be configured to receive signals, from the UAV, indicative of information or data relating to movements of the UAV and/or data (e.g., imaging data) captured by the UAV, e.g., in conjunction with imaging device 100. Display 304 may be a multifunctional display screen configured to display information on the multifunctional screen as containing as receive user input via the multifunctional screen. In some embodiments, remote controller 800 may support a GUI displayed on display 304 of control device 300 in system 1000. GUI options in various visual appearances, such as icons, buttons, text boxes, dropdown menus, interactive images, etc., respectively representing remote controller 800 and/or the one or more input mechanisms, may be displayed on display 304. For example, GUI options of rockers 842 (or joysticks), and/or buttons 844, 846, or 848 may be displayed on and configured to receive user input via display 304.

In some embodiments as shown in FIG. 10B, display 304 may display one or more images received from the UAV. The touchscreen of display 304 may receive user input to identify, select, edit, or interact in any suitable way with an area of interest of a displayed image by touching the corresponding area of the touchscreen. In some embodiments, display 304 may display the FOV of imaging device 100 onboard the UAV, and the user may monitor the FOV simultaneously as the UAV moves.

In some embodiments, remote controller 800 further comprises circuitry configured to charge battery 660 of control device 300 via first data connector 816 coupled to connector 316 on control device 300 when control device 300 is received within cavity 802 in system 1000.

In some embodiments, remote controller 800 further comprises one or more processors and memory storing instructions for execution by the one or more processors to cause remote controller 800 to operate the UAV, imaging device 100 onboard the UAV, or control device 300 as described herein. Remote controller 800 can exchange information with control device 300 via first data connector 816 coupled to connector 316 on control device 300 when control device 300 is received in the cavity 802. In some examples, remote controller 800 can transmit image data received from the UAV via communication device 817 to control device 300 for displaying on display 304. In some examples, remote controller 800 can receive control data for controlling the UAV corresponding to user input received on display 304, and transmit the control data to the UAV via communication device 817.

In some embodiments as shown in FIGS. 8G, 8H, and 8I, remote controller 800 further comprises a second data connector 818 on a side, such as an edge 824. Remote controller 800 is connectable to an external device, such as a computer or a mobile phone, via second data connector 818 for exchanging information with the external device. The external device can transmit data, such as operation data, or system update data, etc., to remote controller 800 via second data connector 818. The external device can transmit data to control device 300 via remote controller 800. Remote controller 800 can transmit data of control device 300 to the external device, such as image data stored in an SD card coupled to control device 300 via second data connector 818. In some embodiments, the external device can charge, via second data connector 818 coupled to a corresponding connector on the external device, a battery of remote controller 800 and/or battery 660 of control device 300.

FIGS. 11A, 11B, 11C, 11D, 11E, 11F, 11G, 11H, 11I, and 11J show schematic diagrams of a movable object, provided as a UAV 1100, from different viewing angles, in accordance with embodiments of the present disclosure. In some embodiments, the movable object is UAV 1100, or any other suitable object, device, mechanism, system, or machine configured to travel on or within a suitable medium (e.g., a surface, air, water, rails, space, underground, etc.). The movable object may also be other types of movable object (e.g., wheeled objects, nautical objects, locomotive objects, other aerial objects, etc.).

FIGS. 12A, 12B, 12C, 12D, 12E, 12F, 12G, 12H, 12I, and 12J show schematic diagrams of a system 1200, including imaging device 100 received in a cavity 1102 of a carrier body 1101 of UAV 1100 (FIG. 11B), from different viewing angles, in accordance with embodiments of the present disclosure. Cavity 1102 is configured to receive and couple to at least a portion of imaging device 100 as shown in FIGS. 12A, 12B, and 12C. When received in UAV 1100, imaging device 100 is configured to capture one or more images during movement of UAV 1100. UAV 1100 includes a propulsion system 1104 configured to propel UAV 1100. Propulsion device 1104 may include one or more engines, motors, wheels, axles, magnets, rotors, propellers, blades, nozzles, or any suitable combination thereof.

In some embodiments as shown in FIGS. 11B and 12B, UAV 1100 comprises a connector 1112 disposed in cavity 1102 for communicatively connecting to imaging device 100 received in cavity 1102. Connector 1112 is configured to enable exchange of information, such as image data and/or command data, between UAV 1100 and imaging device 100.

Connector 1112 comprises one or more contacts aligned on an edge 1111 of cavity 1102, and the contacts are similar to the contacts of connector 112 of imaging device 100. The contacts of connector 1112 may be in contact with the corresponding contacts of connector 112 on imaging device 100 when imaging device 100 is received in cavity 1102. In some embodiments, UAV 1100 comprises a magnet (not shown) on one inner side of cavity 1102 to hold, by magnetic attraction, imaging device 100 in cavity 1102.

In some embodiments, cavity 1102 is on a surface of UAV 1100, such as an inclined surface 1120, of UAV 1100 as shown in FIGS. 11A, 11C, 11D, and 11E. In some embodiments as shown in FIG. 11D, inclined surface 1120 may form an angle α relative to another surface, such as surface 1122, in a range from 90° to 180°. For example, if the angle α is 120, imaging device 100 is oriented to capture a FOV along a direction below and in front of UAV 1100. Cavity 1102 can be formed on any surface of UAV 1100, e.g., on the front, back, bottom, top or any side of UAV 1100.

In some embodiments, UAV 1100 includes one or more processors coupled to one or more memories configured to store instructions for execution by the one or more processors to control propulsion system 1104 to propel UAV 1100. The one or more memories of UAV 1100 may further store instructions for execution by the one or more processors to receive image data captured by imaging device 100 and transmit the captured image data to remote controller 800. The one or more memories of UAV 1100 may further store instructions for execution by the one or more processors to receive control data related to operating imaging device 100, such as adjusting one or more parameters of optical assembly 102 or display 104, and transmit the control data to imaging device 100 to operate imaging device 100.

UAV 1100 refers to an aerial device configured to be operated and/or controlled automatically or autonomously based on commands detected by one or more sensors, such as imaging device 100, an audio sensor, a ultrasonic sensor, and/or a motion sensor, etc., on-board UAV 1100 or via an electronic control system (e.g., with pre-programmed instructions for controlling UAV 1100). Alternatively or additionally, UAV 1100 may be configured to be operated and/or controlled manually by an off-board operator, e.g., via remote controller 800 shown in FIGS. 8A, 9A, and 10A, or a mobile device (not shown). UAV 1100 can be referred to as a drone, include pilotless aircraft of various sizes and configurations that can be remotely operated by a user and/or programmed for automated flight. UAV 1100 can be equipped with cameras, such as imaging device 100 held in cavity 1102 shown in FIG. 12B, or imaging device 100 or another imaging device carried by a gimbal device, to capture images and videos for various purposes including, but not limited to, recreation, surveillance, sports, and aerial photography. Imaging device 100 held by cavity 1102 may satisfy the need for certain photography modes (e.g., more stable and compact), while imaging device 100 carried by the gimbal device may be suitable for other photography modes (e.g., adjustable FOV with more degrees of freedom).

In some embodiments, UAV 1100 may be configured to carry a payload (not shown). The payload may be connected or attached to UAV 1100 by a gimbal device (not shown), to allow for one or more degrees of relative movement between the payload and UAV 1100. The payload may also be mounted directly to UAV 1100 without using any gimbal device, such as imaging device 100 held by UAV 1100 shown in FIG. 12B. UAV 1100 may also include a sensing system, a communication system, and an on-board controller in communication with the other components.

In some embodiments, UAV 1100 may include one or more (e.g., 1, 2, 3, 3, 4, 5, 10, 15, 20, etc.) propulsion devices 1104 positioned at various locations, for example, top, sides, front, rear, and/or bottom of UAV 1100, for propelling and steering UAV 1100. Propulsion devices 1104 are devices or systems operable to generate forces for sustaining controlled flight. Propulsion devices 1104 may share or may each separately include or a power source, such as a motor (e.g., an electric motor, hydraulic motor, pneumatic motor, etc.), an engine (e.g., an internal combustion engine, a turbine engine, etc.), a battery bank, etc., or a combination thereof. Each propulsion device 1104 may also include one or more rotary components drivably connected to the power source (not shown) and configured to participate in the generation of forces for sustaining controlled flight. For instance, rotary components may include rotors, propellers, blades, nozzles, etc., which may be driven on or by a shaft, axle, wheel, hydraulic system, pneumatic system, or other component or system configured to transfer power from the power source. Propulsion devices 1104 and/or rotary components may be adjustable (e.g., tiltable) with respect to each other and/or with respect to UAV 1100. Alternatively, propulsion devices 1104 and rotary components may have a fixed orientation with respect to each other and/or UAV 1100. In some embodiments, each propulsion device 1104 may be of the same type. In other embodiments, propulsion devices 1104 may be of multiple different types. In some embodiments, all propulsion devices 1104 may be controlled in concert (e.g., all at the same speed and/or angle). In other embodiments, one or more propulsion devices may be independently controlled with respect to, e.g., speed and/or angle.

In some embodiments, propulsion devices 1104 may be configured to propel UAV 1100 in one or more vertical and horizontal directions and to allow UAV 1100 to rotate about one or more axes. That is, propulsion devices 1104 may be configured to provide lift and/or thrust for creating and maintaining translational and rotational movements of UAV 1100. For instance, propulsion devices 1104 may be configured to enable UAV 1100 to achieve and maintain desired altitudes, provide thrust for movement in all directions, and provide for steering of UAV 1100. In Propulsion devices 1104 may enable UAV 1100 to perform vertical takeoffs and landings (i.e., takeoff and landing without horizontal thrust). Propulsion devices 1104 may be configured to enable movement of UAV 1100 along and/or about multiple axes.

In some embodiments, the payload of UAV 1100 may include a sensory device. The sensory device may include devices for collecting or generating data or information, such as surveying, tracking, and capturing images or video of targets (e.g., objects, landscapes, subjects of photo or video shoots, etc.). The sensory device may include an imaging sensor, such as imaging device 100, configured to gather data that used to generate images. As disclosed herein, image data obtained from imaging device 100 may be processed and analyzed to obtain commands and instructions from one or more users to operate UAV 1100 and/or imaging device 100. Imaging device 100 shown in FIGS. 12B and 1B may include a photographic camera, or a video camera. The imaging device of the payload may also include infrared imaging devices, ultraviolet imaging devices, x-ray devices, ultrasonic imaging devices, radar devices, etc. The sensory device may also or alternatively include devices for capturing audio data, such as microphones or ultrasound detectors. The sensory device may also or alternatively include other suitable sensors for capturing visual, audio, and/or electromagnetic signals.

In some embodiments, the gimbal device (not shown) of UAV 1100 may include one or more devices configured to hold the payload and/or allow the payload to be adjusted (e.g., rotated) with respect to UAV 1100. In some embodiments, the gimbal device may be configured to allow the payload to be rotated about one or more axes, as described below. In some embodiments, the gimbal device may be configured to allow the payload to rotate about each axis by 360° to allow for greater control of the perspective of the payload. In other embodiments, the gimbal device may limit the range of rotation of the payload to less than 360° (e.g., <270°, <210°, <180, <120°, <90°, <45°, <30°, <15°, etc.) about one or more of its axes.

In some embodiments, the gimbal device may include a frame assembly, one or more actuator members, and one or more carrier sensors. The frame assembly may be configured to couple the payload to UAV 1100 and, in some embodiments, to allow the payload to move with respect to UAV 1100. In some embodiments, the frame assembly may include one or more sub-frames or components movable with respect to each other. The actuator members (not shown) are configured to drive components of the frame assembly relative to each other to provide translational and/or rotational motion of the payload with respect to UAV 1100. In other embodiments, actuator members may be configured to directly act on the payload to cause motion of the payload with respect to the frame assembly and UAV 1100. Actuator members may be or may include suitable actuators and/or force transmission components. For example, actuator members may include electric motors configured to provide linear and/or rotational motion to components of the frame assembly and/or the payload in conjunction with axles, shafts, rails, belts, chains, gears, and/or other components.

The sensors of the gimbal device (not shown) may include devices configured to measure, sense, detect, or determine state information of the gimbal device and/or the payload. State information may include positional information (e.g., relative location, orientation, attitude, linear displacement, angular displacement, etc.), velocity information (e.g., linear velocity, angular velocity, etc.), acceleration information (e.g., linear acceleration, angular acceleration, etc.), and or other information relating to movement control of the gimbal device or the payload, either independently or with respect to UAV 1100. The sensors may include one or more types of suitable sensors, such as potentiometers, optical sensors, visions sensors, magnetic sensors, motion or rotation sensors (e.g., gyroscopes, accelerometers, inertial sensors, etc.). The sensors may be associated with or attached to various components of the gimbal device, such as components of the frame assembly or the actuator members, or to UAV 1100. The sensors may be configured to communicate data and information with the on-board controller of UAV 1100 via a wired or wireless connection (e.g., RFID, Bluetooth, Wi-Fi, radio, cellular, etc.). Data and information generated by the sensors and communicated to the on-board controller may be used by the on-board controller for further processing, such as for determining state information of UAV 1100 and/or targets.

The gimbal device may be coupled to UAV 1100 via one or more damping elements (not shown) configured to reduce or eliminate undesired shock or other force transmissions to the payload from UAV 1100. The damping elements may be active, passive, or hybrid (i.e., having active and passive characteristics). The damping elements may be formed of any suitable material or combinations of materials, including solids, liquids, and gases. Compressible or deformable materials, such as rubber, springs, gels, foams, and/or other materials may be used as the damping elements. The damping elements may function to isolate the payload from UAV 1100 and/or dissipate force propagations from UAV 1100 to the payload. The damping elements may also include mechanisms or devices configured to provide damping effects, such as pistons, springs, hydraulics, pneumatics, dashpots, shock absorbers, and/or other devices or combinations thereof.

The sensing system of UAV 1100 may include one or more on-board sensors (not shown) associated with one or more components or other systems. For instance, the sensing system may include sensors for determining positional information, velocity information, and acceleration information relating to UAV 1100 and/or targets. In some embodiments, the sensing system may also include the above-described carrier sensors. Components of the sensing system may be configured to generate data and information for use (e.g., processed by the on-board controller or another device) in determining additional information about UAV 1100, its components, and/or its targets. The sensing system may include one or more sensors for sensing one or more aspects of movement of UAV 1100. For example, the sensing system may include sensory devices associated with the payload as discussed above and/or additional sensory devices, such as a positioning sensor for a positioning system (e.g., GPS, GLONASS, Galileo, Beidou, GAGAN, RTK, etc.), motion sensors, inertial sensors (e.g., IMU sensors, MIMU sensors, etc.), proximity sensors, imaging device 100, etc. The sensing system may also include sensors configured to provide data or information relating to the surrounding environment, such as weather information (e.g., temperature, pressure, humidity, etc.), lighting conditions (e.g., light-source frequencies), air constituents, or nearby obstacles (e.g., objects, structures, people, other vehicles, etc.).

A communication system of UAV 1100 may be configured to enable communication of data, information, commands, and/or other types of signals between the on-board controller and off-board entities, such as remote controller 800, a mobile device, a server (e.g., a cloud-based server), or another suitable entity. The communication system may include one or more on-board components configured to send and/or receive signals, such as receivers, transmitter, or transceivers, that are configured for one-way or two-way communication. The on-board components of the communication system may be configured to communicate with off-board entities via one or more communication networks, such as radio, cellular, Bluetooth, Wi-Fi, RFID, and/or other types of communication networks usable to transmit signals indicative of data, information, commands, and/or other signals. For example, the communication system may be configured to enable communication between off-board devices for providing input for controlling UAV 1100 during flight, such as remote controller 800.

The on-board controller of UAV 1100 may be configured to communicate with various devices on-board UAV 1100, such as the communication system and the sensing system. The controller may also communicate with a positioning system (e.g., a global navigation satellite system, or GNSS) to receive data indicating the location of UAV 1100. The on-board controller may communicate with various other types of devices, including a barometer, an inertial measurement unit (IMU), a transponder, or the like, to obtain positioning information and velocity information of UAV 1100. The on-board controller may also provide control signals (e.g., in the form of pulsing or pulse width modulation signals) to one or more electronic speed controllers (ESCs), which may be configured to control one or more of propulsion devices 104. The on-board controller may thus control the movement of UAV 1100 by controlling one or more electronic speed controllers.

Figure 13:
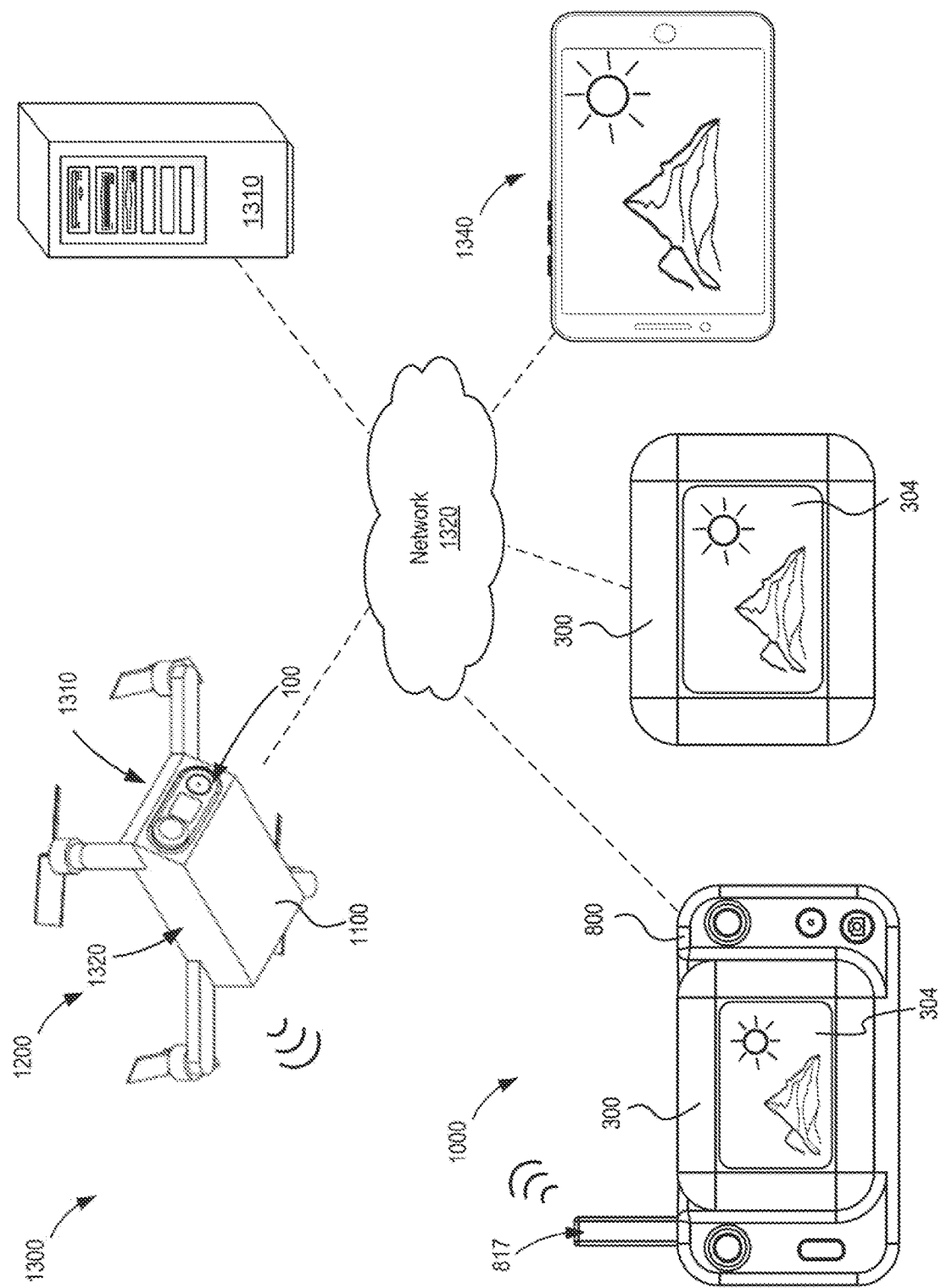
FIG. 13 shows an example environment for operating a system including an imaging device received in a UAV, via another system including a control device received in a remote controller, in accordance with embodiments of the present disclosure.

FIG. 13 shows an example environment 1300 for operating system 1200 including imaging device 100 received in UAV 1100, via system 1000, including control device 300 received in remote controller 800, in accordance with embodiments of the present disclosure. Environment 1300 includes UAV 1100 that is capable of communicatively connecting to one or more electronic devices including remote controller 800, control device 300, a mobile device 1340, and a server 1310 (e.g., cloud-based server) via a network 1320 in order to exchange information with one another and/or other additional devices and systems. For example, UAV 1100 coupled to imaging device 100 can be controlled by control device 300.

Control device 300 can be configured to control movement of movable object 1100. For example, when imaging device 100 is coupled to control device 300, control device 300 is configured to control imaging device 100 to capture one or more images. When imaging device 100 is coupled to movable object 1100, control device 300 is configured to control imaging device 100 onboard movable object 1100 to capture one or more images. For example, control device 300 can send a command to control one or more parameters of imaging device 100 to movable object 1100, and movable object 1100 can then forward the received command to imaging device 100.

Network 1320 may be any combination of wired and wireless local area network (LAN) and/or wide area network (WAN), such as an intranet, an extranet, and the internet. In some embodiments, network 1320 is capable of providing communications between one or more electronic devices as discussed in the present disclosure.

In some embodiments, UAV 1100 is capable of transmitting data (e.g., image data and/or motion data) detected by one or more sensors on-board, such as imaging 100 and/or inertial measurement unit (IMU) sensors, in real-time during movement of UAV 1100, to remote controller 800 of system 1000, mobile device 1240, and/or server 1310 that are configured to process the data. In addition, the processed data and/or operation instructions can be communicated in real-time among remote controller 800, control device 300, mobile device 1340, and/or cloud-based server 1310 via network 1320. Further, operation instructions can be transmitted from remote controller 800, control device 300, mobile device 1340, and/or cloud-based server 1310 to UAV 1100 and/or imaging device 100 in real-time to control the flight of UAV 1100 and/or imaging device 100, and components thereof via any suitable communication techniques, such as local area network (LAN), wide area network (WAN) (e.g., the Internet), cloud environment, telecommunications network (e.g., 3G, 4G, 5G), WiFi, Bluetooth, radiofrequency (RF), infrared (IR), or any other communications technique.

In some embodiments, the off-board devices, such as remote controller 800, control device 300 received in remote controller 800, and/or mobile device 1340, may be configured to receive input, such as input from a user (e.g., user manual input, user speech input, user gestures captured by imaging device 100 on-board UAV 1100), and communicate signals indicative of the input to the on-board controller. Based on the input from the user, the off-board device may be configured to generate corresponding signals indicative of one or more types of information, such as control data (e.g., signals) for moving or manipulating UAV 1100 (e.g., via propulsion devices 1104), the payload, and/or the gimbal device. The off-board device may also be configured to receive data and information from UAV 1100, such as data collected by or associated with the payload and operational data relating to, for example, positional data, velocity data, acceleration data, sensory data, and other data and information relating to UAV 1100, its components, and/or its surrounding environment. The off-board device may be remote controller 800 with physical sticks, levers, switches, wearable apparatus, touchable display, and/or buttons configured to control flight parameters, and display 304 of control device 300 configured to display the images captured by imaging device 100. The off-board device may also include mobile device 1340 including a display screen or a touch screen, such as a smartphone or a tablet, with virtual controls for the same purposes, and may employ an application on a smartphone or a tablet, or a combination thereof. Further, the off-board device may include server 1310 communicatively coupled to network 1320 for communicating information with remote controller 800, mobile device 1340, and/or UAV 1100. Server 1310 may be configured to perform one or more functionalities or sub-functionalities in addition to or in combination with remote controller 800 and/or mobile device 1340. The off-board device may include one or more communication devices, such as antenna 817 of remote controller 800, or other devices configured to send and/or receive signals. The off-board device may also include one or more input devices configured to receive input from a user, generate an input signal communicable to the on-board controller of UAV 1100 for processing by the controller to operate UAV 1100. In addition to flight control inputs, the off-board device may be used to receive user inputs of other information, such as manual control settings, automated control settings, control assistance settings, and/or aerial photography settings. It is understood that different combinations or layouts of input devices for an off-board device are possible and within the scope of this disclosure.

The off-board device may also include a display device, such as display 304, configured to display information, such as signals indicative of information or data relating to movements of UAV 1100 and/or data (e.g., imaging data) captured by UAV 1100 (e.g., in conjunction with imaging device 100). In some embodiments, display 304 may be a multifunctional display device configured to display information as containing as receive user input. In some embodiments, the off-board device may include an interactive graphical interface (GUI) for receiving one or more user inputs. The off-board device, e.g., mobile device 1340, may be configured to work in conjunction with a computer application (e.g., an "app") to provide an interactive interface on the display device or multifunctional screen of any suitable electronic device (e.g., a cellular phone, a tablet, etc.) for displaying information received from UAV 1100 and for receiving user inputs.

In some embodiments, display 304 of control device 300 coupled to remote controller 800 or a display of mobile device 1340 may display one or more images received from UAV 1100 (e.g., captured by imaging device 100 on-board UAV 1100). Display 304 on remote controller 800, the display of mobile device 1340, and/or display 104 of imaging device 100 onboard UAV 1100, may also include interactive means, e.g., a touchscreen, for the user to identify or select a portion of the image of interest to the user. In some embodiments, the display of remote controller 800, mobile device 1340, or imaging device 100 may be an integral component, e.g., attached or fixed, to its corresponding device. In other embodiments, the display may be electronically connectable to (and dis-connectable from) the corresponding device (e.g., via a connection port or a wireless communication link) and/or otherwise connectable to the corresponding device via a mounting device, such as by a clamping, clipping, clasping, hooking, adhering, or other type of mounting device. The display may be a built-in display component of an electronic device, such as mobile device 1340 (e.g., a cellular phone, a tablet, or a personal digital assistant).

In some embodiments, one or more electronic devices (e.g., UAV 1100, imaging device 100, server 1310, remote controller 800, control device 300, or mobile device 1340) as discussed with reference to FIG. 13 may have a memory and at least one processor and can be used to process image data obtained from one or more images captured by imaging device 100 on-board UAV 1100. The electronic device(s) are further configured to transmit (e.g., substantially in real time with the flight of UAV 1100) operation instructions to related controlling and propelling components of UAV 1100 and/or imaging device 100 for corresponding control and operations.

In some embodiments in environment 1300, remote controller 800 received in control device 300 of system 1000 is configured to control imaging device 100 onboard UAV 1100. As shown in FIG. 13, display 304 of control device 300 is exposed when received in remote controller 800. Data connector 816 of remote controller 800 in cavity 802, as shown in FIGS. 9B and 10B, is connected to data connector 316 of control device 300 as shown in FIG. 3H. During movement of UAV 1100, remote controller 800 is configured to transmit, via communication device 817 of remote controller 800, an instruction to UAV 1100 for controlling at least one of imaging device 100 and UAV 1100. Remote controller 800 is configured to receive, from UAV 1100, via communication device 807, image data associated with one or more images captured by imaging device 100 during the movement. Remote controller 800 is configured to transmit, via the connected data connectors 816 and 316, the image data to control device 300 for displaying on display 304 in real time with the movement of UAV 1100.

In some embodiments, remote controller 800 is further configured to detect, on at least one input mechanism of remote controller 800, such as joy sticks 842, or buttons 844, 846, and 848, user input for controlling operation of imaging device 100. For example, the user input may correspond to depressing on button 846 or 848 to take videos or photos. Remote controller 800 is configured to generate an instruction according to the user input and transmit the generated instruction to UAV 1100 via communication device 817. The instruction may be further transmitted from UAV 1100 to imaging device 100 to cause imaging device 100 to operate accordingly.

In some embodiments, remote controller 800 is further configured to detect, on at least one input mechanism of remote controller 800, a user input for operating UAV 1100, such as user interaction with rockers 842 (or joysticks) to fly UAV 1100 up, or down, or hover in a circle. Remote controller 800 is configured to generate the instruction according to the user input, and transmit the generated instruction to UAV 1100 for adjusting a motion parameter of UAV 1100.

In some embodiments, remote controller 800 is further configured to receive, from control device 300 via the connected data connectors 316 and 816, the instruction generated in response to a user input detected on a touchscreen of display 304. For example, the instruction may be related to adjusting camera parameters, selecting photography mode, adjusting UAV parameters, selecting UAV flight mode, or other operation.

In some embodiments, imaging device 100 is mounted in cavity 1102 disposed in a first area 1310 of UAV 1100 and configured to provide a first field of view (FOV) during the movement of UAV 1100. UAV 1100 may further comprise another imaging device (not shown) onboard UAV 1100 in a second area, such as area 1320, and configured to provide a second field of view (FOV) during the movement of UAV 1100. In such embodiments, remote controller 800 is configured to receive, from UAV 1100 and via communication device 817, first image data of the first FOV and second image data of the second FOV during the movement of the movable object. Remote controller 800 may be further configured to transmit, via the connected data connectors 316 and 816, the first image data and the second image data to control device 300 for processing, e.g., by image processing module 622, to provide a panorama view, which can be displayed on display 304 of the control device 300. The panorama view may then be displayed in real time during the movement of UAV 1100.

In some embodiments in environment 1300 in FIG. 13, control device 300 received in remote controller 800 is configured to detect a user input on the touchscreen of display 304, and generate and transmit an instruction corresponding to user input to remote controller 800. Remote controller 800 may then forward the received instruction to UAV 1100 for operating UAV 1100 and/or imaging device 100.

In some embodiments, control device 300 is configured to receive image data of images captured by imaging device 100 for displaying on display 304. The image data may be directly received from imaging device 100 via wireless communication. The image data may alternatively be received from remote controller 800, if the image data is transmitted from imaging device 100 to UAV 1100, relayed from UAV 1100 to remote controller 800 via communication device 817, and transmitted from remote controller 800 to control device 300.

In some embodiments in environment 1300 in FIG. 13, imaging device 100 is configured to receive commands from control device 300 or remote controller 800. Imaging device 100 may receive the commands from UAV 1100 via contact between contacts of connector 1112 in FIG. 11B and corresponding contacts of connector 112 shown in FIG. 1G. Imaging device 100 may be configured to send captured image data to control device 300 for display on display 304 via wireless communication, such as network 1320. Alternatively, imaging device 100 may be configured to send the captured image data via the contact between contacts of connector 1112 and corresponding contacts of connector 112 to UAV 1100, which further transmits the image data to remote controller 800 via communication with communication device 817.

In some embodiments in environment 1300 in FIG. 13, UAV 1100 is configured to receive commands from control device 300 or remote controller 800. During movement, UAV 1100 is configured to transmit a command for operating imaging device 100 via contact between contacts of connector 1112 in FIG. 11B and corresponding contacts of connector 112 shown in FIG. 1G. In some embodiments during movement, UAV 1100 is configured to send position data detected by one or more sensors as described herein to remote controller 800, where the position data may be processed by remote controller 800 and/or control device 300 when generating the command to operate UAV 1100.

For example, the position data may be used for adjusting the position of UAV 1100 and/or imaging device 100 if carried by a gimbal device for capturing images. UAV 1100 is further configured to transmit image data captured by imaging device 100 to remote controller 800 via communication device 817. In some embodiments during movement, UAV 1100 is configured to receive the captured image data from imaging device 100 via the contact between contacts of connector 1112 and corresponding contacts of connector 112.

In some embodiments, control device 300, removably coupled to imaging device 100, can be used to control movable object 1100. In some embodiments, when imaging device 100 is received in control device 300, control device 300 can be configured to control imaging device 100 to capture one or more images while controlling operation of movable object 1100. In some embodiments, when imaging device 100 is separate from control device 300 and onboard movable object 1100, control device 300 can be configured to control imaging device 100 to capture one or more images and/or operation of movable object 1100. In some embodiments, movable object 1100 comprises another imaging device (different from imaging device 100) onboard movable object 1100 and configured to capture one or more images during movement of movable object 1100. When imaging device 100 is coupled to control device 300, control device 300 is configured to control imaging device 100 to capture a first set of images (e.g., ground images) while controlling the other imaging device onboard movable object 1100 to capture a second set of images (e.g., aerial images). The first and second sets of images can be processed and combined to provide images or videos from different viewing angles and with different visual effects.

FIGS. 14A, 14B, 14C, 14D, 14E, 14F, 14G, 14H, 14I, and 14J show schematic diagrams of a first component 1400 of a wearable device, such as a wristband, from different viewing angles, in accordance with embodiments of the present disclosure. FIGS. 15A, 15B, 15C, 15D, 15E, 15F, 15G, 15H, 15I, 15J, 15K, and 15L show schematic diagrams of a wearable device, such as a wristband 1500, including first component 1400 coupled to a second component 1550, from different viewing angles, in accordance with embodiments of the present disclosure. Wristband 1500 can also be referred to as a wrist strap, a bracelet, a band, a fitness tracker, a wearable band, etc. Wristband 1500 is configured to be worn on a wrist of a user. FIGS. 16A, 16B, 16C, 16D, 16E, 16F, 16G, 16H, 16I, 16J, 16K, and 16L show schematic diagrams of a system 1600 including wristband 1500 coupled to imaging device 100 received in a cavity 1502 of a carrier body 1502 of wristband 1500, from different viewing angles, in accordance with embodiments of the present disclosure. It is appreciated that wristband 1500 is illustrated as an example of a wearable device and not intended to be limiting. Any other types of wearable device may have one or more similar features, such as a cavity for receiving imaging device 100, and can be coupled to and working in conjunction with imaging device 100 to perform one or more similar functions as described herein. For example, other types of wearable device may include a headband, a waistband, a waistbelt, an arm band, an ankle strap, smart glasses, etc.

In some embodiments, wristband 1500 comprises first component 1400 (or a first section, a first arc, a first part). First component 1400, when being worn on the wrist, is configured to wrap at least half of the circumference of the wrist. First component 1400 comprises a carrier body 1401 including a cavity 1402. Cavity 1402 can removably couple to at least a portion of an electronic device, such as imaging device 100 configured to capture one or more images as shown in FIGS. 16A-16B.

In some embodiments as shown in FIGS. 15A and 15C, wristband 1500 further comprises second component 1550 configured to be removably coupled to first component 1400 to form wristband 1500, which can be worn on the wrist of the user. One or more closing mechanisms may be formed on at least one of first component 1400 and second component 1550. The one or more closing mechanisms are configured to mechanically connect, e.g., via inserting, snapped-on, or magnetically attracting, first component 1400 and second component 1550 when wristband 1500 is worn on the wrist. As shown in FIGS. 15A and 16A, cavity 1402 is positioned on first component 1400 such that when system 1600 including wristband 1500 coupled to imaging device 100 is worn on the wrist of the user, imaging device 100 is positioned on an outer surface of wristband 1500, as shown in FIG. 16A.

Figure 16A:
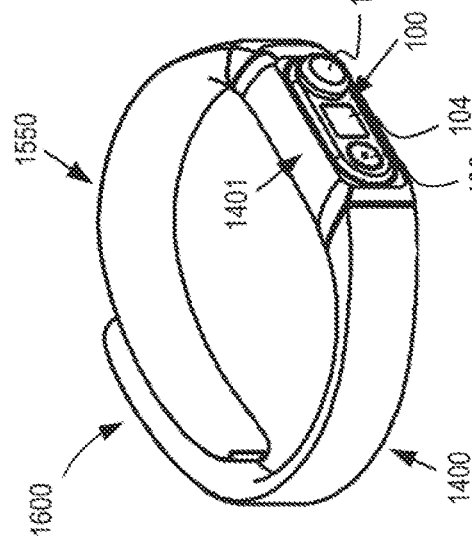
FIGS. 16A, 16B, 16C, 16D, 16E, 16F, 16G, 16H, 16I, 16J, 16K, and 16L show schematic diagrams of a system including a wristband coupled to an imaging device, from different viewing angles, in accordance with embodiments of the present disclosure.
Figure 16B:
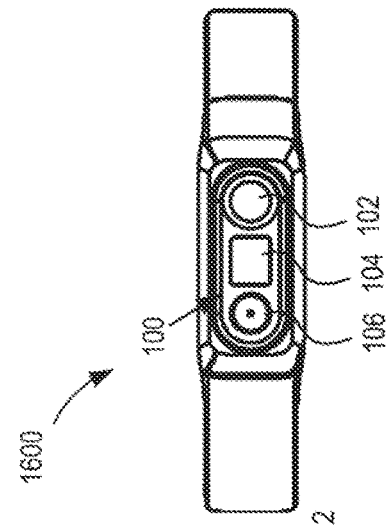
Figure 16C:
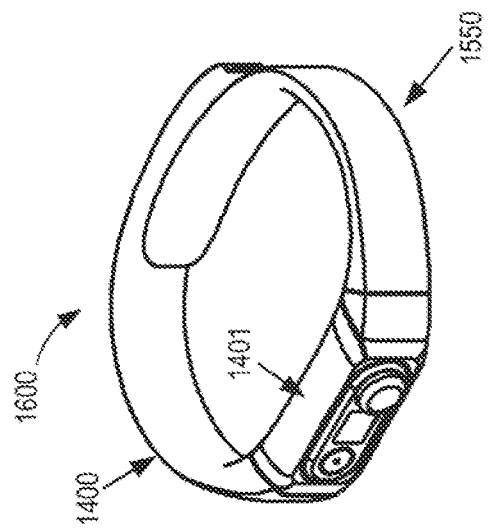
Figure 16D:
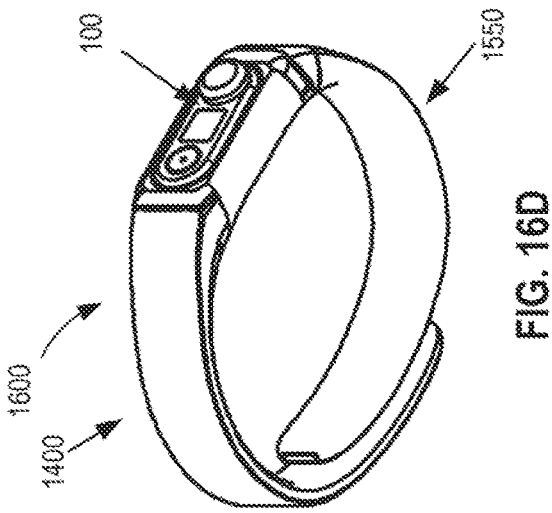
Figure 16E:
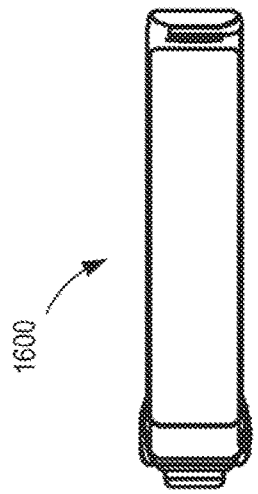
Figure 16F:
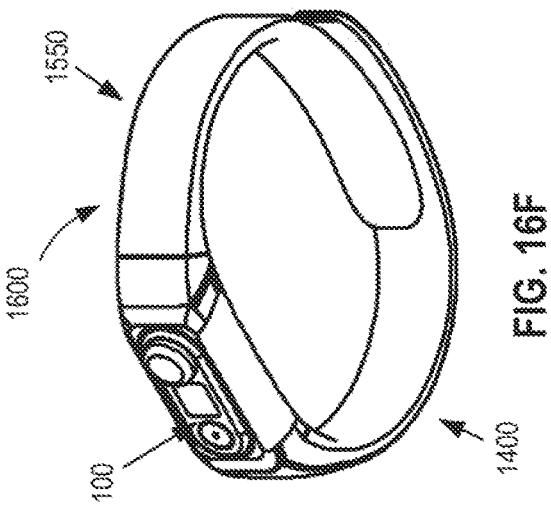
Figure 16I:
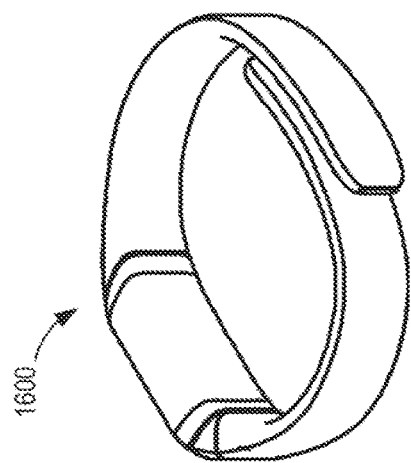
Figure 16L:
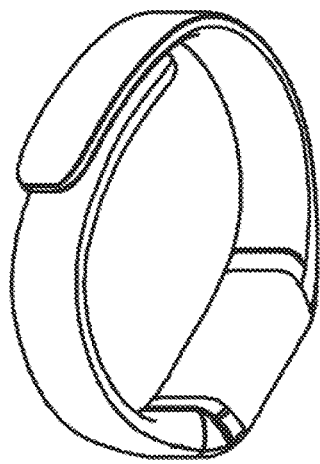
Figure 16H:
Figure 16K:
Figure 16G:
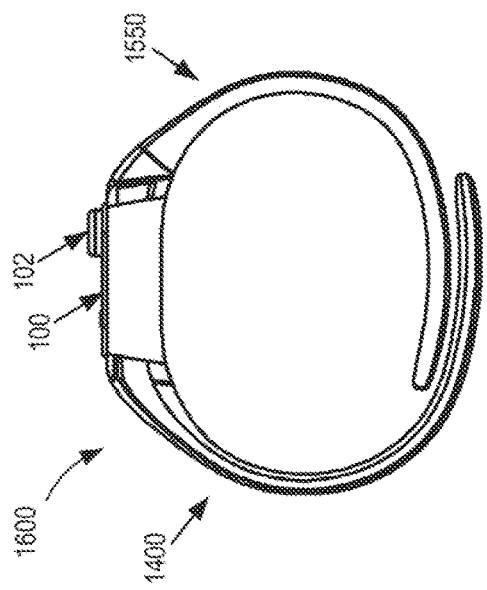
Figure 16J:
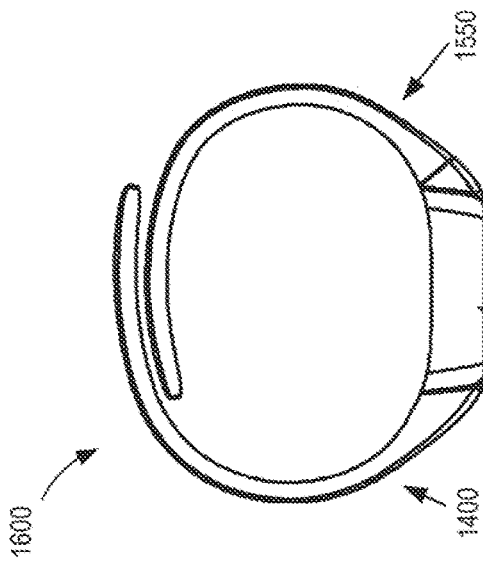

In some embodiments as shown in FIGS. 14A, 14B, and 14C, first component 1400 comprises a connector 1412 disposed in cavity 1402 for communicatively connecting to imaging device 100, as shown in FIGS. 16A, 16B, and 16C. Connector 1412 includes a set of contacts on an edge 1420 of cavity 1402 to contact the set of contacts of connector 112 on imaging device 100 when imaging device 100 is coupled to first component 1400 within cavity 1402. When imaging device 100 is coupled to first component 1400 in cavity 1402 via connector 1412, imaging device 100 can transmit image data to first component 1400 of wristband 1500 via connector 1412. First component 1400 can also transmit data, such as data for system update, to imaging device 100 via connector 1412. In some embodiments, wristband 1500 further comprises a magnet 1417 (FIG. 14B) in cavity 1402 to hold, by magnetic attraction to magnet 114, imaging device 100 when received in cavity 1402.

In some embodiments as shown in FIGS. 14B and 14C, first component 1400 further includes a connector 1416 on an end 1417 of first component 1400. Connector 1416, such as a USB connector or a micro-USB, is configured to removably couple to a connector on second component 1550 to form wristband 1500, as shown in FIGS. 15A and 15C. First component 1400 of wristband 1500 can be coupled to an external device, such as a computer or a mobile phone, via connector 1416. When coupled to the external device, first component 1400 can transmit data, such as stored image data, health data, system data, user data, or other types of data stored on first component 1400, to the external device via connector 1416. The user can use the external device to manage the received data from first component 1400, such as editing the image data, or backup the system data. The external device can transmit data, such as data for system update, to first component 1400 via connector 1416. First component 1400 of wristband 1500 can transmit image data, received from imaging device 100 via connector 1412, to the external device via connector 1416. First component 1400 can receive information from the external device, such as data for system update, via connector 1416, and then transmit the received data to imaging device 100 via connector 1412. In some embodiments, the external device can charge a battery 1760 (FIG. 17) of wristband 1500 disposed in first component 1400 via connector 1416 when first component 1400 is coupled to the external device via connector 1416.

Each of first component 1400 and second component 1550 may be composed of one or more materials selected from rubber, plastic, metal, or any other suitable materials.

Figure 17:
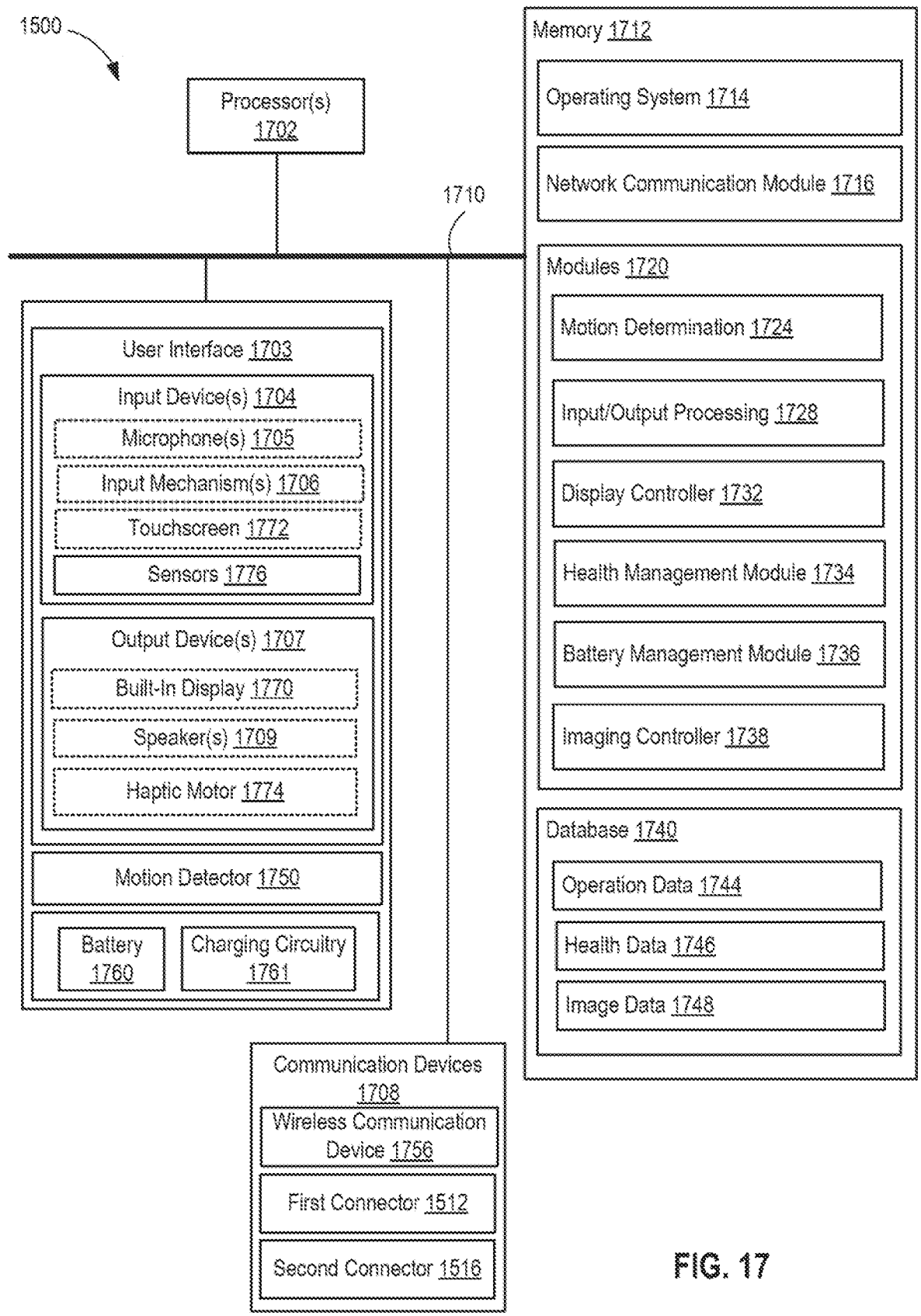
FIG. 17 shows a block diagram of an example of a wristband configured in accordance with embodiments of the present disclosure.

FIG. 17 shows a block diagram of an example of wristband 1500 configured in accordance with embodiments of the present disclosure. Wristband 1500 comprises one or more processors 1702 for executing modules, programs, and/or instructions stored in a memory 1712 and thereby performing predefined operations, one or more network or other communications devices provided as communication devices 1708, and one or more communication buses 1710 for interconnecting these components. One or more components shown in FIG. 17, either software based or hardware based, can be disposed in first component 1400 and/or second component 1550 of wristband 1500.

In some embodiments, wristband 1500 comprises a user interface 1703 comprising one or more input devices 1704, such as an audio recording device provided as microphone(s) 1705, input mechanism(s) 1706, and a touchscreen 1772; and one or more output devices 1707, such as a built-in display 1770, an audio output device such as speaker(s) 1709, and a haptic motor 1774. Input devices 1704 may include one or more sensors 1776, including biosensors and corresponding circuitry, such as a temperature sensor, a blood pressure sensor, a heartrate monitor, an electrolyte measurement sensor, and/or a biomarker tracker, etc., configured to collect health related data of the user.

In some embodiments, wristband 1500 further comprises a motion detector 1750, e.g., comprising one or more motion sensors and/or position sensors, working in conjunction with a motion determination module 1724, configured to detect a motion of wristband 1500.

In some embodiments, communication devices 1708 of wristband 1500 include a wireless communication device 1756 configured to wirelessly communicate with one or more other devices, such as imaging device 100, a movable object such as UAV 1100, a mobile device, a personal computer, a server system, etc. For example, wristband 1500 can receive image data from imaging device 100 via wireless communication. Wireless communication device 1756 may support any suitable wireless communication technology, such as Radio-frequency identification (RFID), Bluetooth communication, Wi-Fi, radio communication, cellular communication, ZigBee, infrared (IR) wireless, microwave communication, etc. Communication devices 1708 further include a connector 1512 and a connector 1516.

Processors 1702 may be any suitable hardware processor, such as an image processor, an image processing engine, an image-processing chip, a graphics-processor (GPU), a microprocessor, a micro-controller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component.

Memory 1712 may include high-speed random access memory, such as DRAM, SRAM, or other random access solid state memory devices. In some embodiments, memory 1712 includes non-volatile memory, such as one or more magnetic disk storage devices, optical disk storage devices, flash memory devices, or other non-volatile solid state storage devices. In some embodiments, memory 1712 includes one or more storage devices remotely located from processor(s) 1702. Memory 1712, or alternatively one or more storage devices (e.g., one or more nonvolatile storage devices) within memory 1712, includes a non-transitory computer readable storage medium. In some implementations, memory 1712 or the computer readable storage medium of memory 1712 stores one or more computer program instructions (e.g., modules 1720), and a database 1740, or a subset thereof that are configured to cause processor(s) 1702 to perform one or more processes described herein.

Memory 1712 may include an operating system 1714 that includes procedures for handling various system services and for performing hardware dependent tasks. Wristband 1500 may further include a network communication module 1716 that is used for connecting wristband 1500 to other devices via communication devices 1708 and associated interface, either wirelessly or in direct contact.

In some embodiments, each module in modules 1720 comprises program instructions for execution by processor(s) 1702 to perform a variety of functions. One or more of modules 1720 described below may optionally be included based on whether the functionality associated with the corresponding module(s) is needed.

More particularly, modules 1720 include a motion determination module 1724, for determining motion data of wristband 1500 detected by motion detector 1750 to determine a motion of the user, e.g., a movement of a wrist of the user. Modules 1720 also include an input/output processing module 1728, for processing various types of user input and/or output received by one or more user input devices 1704.

Modules 1720 include a display controller 1732 configured to generate and send instruction to operate display 104 of imaging device 100 when received in cavity 1402 of wristband 1500. Modules 1720 include a health management module 1734 for receiving, analyzing, reporting, and/or sending alert based on health data collected by sensors 1776. Modules 1720 include a battery management module 1736 for determining a battery status of battery 1760, managing charging circuitry 1761 associated with charging battery 1760, and other suitable operations associated with battery usage. Modules 1720 include a display management module 1738 for generating and sending instructions to imaging device 100 to manage display 104 for displaying image data, operation data, and/or other types of data such as the time, on display 104. Modules 1720 include an imaging controller 1738 configured to generate and send instructions to imaging device 100 and/or optical assembly 102 to take images under different photography modes.

In some embodiments, database 1740 stores operation data 1744 associated with operation of wristband 1500, health data 1746 of the user, and/or image data 1748 received from imaging device 100. Details associated with modules 1720 and database 1740 are further described with reference to example processes of the present disclosure. It is appreciated that modules 1720 and/or database 1740 are not limited to the scope of the example processes discussed herein. Modules 1720 may further be configured to cause processor(s) 1702 to perform other suitable functions, and database 1740 may store information needed to perform such other suitable functions.

In some embodiments, memory 1712 stores instructions for execution by processors 1702 to cause wristband 1500 to control operation of wristband 1500 and/or imaging device 100, in accordance with the detected motion of wristband 1500 when imaging device 100 is received in cavity 1402. For example, wristband 1500 may generate and send instructions to imaging device 100 to activate certain compatible or optimized functions. Wristband 1500 may also generate and send instructions to imaging device 100 to deactivate certain incompatible or unoptimized functions. The operation of imaging device 100 may be controlled via the contact between the contacts of connector 1412 and contacts of connector 112, in accordance with the detected motion. The operation of imaging device may also be controlled via instruction or command transmitted via wireless network communication between wristband 1500 and imaging device 100.

In some embodiments, when motion detector 1750 detects that the user lifts his or her wrist and points imaging device 100 in system 1600 towards a face of the user for more than a predetermined period of time, such as for over 5 seconds, this indicates that the user intends to look at display 104 on imaging device 100 shown in FIG. 16B to preview images, such as selfies images, to be captured. In response, imaging controller 1738 may activate or send instruction to imaging device 100 to activate optical assembly 102 in a selfie photography mode. For example, when receiving a user instruction, such as on input mechanism 106, display 104, and/or a speech command by microphone 110, optical assembly 102 captures one or more selfie images in the selfie photography mode. In addition to or separately from using motion detector 1750 on wristband 1500, optical assembly 102 working in conjunction with certain modules in imaging device 100 may track the user's eye gaze to determine that the user is looking at display 104 to confirm the user's intention. Display controller 1732, may cause imaging device 100, received in cavity 1402, to display the captured selfie images or a FOV of optical assembly 102 on display 104 of imaging device 100.

In some embodiments, when motion detector 1750 detects that the user lifts his or her wrist and points imaging device 100 in system 1600 towards a face of the user for no more than a predetermined period of time, such as for 5 seconds or less, this indicates that the user intends to check information rather than taking images. For example, the user may intend to look at display 104 on imaging device 100 to check the time, date, weather, calendar, and/or health data, etc. In response, display controller 1732 of wristband 1500 may instruct imaging device 100 to display one or more information items on display 104 of imaging device 100.

In some embodiments, when motion detector 1750 detects that the user lifts his or her wrist and points imaging device 100 in system 1600 towards an area of interest, for example in the environment surrounding the user, this indicates that the user intends to snap a photo or take a video of the area of interest of the environment. In response, imaging controller 1738 of wristband 1500 may activate or send instruction to imaging device 100 in an FPV photography mode. For example, in response to receiving a user instruction, such as on input mechanism 106, display 104, and/or a speech command by microphone 110, optical assembly 102 captures images of the area of interest. The area of interest may be determined in accordance with detecting that imaging device 100 is pointed toward a certain direction or the FOV of optical assembly 102 is pointed toward a subject, such as a person or an object, for a period of time, which may suggest that the user intends to capture images of the subject.

In some embodiments, when motion detector 1750 detects that a motion of the user is not associated with using imaging device 100 on wristband 1500, e.g., the user extends his or her arm, exercises, and/or performs other body or hand gestures, memory 1712 stores instructions for causing processor(s) 1702 to control imaging device 100 to disable, deactivate, or forego one or more operations. For example, when the motion of the user suggests that the user does not intend to use imaging device 100 on wristband 1500, wristband 1500 may send instructions to imaging device 100, e.g., via contact between connectors 1412 and 112, to deactivate optical assembly 102 and/or display 104 to save power of battery 1760. When the motion of the user suggests that the user does not intend to use imaging device 100 on wristband 1500, wristband 1500 may also send an instruction to imaging device 100 to deactivate input mechanism 106 to prevent the user accidentally touching, pressing, or otherwise interacting with input mechanism 106 to trigger an operation. For example, motion determination module 1724 of wristband 1500 may be programmed to determine that the user interacts with input mechanism 106 on imaging device 100 intentionally only when the user is paying attention to, e.g., looking at, imaging device 100 on wristband 1500. Accordingly, if the motion of the user is detected to determine that the user does not intend to use imaging device 100 on the wrist, wristband 1500 can deactivate input mechanism 106.

In some embodiments, motion detector 1750 or other position detector(s) on wristband 1500, when working in conjunction with motion determination module 1724 or a position determination module, can further determine an orientation of imaging device 100 received in cavity 1402. For example, motion detector 1750 or a position detector can determine the orientation based on an alignment of the contacts of connector 112 on imaging device 100 relative to the contacts of connector 1412 on wristband 1500. Motion detector 1750 or a position detector may also include a Hall sensor to determine the orientation of the magnet 114 of imaging device 100 relative to magnet 1417 of wristband 1500. Any other suitable method for determining the orientation can be used and is within the scope of the present disclosure.

In some embodiments, in accordance with determining that imaging device 100 is mounted in cavity 1402 in an outward-facing orientation, i.e., optical assembly 102 facing outward to be viewable to the user, wristband 1500 is configured to activate communication between imaging device 100 and wristband 1500 via one or more contacts of connectors 1412 and 112, for example, for exchanging data there in between.

In some embodiments, in accordance with determining that imaging device 100 is mounted in cavity 1402 in an inward-facing orientation, i.e., optical assembly 102 facing inward and unviewable, wristband 1500 is configured to generate a notification to the user. For example, wristband 1500 may notify the user of a potential error by generating a haptic notification via haptic motor 1774 or audio notification via speaker(s) 1709.

In some embodiments, one or more of the above described features may be performed by imaging device 100 after wristband 1500 sends information related to the detected motion of the wrist of the user, position, and/or orientation of imaging device 100 to imaging device 100, e.g., via contact between connectors 1412 and 112 or wireless communication, for one or more modules of imaging device 100 to generate instructions accordingly.

In some embodiments, the position and/or orientation of imaging device 100, such as inward-facing or outward-facing, may be detected by one or more sensors on imaging device 100. The detection result may be transmitted to wristband 1500 e.g., via contact between connectors 1412 and 112 or wireless communication, for wristband 1500 to generate instructions to operate wristband 1500 and/or imaging device 100 as described herein. In one example, imaging device 100 may detect the orientation according to the contact alignment, and send instructions to wristband 1500 to establish the contact when imaging device 100 is facing outward. In another example, imaging device 100 can generate a notification, such as a message on display 104 or a vibration of imaging device 1000, to notify the user to adjust the placement of imaging device 100 in cavity 1402 when imaging device 100 is facing inward.

It is to be understood that the disclosed embodiments are not necessarily limited in their application to the details of construction and the arrangement of the components set forth in the following description and/or illustrated in the drawings and/or the examples. The disclosed embodiments are capable of variations, or of being practiced or carried out in various ways. The types of user control as discussed in the present disclosure can be equally applied to other types of movable objects or any suitable object, device, mechanism, system, or machine configured to travel on or within a suitable medium, such as a surface, air, water, rails, space, underground, etc.

The embodiments of the present disclosure may be implemented entirely or partially by software, hardware, firmware, or any combination thereof. When implemented in software, the embodiments of the present disclosure may be implemented entirely or partially in the form of a computer program product. The computer program product may include one or more computer program instructions. Executing the computer program instructions on a computer may entirely or partially produce flow chart processes or functions according to the embodiments of the present disclosure. The computer may be a general-purpose computer, a specialized computer, a computer network, or other programmable devices. The computer program instructions may be stored in a computer readable storage medium or may be transferred from one computer readable storage medium to another computer readable storage medium. For example, the computer program instructions may be transferred from one network node, one computer, one server, or one data center to another network node, another computer, another server, or another data center through a wired (e.g., coaxial cable, optical fiber, digital subscriber line) or wireless (e.g., infrared, radio, microwave, etc.) communication method. The computer readable storage medium may include any computer accessible usable medium or one or more of data storage equipment such as usable medium integrated servers or data centers. The usable medium may include a magnetic medium (e.g., a floppy disk, a hard disk, a magnetic tape), or a semiconductor medium (e.g., solid state disk), etc.

The phrase "one embodiment," "some embodiments," or "other embodiments" in the specification means that the particular features, structures, or characteristics related to the embodiments are included in at least one embodiment of the present disclosure. Thus, they are not intended to be the same embodiment. In addition, these particular features, structures, or characteristics may be combined in any suitable manner in one or more embodiments.

In various embodiments of the present disclosure, sequence numbers of the processes have nothing to do with the order of execution sequence. Instead, the order of executing the processes should be determined by functions and intrinsic logic. The sequence numbers should not limit the implementation of the embodiments of the present disclosure.

In various embodiments of the present disclosure, the phrase "B corresponding to A" can mean that B is associated with A and/or B can be determined according to A. However, determining B from A does not mean that B is determined only based on A, but B can be determined based on A and/or other information. The term "and/or" herein is merely an association relationship describing associated objects, representing three relationships. For example, A and/or B may represent an existence of A only, an existence of B only, and a co-existence of both A and B. In addition, the character "/" in the specification generally represents that the associated objects have an "or" relationship.

Those skilled in the art will appreciate that the elements and steps described in various embodiments of the present disclosure can be implemented in electronic hardware or a combination of computer software and electronic hardware. Whether a function is implemented in hardware or software may be determined by specific application and design constraints of the particular solution. Those skilled in the art may use different methods to implement a function described in the specification depending on each specific application. However, such implementation should not be considered to be beyond the scope of the present disclosure.

Those skilled in the art may clearly understand that, for convenience and brevity, detailed operation process of systems, devices and sub-systems may refer to a corresponding process previously described in the embodiments and may not be repeated.

In the embodiments of the present disclosure, the disclosed systems, devices and methods may be implemented in other manners. For example, the device embodiments described above are merely illustrative. Certain features may be omitted or not executed. Further, mutual coupling, direct coupling, or communication connection shown or discussed may be implemented by certain interfaces. Indirect coupling or communication connection of devices or sub-systems may be electrical, mechanical, or in other forms.

The foregoing descriptions are merely some implementation manners of the present disclosure, but the scope of the present disclosure is not limited thereto. It will be apparent to those skilled in the art that various modifications and variations can be made to the disclosed devices and systems. Other embodiments will be apparent to those skilled in the art from consideration of the specification and practice of the disclosed devices and systems. It is intended that the specification and examples be considered as exemplary only, with a true scope being indicated by the following claims and their equivalents.

What is claimed is:

1. A handheld controller configured to be removably coupled to and control an imager, the handheld controller comprising:
    a carrier body at which the imager is removably mounted, wherein the imager is mounted at the carrier body in one of a plurality of different orientations with respect to the carrier body;
    at least one processor; and
    memory coupled to the at least one processor and storing instructions that, when executed by the at least one processor, cause the at least one processor to perform operations including:
    in response to a change in an orientation with respect to the carrier body in which the imager is mounted at the carrier body, changing an operating mode of the handheld controller and/or the imager.

2. The handheld controller of claim 1, further comprising:
    a cavity of the carrier body on a side of the carrier body, the cavity configured to removably receive at least a portion of the imager.

3. The handheld controller of claim 2, wherein the memory further stores instructions for execution by the at least one processor to cause the handheld controller to perform operations including:

in accordance with the imager being received in the cavity:
charging a battery of the imager,
controlling the imager to transmit image data of the first group of images captured by the imager to the handheld controller, or
controlling the imager to transmit data from the imager to an external device coupled to the handheld controller.

4. The handheld controller of claim 2, wherein the handheld controller is configured to receive, on the side of the carrier body, the imager in the cavity with an optical assembly of the imager facing inward toward a sidewall of the cavity or outward away from the cavity.

5. The handheld controller of claim 4, wherein a surface in the cavity includes at least one containing area to accommodate at least one component of the imager in accordance with the imager being received in the cavity with the optical assembly facing inward.

6. The handheld controller of claim 4, wherein the memory further stores instructions for execution by the at least one processor to cause the handheld controller to perform operations including:
in accordance with the imager being received in the cavity with the optical assembly of the imager facing outward, controlling the imager to capture the first group of images.

7. The handheld controller of claim 4,
wherein the side of the carrier body is a first side of the carrier body;
the handheld controller further comprising:
a display on a second side of the carrier body opposite to the first side of the carrier body;
wherein the memory further stores instructions for execution by the at least one processor to cause the handheld controller to perform operations including:
displaying content on the display in accordance with a detected orientation of the imager received in the cavity.

8. The handheld controller of claim 7, wherein the memory further stores instructions for execution by the at least one processor to cause the handheld controller to perform operations including:
in accordance with the imager being received in the cavity with the optical assembly of the imager facing outward, displaying, on the display, a first user interface for controlling the imager to capture the first group of images; and
in accordance with the imager being received in the cavity with the optical assembly of the imager facing inward, displaying a second user interface for managing data transmission from the imager to the handheld controller.

9. The handheld controller of claim 4, wherein the memory further stores instructions for execution by the at least one processor to cause the handheld controller to perform operations including:
controlling the imager in accordance with a detected orientation of the imager received in the cavity, comprising:
in accordance with the imager being received in the cavity with the optical assembly of the imager facing outward, receiving a user input for controlling the imager to capture the first group of images; and in accordance with the imager being received the cavity with the optical assembly of the imager facing inward:
charging a battery of the imager, or
controlling the imager to transmit image data of the first group of images captured by the imager to the handheld controller.

10. The handheld controller of claim 2, further comprising:
a first connector located in the cavity; and
a second connector on the imager
wherein the first connector is configured to be electrically connected to the second connector when the imager is received in the cavity.

11. The handheld controller of claim 10, wherein the first connector and the second connector are in contact with each other when the imager is received in the cavity on the side of the carrier body with an optical assembly of the imager facing outward away from the cavity or inward toward a sidewall of the cavity.

12. The handheld controller of claim 2, wherein the memory further stores instructions for execution by the at least one processor to cause the handheld controller to perform operations including:
in response to detecting that the imager is received in the cavity of the handheld controller, powering one or more functions of the imager while charging a battery of the imager.

13. The handheld controller of claim 2, further comprising:
a magnet disposed in the cavity to hold, by magnetic attraction, the imager received in the cavity.

14. The handheld controller of claim 2, further comprising:
a display configured to display the first group of images captured by the imager or a user interface for receiving a user input to control the imager.

15. The handheld controller of claim 1, wherein the memory further stores instructions for execution by the at least one processor to cause the handheld controller to perform operations including:
in accordance with the imager being coupled to the handheld controller, causing the imager to operate in a first mode associated with a first set of parameters; and
in accordance with the imager being separate from the handheld controller and onboard the movable object, causing the imager to operate in a second mode associated with a second set of parameters.

16. The handheld controller of claim 1, further comprising:
a position detector configured to detect position data of the handheld controller, the position data of the handheld controller used for controlling the imager for capturing the first group of images.

17. The handheld controller of claim 1, further comprising:
a battery removable from the handheld controller; and
a display;
wherein, when the battery of the handheld controller is separate from the handheld controller and the imager is coupled to the handheld controller, the display on the handheld controller is powered by a battery of the imager.

18. The handheld controller of claim 1, wherein the memory further stores instructions for execution by the at least one processor to cause the handheld controller to perform operations including:

control the imager to operate in a photography mode in response to the imager being mounted at the carrier body in a first orientation; and disable operation of the imager in response to the imager being mounted at the carrier body in a second orientation, the first orientation being different from the second orientation.

19. The handheld controller of claim 1, wherein the memory further stores instructions for execution by the at least one processor to cause the handheld controller to perform operations including:
in accordance with the imager being coupled to the handheld controller, controlling the imager to capture a first group of images; and
in accordance with the imager being separate from the handheld controller and carried by a movable object, controlling the imager to capture a second group of images or controlling the movable object.

20. A system comprising:
an imager; and
a handheld controller removably coupled to the imager, the handheld controller including:
a carrier body at which the imager is removably mounted, wherein the imager is mounted at the carrier body in one of a plurality of different orientations with respect to the carrier body;
at least one processor; and
memory coupled to the at least one processor and storing instructions that, when executed by the at least one processor, cause the at least one processor to perform operations including:
in response to a change in an orientation with respect to the carrier body in which the imager is mounted at the carrier body, changing an operating mode of the handheld controller and/or the imager.

* * * * *